(12) United States Patent
Shih et al.

(10) Patent No.: US 11,751,277 B2
(45) Date of Patent: Sep. 5, 2023

(54) METHOD AND APPARATUS FOR SELECTING BANDWIDTH PART (BWP) FOR SUBSEQUENT TRANSMISSION IN PRE-CONFIGURED RESOURCES BASED SMALL DATA TRANSMISSION (SDT) IN A WIRELESS COMMUNICATION SYSTEM

(71) Applicant: ASUSTek Computer Inc., Taipei (TW)

(72) Inventors: Tun-Huai Shih, Taipei (TW); Yu-Hsuan Guo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 80 days.

(21) Appl. No.: 17/371,308

(22) Filed: Jul. 9, 2021

(65) Prior Publication Data
US 2022/0022276 A1    Jan. 20, 2022

Related U.S. Application Data

(60) Provisional application No. 63/052,195, filed on Jul. 15, 2020, provisional application No. 63/052,217, filed on Jul. 15, 2020.

(51) Int. Cl.
*H04W 76/27* (2018.01)
*H04W 72/04* (2023.01)

(52) U.S. Cl.
CPC .......... *H04W 76/27* (2018.02); *H04W 72/04* (2013.01)

(58) Field of Classification Search
CPC ..... H04W 76/27; H04W 72/04; H04W 24/08; H04W 72/042; H04W 76/28; H04L 5/0092; H04L 5/0098; H04L 27/2607; H04L 5/0051; H04L 5/0094; H04L 27/0006; H04L 5/001; H04L 5/0048; H04L 5/0053;
(Continued)

(56) References Cited

U.S. PATENT DOCUMENTS

2020/0396044 A1* 12/2020 Lee ................... H04L 47/74
2021/0167930 A1*  6/2021 Jeon .................. H04B 17/318
2021/0274525 A1*  9/2021 Wei .................... H04W 72/23
(Continued)

FOREIGN PATENT DOCUMENTS

| CN | 111194089 A    | 5/2020 |
| WO | 2019132234 A1  | 7/2019 |
| WO | 2020068478 A1  | 4/2020 |

OTHER PUBLICATIONS

WO 2019/132234 A1 (Year: 2018).*
(Continued)

*Primary Examiner* — Rushil P. Sampat
(74) *Attorney, Agent, or Firm* — Cooper Legal Group LLC

(57) ABSTRACT

A method and apparatus are disclosed. In an example from the perspective of a User Equipment (UE), the UE receives a first Radio Resource Control (RRC) message from a network node, wherein the first RRC message is indicative of a first uplink (UL) Bandwidth Part (BWP) of a cell. In response to initiation of a procedure to use a configured grant (CG) resource in RRC inactive state, the UE performs BWP switching from a second UL BWP of the cell to the first UL BWP of the cell. The UE performs, on the first UL BWP, a first UL transmission using the CG resource. In response to completion of the procedure, the UE performs BWP switching from the first UL BWP of the cell to the second UL BWP of the cell.

21 Claims, 22 Drawing Sheets

(58) Field of Classification Search
CPC ... H04L 5/0055; H04B 17/318; H04B 7/0626; Y02D 30/70
See application file for complete search history.

(56) References Cited

U.S. PATENT DOCUMENTS

2021/0315049 A1* 10/2021 Wei .................. H04W 76/36
2022/0264402 A1*  8/2022 Nemeth ............. H04L 5/0096

OTHER PUBLICATIONS

U.S. Appl. No. 62/982,713 (Year: 2020).*
Corresponding European Patent Application No. 21184659.7, Extended European Search Report dated Dec. 8, 2021.
LG Electronics Inc., "UE autonomous BWP switching for configured UL resources", 3GPP TSG-RAN WG2 RAN2#101 R2-1802438 (Resubmission of R2-1801243), Agenda Item 10.3.1.2 (NR_newRAT-Core), Document for Discussion and Decision, pp. 1-3, Feb. 26-Mar. 2, 2018, Athens Greece.
Mitsubishi Electric, "Views on pre-emption for UL intra UE Tx multiplexing", 3GPP TSG RAN WG1 Meeting #96, R1-1902839, Agenda Item 7.2.6.4 Others, Document for Discussion/Decision, pp. 1-4, Feb. 25-Mar. 1, 2019, Athens Greece.

* cited by examiner

US 11,751,277 B2

METHOD AND APPARATUS FOR SELECTING BANDWIDTH PART (BWP) FOR SUBSEQUENT TRANSMISSION IN PRE-CONFIGURED RESOURCES BASED SMALL DATA TRANSMISSION (SDT) IN A WIRELESS COMMUNICATION SYSTEM

CROSS-REFERENCE TO RELATED APPLICATIONS

The present application claims the benefit of U.S. Provisional Patent Application Ser. No. 63/052,195 filed on Jul. 15, 2020, the entire disclosure of which is incorporated herein in its entirety by reference. The present application also claims the benefit of U.S. Provisional Patent Application Ser. No. 63/052,217 filed on Jul. 15, 2020, the entire disclosure of which is incorporated herein in its entirety by reference.

FIELD

This disclosure generally relates to wireless communication networks, and more particularly, to a method and apparatus for selecting Bandwidth part (BWP) for subsequent transmission in pre-configured resources based Small Data Transmission (SDT) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives a first Radio Resource Control (RRC) message from a network node, wherein the first RRC message is indicative of a first uplink (UL) Bandwidth Part (BWP) of a cell. In response to initiation of a procedure to use a configured grant (CG) resource in RRC inactive state, the UE performs BWP switching from a second UL BWP of the cell to the first UL BWP of the cell. The UE performs, on the first UL BWP, a first UL transmission using the CG resource. In response to completion of the procedure, the UE performs BWP switching from the first UL BWP of the cell to the second UL BWP of the cell.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.300 V16.0.0, "NR, NR and NG-RAN overall description, Stage 2"; 3GPP TS 38.321 V16.0.0, "NR, MAC protocol specification"; 3GPP TS 38.331 V16.0.0, "NR, RRC protocol specification"; RP-193252, "New Work Item on NR small data transmissions in INACTIVE state". The standards and documents listed above are hereby expressly incorporated by reference in their entirety.

Figure 1:
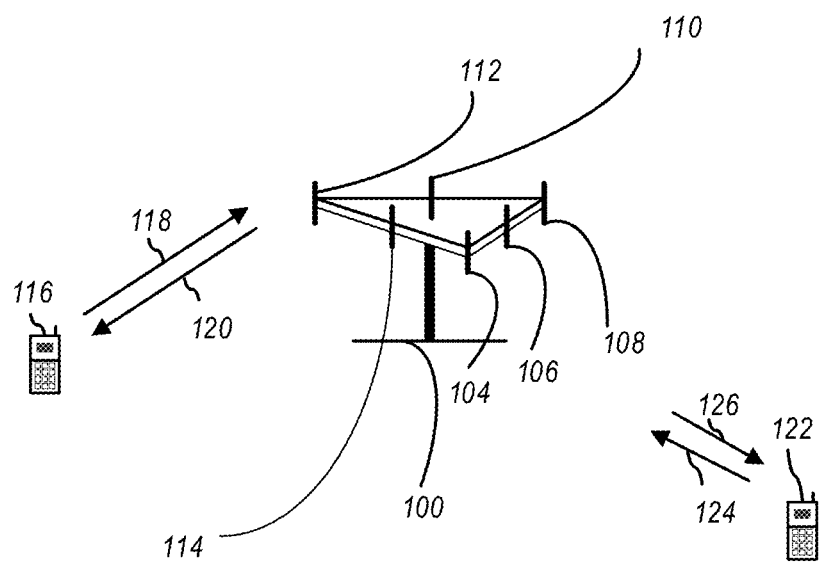
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
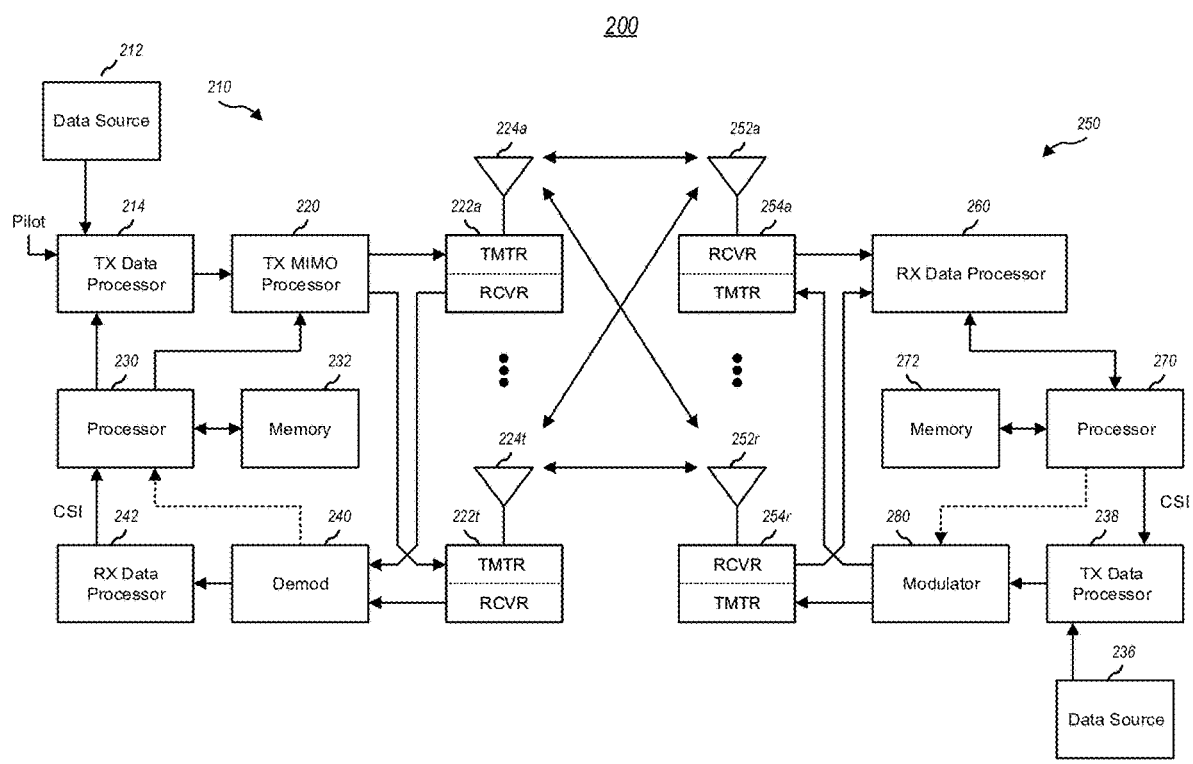
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250.

Processor 230 may then determine which pre-coding matrix to use for determining the beamforming weights and may then process the extracted message.

Figure 3:
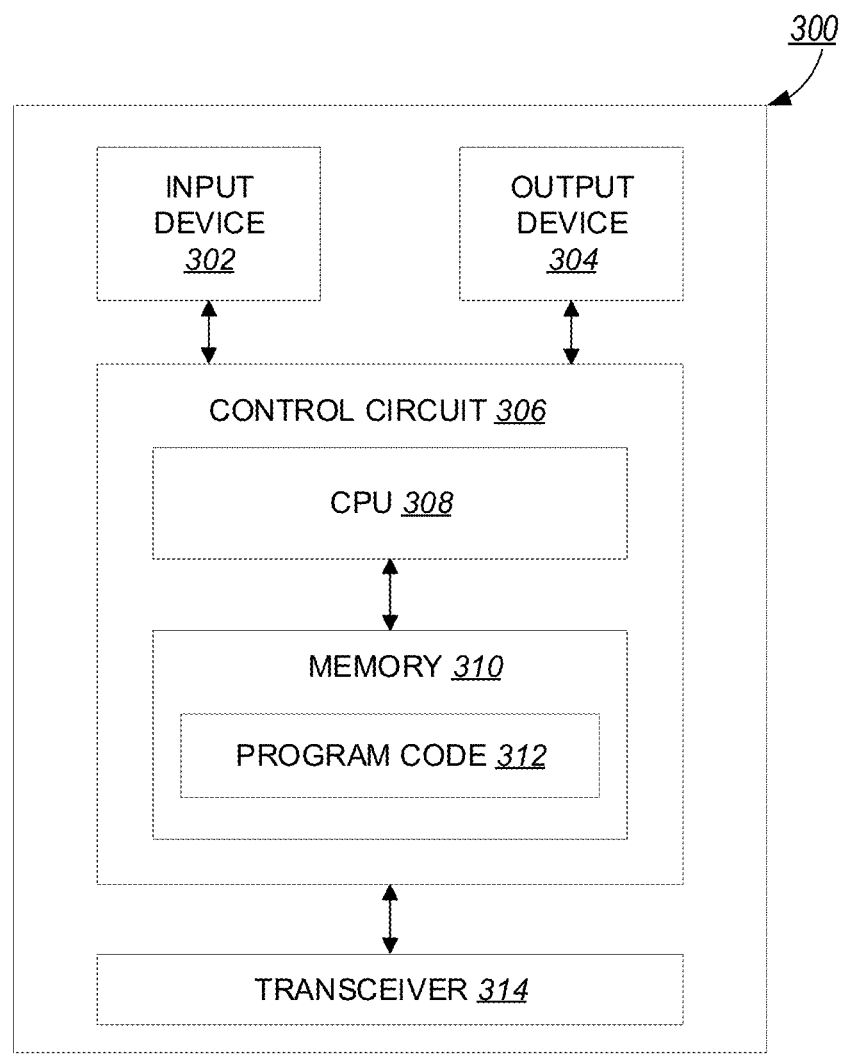
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
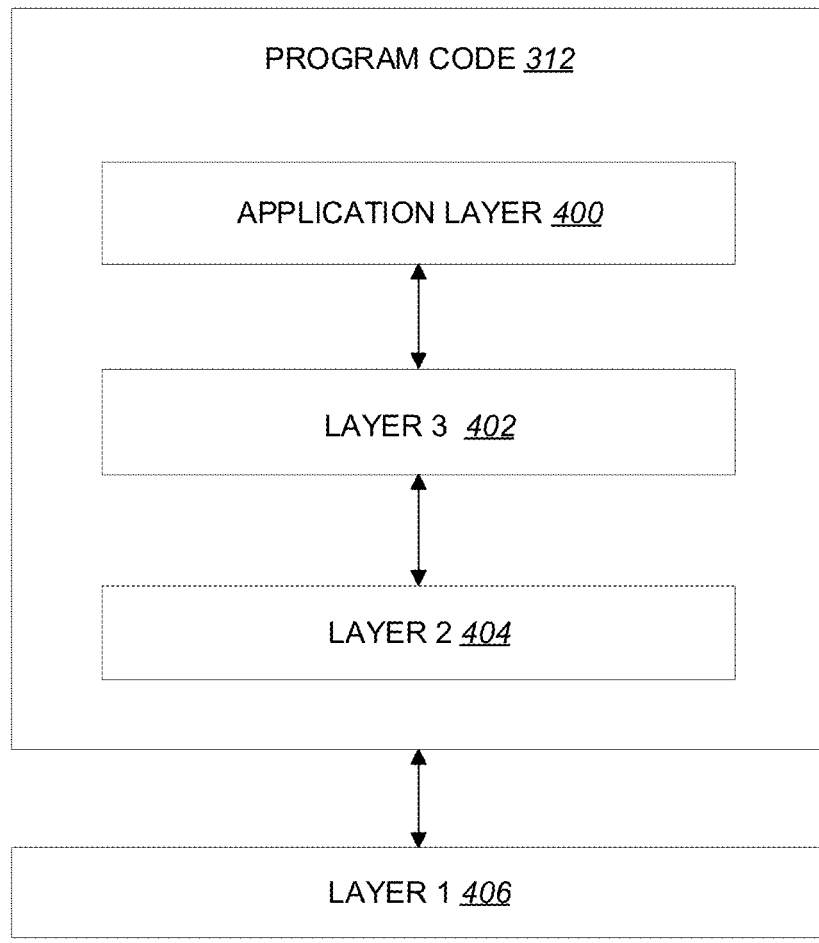
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Figure 9:
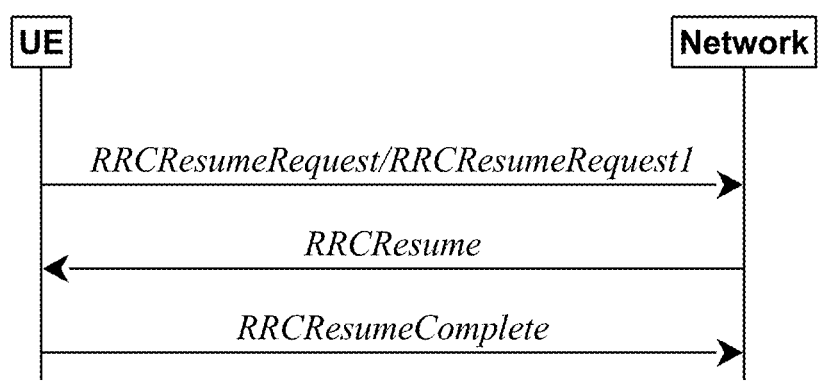
FIG. 9 is a diagram of Radio Resource Control (RRC) connection resume according to one exemplary embodiment.

Text related to RRC_INACTIVE state in NR is quoted below from 3GPP TS 38.300 V16.0.0. Notably, FIG. 9.2.2.4.1-1 of Section 9.2.2.4.1 of 3GPP TS 38.300 V16.0.0, entitled "UE triggered transition from RRC_INACTIVE to RRC_CONNECTED (UE context retrieval success)", is reproduced herein as FIG. 5. FIG. 9.2.2.4.1-2 of Section 9.2.2.4.1 of 3GPP TS 38.300 V16.0.0, entitled "UE triggered transition from RRC_INACTIVE to RRC_CONNECTED (UE context retrieval failure)", is reproduced herein as FIG. 6. FIG. 9.2.2.4.1-3 of Section 9.2.2.4.1 of 3GPP TS 38.300 V16.0.0, entitled "Reject from the network, UE attempts to resume a connection", is reproduced herein as FIG. 7.

9 Mobility and State Transitions
9.2.2 Mobility in RRC_INACTIVE
9.2.2.4 State Transitions
9.2.2.4.1 UE Triggered Transition from RRC_INACTIVE to RRC_CONNECTED
The following figure describes the UE triggered transition from RRC_INACTIVE to RRC_CONNECTED in case of UE context retrieval success:

FIG. 9.2.2.4.1-1: UE Triggered Transition from RRC_INACTIVE to RRC_CONNECTED (UE Context Retrieval Success)

1. The UE resumes from RRC_INACTIVE, providing the I-RNTI, allocated by the last serving gNB.
2. The gNB, if able to resolve the gNB identity contained in the I-RNTI, requests the last serving gNB to provide UE Context data.
3. The last serving gNB provides UE context data.
4/5. The gNB and UE completes the resumption of the RRC connection.
   NOTE: User Data can also be sent in step 5 if the grant allows.
6. If loss of DL user data buffered in the last serving gNB shall be prevented, the gNB provides forwarding addresses.
7/8. The gNB performs path switch.
9. The gNB triggers the release of the UE resources at the last serving gNB.

After step 1 above, when the gNB decides to reject the Resume Request and keep the UE in RRC_INACTIVE without any reconfiguration (e.g. as described in the two examples below), or when the gNB decides to setup a new RRC connection, SRB0 (without security) can be used. When the gNB decides to reconfigure the UE (e.g. with a new DRX cycle or RNA) or when the gNB decides to push the UE to RRC_IDLE, SRB1 (with at least integrity protection) shall be used.
   NOTE: SRB1 can only be used once the UE Context is retrieved i.e. after step 3.

The following figure describes the UE triggered transition from RRC_INACTIVE to RRC_CONNECTED in case of UE context retrieval failure:

FIG. 9.2.2.4.1-2: UE Triggered Transition from RRC_INACTIVE to RRC_CONNECTED (UE Context Retrieval Failure)

1. The UE resumes from RRC_INACTIVE, providing the I-RNTI, allocated by the last serving gNB.
2. The gNB, if able to resolve the gNB identity contained in the I-RNTI, requests the last serving gNB to provide UE Context data.
3. The last serving gNB cannot retrieve or verify the UE context data.
4. The last serving gNB indicates the failure to the gNB.
5. The gNB performs a fallback to establish a new RRC connection by sending RRCSetup.
6. A new connection is setup as described in clause 9.2.1.3.1.

The following figure describes the rejection form the network when the UE attempts to resume a connection from RRC_INACTIVE:

FIG. 9.2.2.4.1-3: Reject from the Network, UE Attempts to Resume a Connection

1. UE attempts to resume the connection from RRC_INACTIVE.
2. The gNB is not able to handle the procedure, for instance due to congestion.
3. The gNB sends RRCReject (with a wait time) to keep the UE in RRC_INACTIVE.

Figure 5:
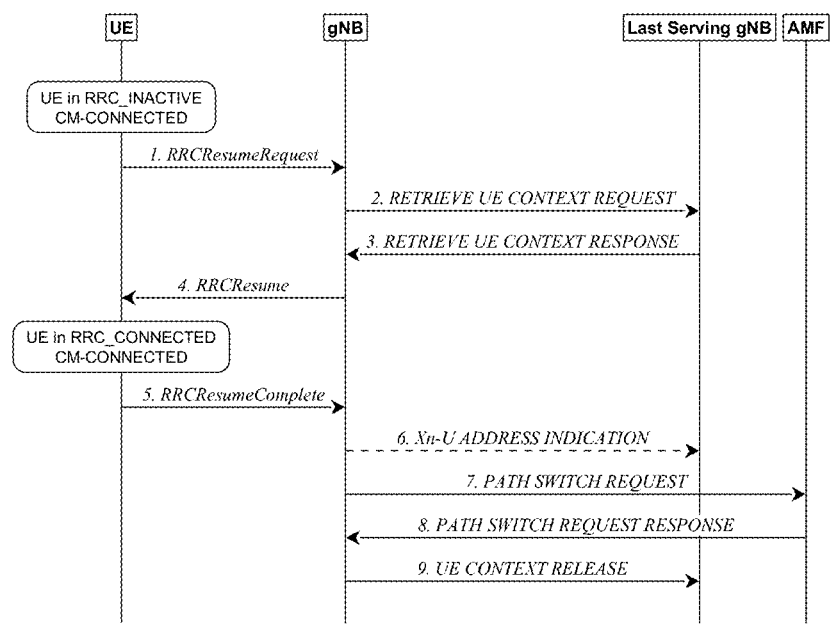
FIG. 5 is a diagram of a transition from RRC_INACTIVE to RRC_CONNECTED according to one exemplary embodiment.
Figure 8:
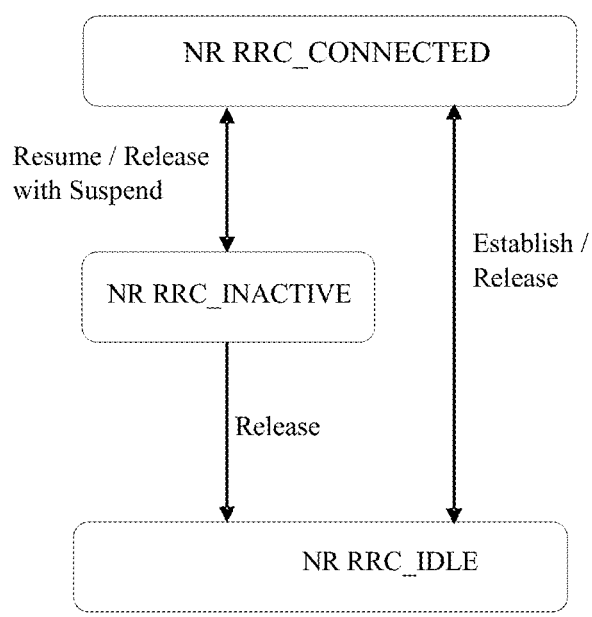
FIG. 8 is a diagram of a UE state machine and/or state transitions according to one exemplary embodiment.
Figure 10:
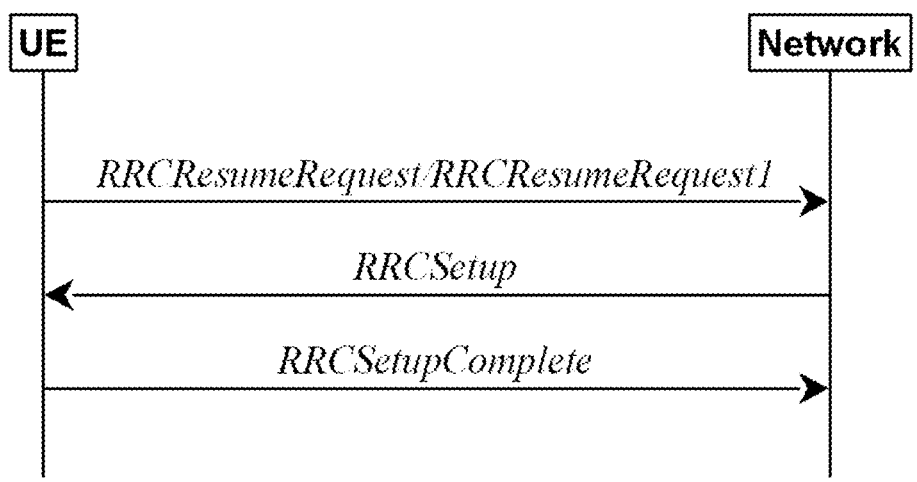
FIG. 10 is a diagram of RRC connection resume according to one exemplary embodiment.
Figure 11:
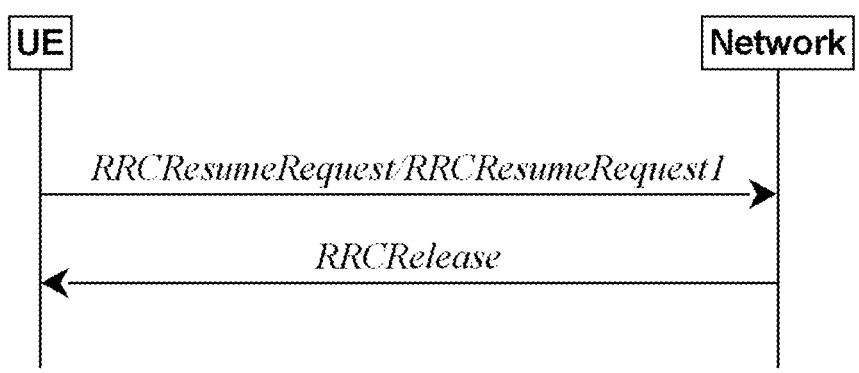
FIG. 11 is a diagram of RRC connection resume according to one exemplary embodiment.

Text related to RRC_INACTIVE state in NR is quoted below from 3GPP TS 38.331 V16.0.0. Notably, FIG. 4.2.1-1 of Section 4.2.1 of 3GPP TS 38.331 V16.0.0, entitled "UE state machine and state transitions in NR", is reproduced herein as FIG. 8. FIG. 5.3.13.1-1 of Section 5.3.13.1 of 3GPP TS 38.331 V16.0.0, entitled "RRC connection resume, successful", is reproduced herein as FIG. 9. FIG. 5.3.13.1-2 of Section 5.3.13.1 of 3GPP TS 38.331 V16.0.0, entitled "RRC connection resume fallback to RRC connection establishment, successful", is reproduced herein as FIG. 10. FIG. 5.3.13.1-3 of Section 5.3.13.1 of 3GPP TS 38.331 V16.0.0, entitled "RRC connection resume followed by network release, successful", is reproduced herein as FIG.

Figure 12:
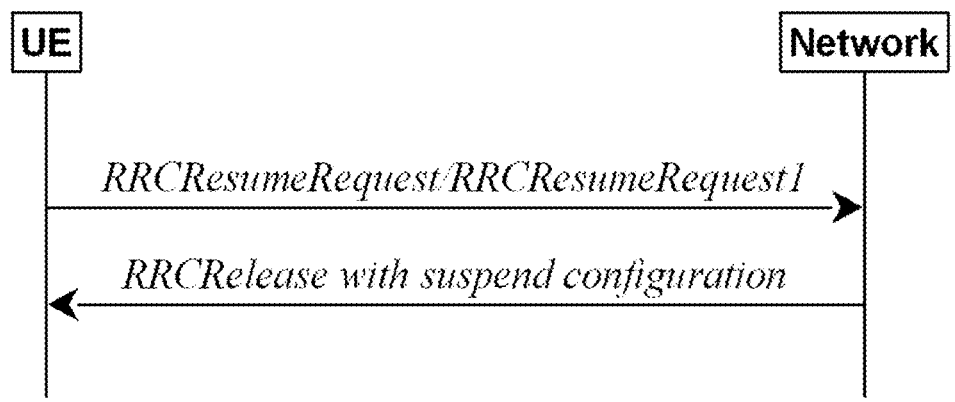
FIG. 12 is a diagram of RRC connection resume according to one exemplary embodiment.
Figure 13:
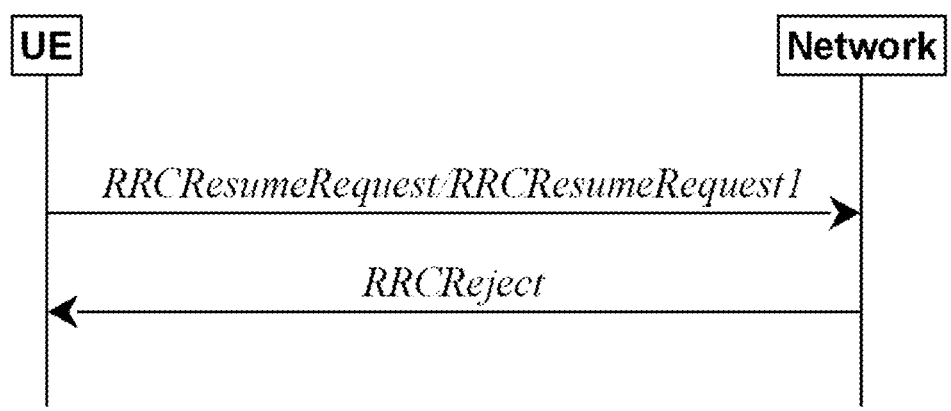
FIG. 13 is a diagram of RRC connection resume according to one exemplary embodiment.

11. FIG. 5.3.13.1-4 of Section 5.3.13.1 of 3GPP TS 38.331 V16.0.0, entitled "RRC connection resume followed by network suspend, successful", is reproduced herein as FIG. 12. FIG. 5.3.13.1-5 of Section 5.3.13.1 of 3GPP TS 38.331 V16.0.0, entitled "RRC connection resume, network reject", is reproduced herein as FIG. 13.

4.2.1 UE States and State Transitions Including Inter RAT

A UE is either in RRC_CONNECTED state or in RRC_INACTIVE state when an RRC connection has been established. If this is not the case, i.e. no RRC connection is established, the UE is in RRC_IDLE state. The RRC states can further be characterised as follows:

RRC_IDLE:
  A UE specific DRX may be configured by upper layers;
  UE controlled mobility based on network configuration;
  The UE:
    Monitors Short Messages transmitted with P-RNTI over DCI (see clause 6.5);
    Monitors a Paging channel for CN paging using 5G-S-TMSI;
    Performs neighbouring cell measurements and cell (re-)selection;
    Acquires system information and can send SI request (if configured).
    Performs logging of available measurements together with location and time for logged measurement configured UEs.

RRC_INACTIVE:
  A UE specific DRX may be configured by upper layers or by RRC layer;
  UE controlled mobility based on network configuration;
  The UE stores the UE Inactive AS context;
  A RAN-based notification area is configured by RRC layer;
  The UE:
    Monitors Short Messages transmitted with P-RNTI over DCI (see clause 6.5);
    Monitors a Paging channel for CN paging using 5G-S-TMSI and RAN paging using full I-RNTI;
    Performs neighbouring cell measurements and cell (re-)selection;
    Performs RAN-based notification area updates periodically and when moving outside the configured RAN-based notification area;
    Acquires system information and can send SI request (if configured).
    Performs logging of available measurements together with location and time for logged measurement configured UEs.

RRC_CONNECTED:
  The UE stores the AS context;
  Transfer of unicast data to/from UE;
  At lower layers, the UE may be configured with a UE specific DRX;
  For UEs supporting CA, use of one or more SCells, aggregated with the SpCell, for increased bandwidth;
  For UEs supporting DC, use of one SCG, aggregated with the MCG, for increased bandwidth;
  Network controlled mobility within NR and to/from E-UTRA;
  The UE:
    Monitors Short Messages transmitted with P-RNTI over DCI (see clause 6.5), if configured;
    Monitors control channels associated with the shared data channel to determine if data is scheduled for it;
    Provides channel quality and feedback information;
    Performs neighbouring cell measurements and measurement reporting;
    Acquires system information.

FIG. 4.2.1-1 illustrates an overview of UE RRC state machine and state transitions in NR. A UE has only one RRC state in NR at one time.

FIG. 4.2.1-1: UE State Machine and State Transitions in NR 5.3 Connection Control
5.3.13 RRC Connection Resume
5.3.13.1 General FIG. 5.3.13.1-1: RRC Connection Resume, Successful FIG. 5.3.13.1-2: RRC Connection Resume Fallback to RRC Connection Establishment, Successful FIG. 5.3.13.1-3: RRC Connection Resume Followed by Network Release, Successful FIG. 5.3.13.1-4: RRC Connection Resume Followed by Network Suspend, Successful FIG. 5.3.13.1-5: RRC Connection Resume, Network Reject The purpose of this procedure is to resume a suspended RRC connection, including resuming SRB(s) and DRB(s) or perform an RNA update.

5.3.13.2 Initiation

The UE initiates the procedure when upper layers or AS (when responding to RAN paging or upon triggering RNA updates while the UE is in RRC_INACTIVE) requests the resume of a suspended RRC connection.

The UE shall ensure having valid and up to date essential system information as specified in clause 5.2.2.2 before initiating this procedure.

Upon initiation of the procedure, the UE shall:
  [ . . . ]
  1> else if the resumption of the RRC connection is triggered by upper layers:
    2> if the upper layers provide an Access Category and one or more Access Identities:
      3> perform the unified access control procedure as specified in 5.3.14 using the Access Category and Access Identities provided by upper layers;
        4> if the access attempt is barred, the procedure ends;
    2> set the resumeCause in accordance with the information received from upper layers;
  [ . . . ]
  1> if the UE is in NE-DC or NR-DC:
    2> if the UE does not support maintaining SCG configuration upon connection resumption:
      3> release the MR-DC related configurations (i.e., as specified in 5.3.5.10) from the UE Inactive AS context, if stored;
  1> if the UE does not support maintaining the MCG SCell configurations upon connection resumption:2> release the MCG SCell(s) from the UE Inactive AS context, if stored;

1> apply the default L1 parameter values as specified in corresponding physical layer specifications, except for the parameters for which values are provided in SIB1;
1> apply the default SRB1 configuration as specified in 9.2.1;
1> apply the default MAC Cell Group configuration as specified in 9.2.2;
1> release delayBudgetReportingConfig from the UE Inactive AS context, if stored;
1> stop timer T342, if running;
1> release overheatingAssistanceConfig from the UE Inactive AS context, if stored;
1> stop timer T345, if running;
1> release idc-AssistanceConfig from the UE Inactive AS context, if stored;
1> release drx-PreferenceConfig from the UE Inactive AS context, if stored;
1> stop timer T346a, if running;
1> release maxBW-PreferenceConfig from the UE Inactive AS context, if stored;
1> stop timer T346b, if running;
1> release maxCC-PreferenceConfig from the UE Inactive AS context, if stored;
1> stop timer T346c, if running;
1> release maxMIMO-LayerPreferenceConfig from the UE Inactive AS context, if stored;
1> stop timer T346d, if running;
1> release minSchedulingOffsetPreferenceConfig from the UE Inactive AS context, if stored;
1> stop timer T346e, if running;
1> release releasePreferenceConfig from the UE Inactive AS context, if stored;
1> stop timer T346f, if running;
1> apply the CCCH configuration as specified in 9.1.1.2;
1> apply the timeAlignmentTimerCommon included in SIB1;
1> start timer T319;
1> set the variable pendingRNA-Update to false;
1> initiate transmission of the RRCResumeRequest message or RRCResumeRequest1 in accordance with 5.3.13.3.

5.3.13.3 Actions Related to Transmission of RRCResumeRequest or RRCResumeRequest1 Message The UE shall set the contents of RRCResumeRequest or RRCResumeRequest1 message as follows:
1> if field useFullResumeID is signalled in SIB1:
    2> select RRCResumeRequest1 as the message to use;
    2> set the resumeIdentity to the stored fullI-RNTI value;
1> else:
    2> select RRCResumeRequest as the message to use;
    2> set the resumeIdentity to the stored shortI-RNTI value;
1> restore the RRC configuration, RoHC state, the stored QoS flow to DRB mapping rules and the $K_{gNB}$ and $K_{RRCint}$ keys from the stored UE Inactive AS context except for the following:
    masterCellGroup;
    mrdc-SecondaryCellGroup, if stored; and
    pdcp-Config;
1> set the resumeMAC-I to the 16 least significant bits of the MAC-I calculated:
    2> over the ASN.1 encoded as per clause 8 (i.e., a multiple of 8 bits) VarResumeMAC-Input;
    2> with the $K_{RRCint}$ key in the UE Inactive AS Context and the previously configured integrity protection algorithm; and
    2> with all input bits for COUNT, BEARER and DIRECTION set to binary ones;
1> derive the $K_{gNB}$ key based on the current $K_{gNB}$ key or the NH, using the stored nextHopChainingCount value, as specified in TS 33.501 [11];
1> derive the $K_{RRCenc}$ key, the $K_{RRCint}$ key, the $K_{UPint}$ key and the $K_{UPenc}$ key;
1> configure lower layers to apply integrity protection for all radio bearers except SRB0 using the configured algorithm and the $K_{RRCint}$ key and $K_{UPint}$ key derived in this subclause immediately, i.e., integrity protection shall be applied to all subsequent messages received and sent by the UE;
NOTE 1: Only DRBs with previously configured UP integrity protection shall resume integrity protection.
1> configure lower layers to apply ciphering for all radio bearers except SRB0 and to apply the configured ciphering algorithm, the $K_{RRCenc}$ key and the $K_{UPenc}$ key derived in this subclause, i.e. the ciphering configuration shall be applied to all subsequent messages received and sent by the UE;
1> re-establish PDCP entities for SRB1;
1> resume SRB1;
1> submit the selected message RRCResumeRequest or RRCResumeRequest1 for transmission to lower layers.
NOTE 2: Only DRBs with previously configured UP ciphering shall resume ciphering.
If lower layers indicate an integrity check failure while T319 is running, perform actions specified in 5.3.13.5.
The UE shall continue cell re-selection related measurements as well as cell re-selection evaluation. If the conditions for cell re-selection are fulfilled, the UE shall perform cell re-selection as specified in 5.3.13.6.

5.3.13.4 Reception of the RRCResume by the UE
The UE shall:
1> stop timer T319; 1> stop timer T380, if running;
1> if T331 is running;
    2> stop timer T331;
    2> perform the actions as specified in 5.7.8.3;
1> if the RRCResume includes the fullConfig:
    2> perform the full configuration procedure as specified in 5.3.5.11;
1> else:
    2> if the RRCResume does not include the restoreMCG-SCells:
        3> release the MCG SCell(s) from the UE Inactive AS context, if stored;
    2> if the RRCResume does not include the restoreSCG:
        3> if the UE is in NE-DC or NR-DC:
            4> release the MR-DC related configurations (i.e., as specified in 5.3.5.10) from the UE Inactive AS context, if stored;
    2> restore the masterCellGroup, mrdc-SecondaryCellGroup, if stored, and pdcp-Config from the UE Inactive AS context;
    2> configure lower layers to consider the restored MCG and SCG SCell(s) (if any) to be in deactivated state;
1> discard the UE Inactive AS context;
1> release the suspendConfig except the ran-NotificationAreaInfo;
1> if the RRCResume includes the masterCellGroup:
    2> perform the cell group configuration for the received masterCellGroup according to 5.3.5.5;
1> if the RRCResume includes the mrdc-SecondaryCellGroup:
    2> if the received mrdc-SecondaryCellGroup is set to nr-SCG:

3> perform the RRC reconfiguration according to 5.3.5.3 for the RRCReconfiguration message included in nr-SCG;
2> if the received mrdc-SecondaryCellGroup is set to eutra-SCG:
3> perform the RRC connection reconfiguration as specified in TS 36.331 [10], clause 5.3.5.3 for the RRCConnectionReconfiguration message included in eutra-SCG;
1> if the RRCResume includes the radioBearerConfig:
2> perform the radio bearer configuration according to 5.3.5.6;
1> if the RRCResume message includes the sk-Counter:
2> perform security key update procedure as specified in 5.3.5.7;
1> if the RRCResume message includes the radioBearer-Config2:
2> perform the radio bearer configuration according to 5.3.5.6;

5.3.13.7 Reception of the RRCSetup by the UE
The UE shall:
1> perform the RRC connection setup procedure as specified in 5.3.3.4.
5.3.13.9 Reception of the RRCRelease by the UE
The UE shall:
1> perform the actions as specified in 5.3.8.
5.3.13.10 Reception of the RRCReject by the UE
The UE shall:
1> perform the actions as specified in 5.3.15.
6.2.2 Message Definitions
RRCResume
The RRCResume message is used to resume the suspended RRC connection.
Signalling radio bearer: SRB1
RLC-SAP: AM
Logical channel: DCCH
Direction: Network to UE
RRCResume message

```
-- ASN1START
-- TAG-RRCRESUME-START
RRCResume ::=                          SEQUENCE {
    rrc-TransactionIdentifier              RRC-TransactionIdentifier,
    criticalExtensions                     CHOICE {
        rrcResume                              RRCResume-IEs,
        criticalExtensionsFuture               SEQUENCE { }
    }
}
RRCResume-IEs ::=                      SEQUENCE {
    radioBearerConfig                      RadioBearerConfig
    OPTIONAL, -- Need M
    masterCellGroup                        OCTET STRING (CONTAINING
    CellGroupConfig) OPTIONAL, -- Need M
    measConfig                             MeasConfig
    OPTIONAL, -- Need M
    fullConfig                             ENUMERATED {true}
    OPTIONAL, -- Need N
    lateNonCriticalExtension               OCTET STRING
    OPTIONAL,
    nonCriticalExtension                   RRCResume-v1560-IEs
    OPTIONAL
}
...
```

1> resume SRB2, SRB3 (if configured), and all DRBs;
1> if stored, discard the cell reselection priority information provided by the cellReselectionPriorities or inherited from another RAT;
1> stop timer T320, if running;
1> if the RRCResume message includes the measConfig:
2> perform the measurement configuration procedure as specified in 5.5.2;
1> resume measurements if suspended;
1> if T390 is running;
2> stop timer T390 for all access categories;
2> perform the actions as specified in 5.3.14.4;
1> if T302 is running;
2> stop timer T302;
2> perform the actions as specified in 5.3.14.4;
1> enter RRC_CONNECTED;
1> indicate to upper layers that the suspended RRC connection has been resumed;
1> stop the cell re-selection procedure;
1> consider the current cell to be the PCell;
[ . . . ]
1> submit the RRCResumeComplete message to lower layers for transmission;
1> the procedure ends.

Figure 14:
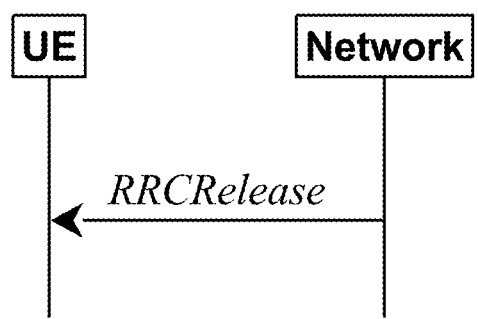
FIG. 14 is a diagram of RRC connection release according to one exemplary embodiment.

Texts related to RRC connection release in NR is quoted below from 3GPP TS 38.331 V16.0.0. Notably, FIG. 5.3.8.1-1 of Section 5.3.8.1 of 3GPP TS 38.331 V16.0.0, entitled "RRC connection release, successful", is reproduced herein as FIG. 14.
5.3.8 RRC Connection Release
5.3.8.1 General
FIG. 5.3.8.1-1: RRC connection release, successful
The purpose of this procedure is:
to release the RRC connection, which includes the release of the established radio bearers as well as all radio resources; or
to suspend the RRC connection only if SRB2 and at least one DRB are setup, which includes the suspension of the established radio bearers.
5.3.8.2 Initiation
The network initiates the RRC connection release procedure to transit a UE in RRC_CONNECTED to RRC_IDLE; or to transit a UE in RRC_CONNECTED to RRC_INACTIVE only if SRB2 and at least one DRB is setup in RRC_CONNECTED; or to transit a UE in RRC_INACTIVE back to RRC_INACTIVE when the UE tries to resume; or to transit a UE in RRC_INACTIVE to RRC_IDLE when the UE tries to resume. The procedure can also be used to release and redirect a UE to another frequency.

5.3.8.3 Reception of the RRCRelease by the UE
The UE shall:
1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> stop timer T316, if running;
1> if the AS security is not activated:
    2> ignore any field included in RRCRelease message except waitTime;
    2> perform the actions upon going to RRC_IDLE as specified in 5.3.11 with the release cause 'other' upon which the procedure ends;
1> if the RRCRelease message includes redirectedCarrierInfo indicating redirection to eutra:
    2> if cnType is included:
        3> after the cell selection, indicate the available CN Type(s) and the received cnType to upper layers;
NOTE 1: Handling the case if the E-UTRA cell selected after the redirection does not support the core network type specified by the cnType, is up to UE implementation.
    2> if voiceFallbackIndication is included:
        3> consider the RRC connection release was for EPS fallback for IMS voice (see TS 23.502 [43]);
1> if the RRCRelease message includes the cellReselectionPriorities:
    2> store the cell reselection priority information provided by the cellReselectionPriorities;
    2> if the t320 is included:
        3> start timer T320, with the timer value set according to the value of t320;
1> else:
    2> apply the cell reselection priority information broadcast in the system information;
1> if deprioritisationReq is included:
    2> start or restart timer T325 with the timer value set to the deprioritisationTimer signalled;
    2> store the deprioritisationReq until T325 expiry;
1> if the RRCRelease includes the measIdleConfig:
    2> if T331 is running:
        3> stop timer T331;
        3> perform the actions as specified in 5.7.8.3;
    2> if the measIdleConfig is set to setup:
        3> store the received measIdleDuration in VarMeasIdleConfig;
        3> start timer T331 with the value of measIdleDuration;
        3> if the measIdleConfig contains measIdleCarrierListNR:
            4> store the received measIdleCarrierListNR in VarMeasIdleConfig;
        3> if the measIdleConfig contains measIdleCarrierListEUTRA:
            4> store the received measIdleCarrierListEUTRA in VarMeasIdleConfig;
        3> if the measIdleConfig contains validityAreaList:
            4> store the received validityAreaList in VarMeasIdleConfig;
        3> start performing idle/inactive measurements as specified in 5.7.8;
1> if the RRCRelease includes suspendConfig:
    2> apply the received suspendConfig;
    2> remove all the entries within VarConditionalConfig, if any;
    2> for each measId, if the associated reportConfig has a reportType set to condTriggerConfig:
        3> for the associated reportConfigId:
            4> remove the entry with the matching reportConfigId from the reportConfigList within the VarMeasConfig;
        3> if the associated measObjectId is only associated to a reportConfig with reportType set to condTriggerConfig:
            4> remove the entry with the matching measObjectId from the measObjectList within the VarMeasConfig;
        3> remove the entry with the matching measId from the measIdList within the VarMeasConfig;
    2> reset MAC and release the default MAC Cell Group configuration, if any;
    2> re-establish RLC entities for SRB1;
    2> if the RRCRelease message with suspendConfig was received in response to an RRCResumeRequest or an RRCResumeRequest1:
        3> stop the timer T319 if running;
        3> in the stored UE Inactive AS context:
            4> replace the $K_{gNB}$ and $K_{RRCint}$ keys with the current $K_{gNB}$ and $K_{RRCint}$ keys;
            4> replace the C-RNTI with the temporary C-RNTI in the cell the UE has received the RRCRelease message;
            4> replace the cellIdentity with the cellIdentity of the cell the UE has received the RRCRelease message;
            4> replace the physical cell identity with the physical cell identity of the cell the UE has received the RRCRelease message;
    2> else:
        3> store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB;
NOTE 2: NR sidelink communication related configurations is not stored as UE Inactive AS Context, when UE enters RRC_INACTIVE.
    2> suspend all SRB(s) and DRB(s), except SRB0;
    2> indicate PDCP suspend to lower layers of all DRBs;
    2> if the t380 is included:
        3> start timer T380, with the timer value set to t380;
    2> if the RRCRelease message is including the waitTime:
        3> start timer T302 with the value set to the waitTime;
        3> inform upper layers that access barring is applicable for all access categories except categories '0' and '2';

2> if T390 is running:
   3> stop timer T390 for all access categories;
   3> perform the actions as specified in 5.3.14.4;
2> indicate the suspension of the RRC connection to upper layers;
2> enter RRC_INACTIVE and perform cell selection as specified in TS 38.304 [20]; Editor's note: It is FFS if IAB node supports INACTIVE mode and if so, if there is a need for the BAP entity to be released/suspended on transition to INACTIVE mode.

1> else
   2> perform the actions upon going to RRC_IDLE as specified in 5.3.11, with the release cause 'other'.

6.2 RRC Messages
RRCRelease
The RRCRelease message is used to command the release of an RRC connection or the suspension of the RRC connection.
Signalling radio bearer: SRB1
RLC-SAP: AM
Logical channel: DCCH
Direction: Network to UE
RRCRelease message

```
-- ASN1START
-- TAG-RRCRELEASE-START
RRCRelease ::=                          SEQUENCE {
    rrc-TransactionIdentifier               RRC-TransactionIdentifier,
    criticalExtensions                      CHOICE {
        rrcRelease                              RRCRelease-IEs,
        criticalExtensionsFuture                SEQUENCE { }
    }
}
RRCRelease-IEs ::=                      SEQUENCE {
    redirectedCarrierInfo                   RedirectedCarrierInfo
OPTIONAL, -- Need N
    cellReselectionPriorities               CellReselectionpriorities
OPTIONAL, -- Need R
    suspendConfig                           SuspendConfig
OPTIONAL, -- Need R
    deprioritisationReq                     SEQUENCE {
        deprioritisationType                    ENUMERATED {frequency, nr},
        deprioritisationTimer                   ENUMERATED {min5, min10, min15, min30}
    }
OPTIONAL, -- Need N
    lateNonCriticalExtension                OCTET STRING
OPTIONAL,
    nonCriticalExtension                    RRCRelease-v1540-IEs
OPTIONAL
}
(...)
SuspendConfig ::=                       SEQUENCE {
    fullI-RNTI                              I-RNTI-Value,
    shortI-RNTI                             ShortI-RNTI-Value,
    ran-PagingCycle                         PagingCycle,
    ran-NotificationAreaInfo                RAN-NotificationAreaInfo
OPTIONAL, -- Need M
    t380                                    PeriodicRNAU-TimerValue
OPTIONAL, -- Need R
    nextHopChainingCount                    NextHopChainingCount,
    ...
}
(...)
```

| RRCRelease-IEs field descriptions |
| --- |
| cnType |
| Indicate that the UE is redirected to EPC or 5GC. |
| deprioritisationReq |
| Indicates whether the current frequency or RAT is to be de-prioritised. |
| deprioritisationTimer |
| Indicates the period for which either the current carrier frequency or NR is deprioritised. Value minN corresponds to N minutes. |
| measIdleConfig |
| Indicates measurement configuration to be stored and used by the UE while in RRC_IDLE or RRC_INACTIVE. |

| RRCRelease-IEs field descriptions |
| --- |
| suspendConfig |
| Indicates configuration for the RRC_INACTIVE state. The network does not configure suspendConfig when the network redirect the UE to an inter-RAT carrier frequency. |
| redirectedCarrierInfo |
| Indicates a carrier frequency (downlink for FDD) and is used to redirect the UE to an NR or an inter-RAT carrier frequency, by means of cell selection at transition to RRC_IDLE or RRC_INACTIVE as specified in TS 38.304 [20]. In this release of specification, redirectedCarrierInfo is not included in an RRCRelease message with suspendConfig if this message is in response to an RRCResumeRequest or an RRCResumeRequest1 which is triggered by the NAS layer. |
| voiceFallbackIndication |
| Indicates the RRC release is triggered by EPS fallback for IMS voice as specified in TS 23.502 [43]. |

| SuspendConfig field descriptions |
| --- |
| ran-NotificationAreaInfo |
| Network ensures that the UE in RRC_INACTIVE always has a valid ran-NotificationAreaInfo. |
| ran-PagingCycle |
| Refers to the UE specific cycle for RAN-initiated paging. Value rf32 corresponds to 32 radio frames, value rf64 corresponds to 64 radio frames and so on. |
| t380 |
| Refers to the timer that triggers the periodic RNAU procedure in UE. Value min 5 corresponds to 5 minutes, value min 10 corresponds to 10 minutes and so on. |

Text related to NR small data transmissions in INACTIVE state is quoted below from RP-193252.

3 Justification

NR supports RRC_INACTIVE state and UEs with infrequent (periodic and/or non-periodic) data transmission are generally maintained by the network in the RRC_INACTIVE state. Until Rel-16, the RRC_INACTIVE state doesn't support data transmission. Hence, the UE has to resume the connection (i.e. move to RRC_CONNECTED state) for any DL (MT) and UL (MO) data. Connection setup and subsequently release to INACTIVE state happens for each data transmission however small and infrequent the data packets are. This results in unnecessary power consumption and signalling overhead.

Specific examples of small and infrequent data traffic include the following use cases:
  Smartphone applications:
    Traffic from Instant Messaging services (whatsapp, QQ, wechat etc)
    Heart-beat/keep-alive traffic from IM/email clients and other apps
    Push notifications from various applications
  Non-smartphone applications:
    Traffic from wearables (periodic positioning information etc)
    sensors (Industrial Wireless Sensor Networks transmitting temperature, pressure readings periodically or in an event triggered manner etc)
    smart meters and smart meter networks sending periodic meter readings As noted in 3GPP TS 22.891, the NR system shall:
  be efficient and flexible for low throughput short data bursts
  support efficient signalling mechanisms (e.g. signalling is less than payload)
  reduce signalling overhead in general Signalling overhead from INACTIVE state UEs for small data packets is a general problem and will become a critical issue with more UEs in NR not only for network performance and efficiency but also for the UE battery performance. In general, any device that has intermittent small data packets in INACTIVE state will benefit from enabling small data transmission in INACTIVE.

The key enablers for small data transmission in NR, namely the INACTIVE state, 2-step, 4-step RACH and configured grant type-1 have already been specified as part of Rel-15 and Rel-16. So, this work builds on these building blocks to enable small data transmission in INACTIVE state for NR.

4 Objective 4.1 Objective of SI or Core Part WI or Testing Part WI

This work item enables small data transmission in RRC_INACTIVE state as follows:
  For the RRC_INACTIVE state:
    UL small data transmissions for RACH-based schemes (i.e. 2-step and 4-step RACH):
      General procedure to enable UP data transmission for small data packets from INACTIVE state (e.g. using MSGA or MSG3) [RAN2]
      Enable flexible payload sizes larger than the Rel-16 CCCH message size that is possible currently for INACTIVE state for MSGA and MSG3 to support UP data transmission in UL (actual payload size can be up to network configuration) [RAN2]
      Context fetch and data forwarding (with and without anchor relocation) in INACTIVE state for RACH-based solutions [RAN2, RAN3]
      Note 1: The security aspects of the above solutions should be checked with SA3
    Transmission of UL data on pre-configured PUSCH resources (i.e. reusing the configured grant type 1)—when TA is valid
      General procedure for small data transmission over configured grant type 1 resources from INACTIVE state [RAN2]
      Configuration of the configured grant type1 resources for small data transmission in UL for INACTIVE state [RAN2]

No new RRC state should be introduced in this WID. Transmission of smalldata in UL, subsequent transmission of smalldata in UL and DL and the state transition decisions should be under network control.

Focus of the WID should be on licensed carriers and the solutions can be reused for NR-U if applicable.

Note 2: Any associated specification work in RAN1 that is needed to support the above set of objectives should be initiated by RAN2 via an LS.

Figure 15:
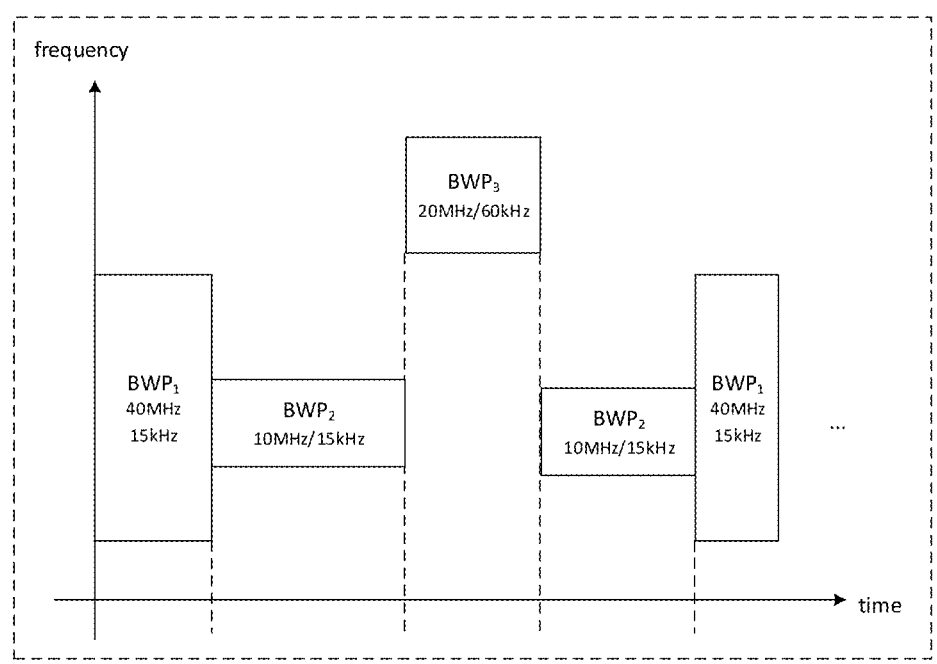
FIG. 15 is a diagram of Bandwidth Adaption according to one exemplary embodiment.

Text related to Bandwidth Part (BWP) in NR is quoted below from 3GPP TS 38.300 V16.0.0. Notably, FIGS. 6.10-1 of Section 6.10 of 3GPP TS 38.300 V16.0.0, entitled "BA Example", is reproduced herein as FIG. 15.

6.10 Bandwidth Adaptation

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

Figure 6:
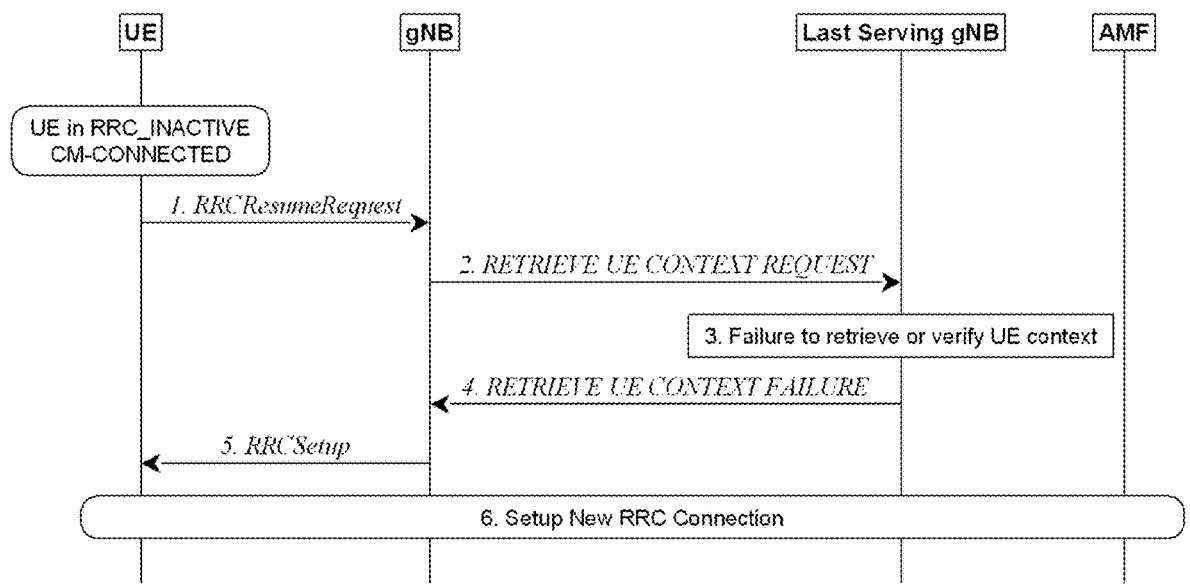
FIG. 6 is a diagram of a transition from RRC_INACTIVE to RRC_CONNECTED according to one exemplary embodiment.
Figure 7:
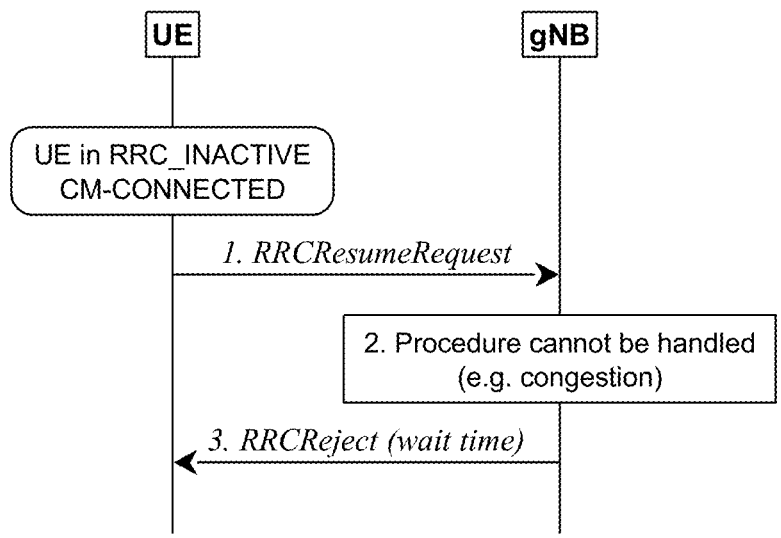
FIG. 7 is a diagram illustrating an exemplary scenario in which a UE receives a rejection from a network according to one exemplary embodiment.

FIGS. 6.10-1 below describes a scenario where 3 different BWPs are configured:

BWP$_1$ with a width of 40 MHz and subcarrier spacing of 15 kHz;

BWP$_2$ with a width of 10 MHz and subcarrier spacing of 15 kHz;

BWP$_3$ with a width of 20 MHz and subcarrier spacing of 60 kHz.

FIGS. 6.10-1: BA Example 7.8 Bandwidth Adaptation

To enable BA on the PCell, the gNB configures the UE with UL and DL BWP(s). To enable BA on SCells in case of CA, the gNB configures the UE with DL BWP(s) at least (i.e. there may be none in the UL). For the PCell, the initial BWP is the BWP used for initial access. For the SCell(s), the initial BWP is the BWP configured for the UE to first operate at SCell activation.

In paired spectrum, DL and UL can switch BWP independently. In unpaired spectrum, DL and UL switch BWP simultaneously. Switching between configured BWPs happens by means of RRC signalling, DCI, inactivity timer or upon initiation of random access. When an inactivity timer is configured for a serving cell, the expiry of the inactivity timer associated to that cell switches the active BWP to a default BWP configured by the network. There can be at most one active BWP per cell, except when the serving cell is configured with SUL, in which case there can be at most one on each UL carrier.

Text related to Bandwidth Part (BWP) in NR is quoted below from 3GPP TS 38.321 V16.0.0.

5.15 Bandwidth Part (BWP) Operation 5.15.1 Downlink and Uplink

In addition to clause 12 of TS 38.213 [6], this clause specifies requirements on BWP operation.

A Serving Cell may be configured with one or multiple BWPs, and the maximum number of BWP per Serving Cell is specified in TS 38.213 [6].

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure or upon detection of consistent LBT failure on SpCell. Upon RRC (re-)configuration of firstActiveDownlinkBWP-Id and/or firstActive UplinkBWP-Id for SpCell or activation of an SCell, the DL BWP and/or UL BWP indicated by firstActiveDownlinkBWP-Id and/or firstActiveUplinkBWP-Id respectively (as specified in TS 38.331 [5]) is active without receiving PDCCH indicating a downlink assignment or an uplink grant. The active BWP for a Serving Cell is indicated by either RRC or PDCCH (as specified in TS 38.213 [6]). For unpaired spectrum, a DL BWP is paired with a UL BWP, and BWP switching is common for both UL and DL.

Entering or leaving dormant BWP is done by BWP switching. It is controlled per SCell or per dormancy SCell group by the PDCCH (as specified in TS 38.212 [9]). The dormancy SCell group configuration indicated by dormancySCellGroups and dormant BWP configuration for one SCell indicated by dormantDownlinkBWP-Id are configured by RRC signalling as described in TS 38.331 [5]. Upon reception of the PDCCH indicating leaving dormant BWP from SpCell outside active time, the DL BWP indicated by firstOutsideActiveTimeBWP-Id (as specified in TS 38.331 [5]) is activated. Upon reception of the PDCCH indicating leaving dormant BWP from SpCell within active time, the DL BWP indicated by firstWithinActiveTimeBWP-Id (as specified in TS 38.331 [5]) is activated. Upon reception of the PDCCH indicating entering dormant BWP, the DL BWP indicated by dormantDownlinkBWP-Id (as specified in TS 38.331 [5]) is activated. The dormant BWP configuration for SpCell or PUCCH SCell is not supported.

For each activated Serving Cell configured with a BWP, the MAC entity shall:

1> if a BWP is activated and it is not the dormant BWP:
   2> transmit on UL-SCH on the BWP;
   2> transmit on RACH on the BWP, if PRACH occasions are configured;
   2> monitor the PDCCH on the BWP;
   2> transmit PUCCH on the BWP, if configured;
   2> report CSI for the BWP;
   2> transmit SRS on the BWP, if configured;
   2> receive DL-SCH on the BWP;
   2> (re-)initialize any suspended configured uplink grants of configured grant Type 1 on the active BWP according to the stored configuration, if any, and to start in the symbol according to rules in clause 5.8.2;
   2> if consistent LBT failure recovery is configured:
     3> stop the lbt-FailureDetectionTimer, if running;
     3> set LBT COUNTER to 0;
     3> monitor LBT failure indications from lower layers as specified in clause 5.21.2.

[ . . . ]

1> if a BWP is deactivated:
   2> not transmit on UL-SCH on the BWP;
   2> not transmit on RACH on the BWP;
   2> not monitor the PDCCH on the BWP;
   2> not transmit PUCCH on the BWP;
   2> not report CSI for the BWP;
   2> not transmit SRS on the BWP;
   2> not receive DL-SCH on the BWP;
   2> clear any configured downlink assignment and configured uplink grant of configured grant Type 2 on the BWP;
   2> suspend any configured uplink grant of configured grant Type 1 on the inactive BWP.

Upon initiation of the Random Access procedure on a Serving Cell, after the selection of carrier for performing Random Access procedure as specified in clause 5.1.1, the MAC entity shall for the selected carrier of this Serving Cell:

1> if PRACH occasions are not configured for the active UL BWP:
  2> switch the active UL BWP to BWP indicated by initialUplinkBWP;
  2> if the Serving Cell is an SpCell:
    3> switch the active DL BWP to BWP indicated by initialDownlinkBWP.
1> else:
  2> if the Serving Cell is an SpCell:
    3> if the active DL BWP does not have the same bwp-Id as the active UL BWP:
      4> switch the active DL BWP to the DL BWP with the same bwp-Id as the active UL BWP.
1> stop the bwp-InactivityTimer associated with the active DL BWP of this Serving Cell, if running
1> if the Serving Cell is SCell:
  2> stop the bwp-InactivityTimer associated with the active DL BWP of SpCell, if running
1> perform the Random Access procedure on the active DL BWP of SpCell and active UL BWP of this Serving Cell.

If the MAC entity receives a PDCCH for BWP switching of a Serving Cell, the MAC entity shall:
  1> if there is no ongoing Random Access procedure associated with this Serving Cell; or
  1> if the ongoing Random Access procedure associated with this Serving Cell is successfully completed upon reception of this PDCCH addressed to C-RNTI (as specified in clauses 5.1.4, 5.1.4a, and 5.1.5):
    2> cancel, if any, triggered consistent LBT failure for this Serving Cell;
    2> perform BWP switching to a BWP indicated by the PDCCH.

If the MAC entity receives a PDCCH for BWP switching for a Serving Cell(s) or a dormancy SCell group(s) while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in clauses 5.1.4, 5.1.4a, and 5.1.5) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell.

[ . . . ]

The MAC entity shall for each activated Serving Cell configured with bwp-InactivityTimer:
  1> if the defaultDownlinkBWP-Id is configured, and the active DL BWP is not the BWP indicated by the defaultDownlinkBWP-Id, and the active DL BWP is not the BWP indicated by the dormantDownlinkBWP-Id if configured; or
  1> if the defaultDownlinkBWP-Id is not configured, and the active DL BWP is not the initialDownlinkBWP, and the active DL BWP is not the BWP indicated by the dormantDownlinkBWP-Id if configured:
    2> if a PDCCH addressed to C-RNTI or CS-RNTI indicating downlink assignment or uplink grant is received on the active BWP; or
    2> if a PDCCH addressed to C-RNTI or CS-RNTI indicating downlink assignment or uplink grant is received for the active BWP; or
    2> if a MAC PDU is transmitted in a configured uplink grant or received in a configured downlink assignment:
      3> if there is no ongoing Random Access procedure associated with this Serving Cell; or
      3> if the ongoing Random Access procedure associated with this Serving Cell is successfully completed upon reception of this PDCCH addressed to C-RNTI (as specified in clauses 5.1.4, 5.1.4a and 5.1.5):
        4> start or restart the bwp-InactivityTimer associated with the active DL BWP.
    2> if the bwp-InactivityTimer associated with the active DL BWP expires:
      3> if the defaultDownlinkBWP-Id is configured:
        4> perform BWP switching to a BWP indicated by the defaultDownlinkBWP-Id.
      3> else:
        4> perform BWP switching to the initialDownlinkBWP.

NOTE: If a Random Access procedure is initiated on an SCell, both this SCell and the SpCell are associated with this Random Access procedure.

1> if a PDCCH for BWP switching is received, and the MAC entity switches the active DL BWP:
  2> if the defaultDownlinkBWP-Id is configured, and the MAC entity switches to the DL BWP which is not indicated by the defaultDownlinkBWP-Id and is not indicated by the dormantDownlinkBWP-Id if configured; or
  2> if the defaultDownlinkBWP-Id is not configured, and the MAC entity switches to the DL BWP which is not the initialDownlinkBWP and is not indicated by the dormantDownlinkBWP-Id if configured:
    3> start or restart the bwp-InactivityTimer associated with the active DL BWP.

Text related to Bandwidth Part (BWP) in NR is quoted below from 3GPP TS 38.331 V16.0.0.

6.3.2 Radio Resource Control Information Elements
CellGroupConfig

The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

CellGroupConfig Information Element

```
-- ASN1START
-- TAG-CELLGROUPCONFIG-START
-- Configuration of one Cell-Group:
CellGroupConfig ::=                    SEQUENCE {
    cellGroupId                            CellGroupId,
    rlc-BearerToAddModList                 SEQUENCE
```

```
         (SIZE(1..maxLC-ID)) OF RLC-BearerConfig             OPTIONAL,
-- Need N
         rlc-BearerToReleaseList                             SEQUENCE
(SIZE(1..maxLC-ID)) OF LogicalChannelIdentity               OPTIONAL,
-- Need N
         mac-CellGroupConfig                                 MAC-CellGroupConfig
OPTIONAL, -- Need M
         physicalCellGroupConfig                             PhysicalCellGroupConfig
OPTIONAL, -- Need M
         spCellConfig                                        SpCellConfig
OPTIONAL, -- Need M
         ...
}
...
-- Serving cell specific MAC and PHY parameters for a SpCell:
SpCellConfig ::=                                             SEQUENCE {
         servCellIndex                                       ServCellIndex
OPTIONAL, -- Cond SCG
         reconfigurationWithSync                             ReconfigurationWithSync
OPTIONAL, -- Cond ReconfWithSync
         rlf-TimersAndConstants                              SetupRelease { RLF-
TimersAndConstants }                                         OPTIONAL, -- Need M
         rlmInSyncOutOfSyncThreshold                         ENUMERATED {n1}
OPTIONAL, -- Need S
         spCellConfigDedicated                               ServingCellConfig
OPTIONAL, -- Need M
         ...
}
```

ServingCellConfig

The IE ServingCellConfig is used to configure (add or modify) the UE with a serving cell, which may be the SpCell or an SCell of an MCG or SCG. The parameters herein are mostly UE specific but partly also cell specific (e.g. in additionally configured bandwidth parts). Reconfiguration between a PUCCH and PUCCHless SCell is only supported using an SCell release and add.

ServingCellConfig Information Element

```
-- ASN1START
-- TAG-SERVINGCELLCONFIG-START
ServingCellConfig ::=                                        SEQUENCE {
         tdd-UL-DL-ConfigurationDedicated                    TDD-UL-DL-ConfigDedicated
OPTIONAL, -- Cond TDD
         initialDownlinkBWP                                  BWP-DownlinkDedicated
OPTIONAL, -- Need M
         downlinkBWP-ToReleaseList                           SEQUENCE (SIZE
(1..maxNrofBWPs)) OF BWP-Id                                  OPTIONAL, -- Need N
         downlinkBWP-ToAddModList                            SEQUENCE (SIZE
(1..maxNrofBWPs)) OF BWP-Downlink                            OPTIONAL, -- Need N
         firstActiveDownlinkBWP-Id                           BWP-Id
OPTIONAL, -- Cond SyncAndCellAdd
         bwp-InactivityTimer                                 ENUMERATED {ms2, ms3, ms4,
ms5, ms6, ms8, ms10, ms20, ms30,
                                                                      ms40,ms50, ms60,
ms80,ms100, ms200,ms300, ms500,
                                                                      ms750, ms1280,
ms1920, ms2560, spare10, spare9, spare8, spare7, spare6, spare5,
spare4, spare3, spare2, spare1 }                             OPTIONAL, --Need R
         defaultDownlinkBWP-Id                               BWP-Id
OPTIONAL, -- Need S
         uplinkConfig                                        UplinkConfig
OPTIONAL, -- Need M
         supplementaryUplink                                 UplinkConfig
OPTIONAL, -- Need M
         ...
}
UplinkConfig ::=                                             SEQUENCE {
         initialUplinkBWP                                    BWP-UplinkDeducated
OPTIONAL, -- Need M
         uplinkBWP-ToReleaseList                             SEQUENCE (SIZE
(1..maxNrofBWPs)) OF BWP-Id                                  OPTIONAL, -- Need N
         uplinkBWP-ToAddModList                              SEQUENCE (SIZE
```

```
(1..maxNrofBWPs)) OF BWP-Uplink         OPTIONAL, -- Need N
    firstActiveUplinkBWP-Id                 BWP-Id
OPTIONAL, -- Cond SyncAndCellAdd
    ...
}
```

ServingCellConfigCommonSIB

The IE ServingCellConfigCommonSIB is used to configure cell specific parameters of a UE's serving cell in SIB 1.

ServingCellConfigCommonSIB Information Element

```
-- ASN1START
-- TAG-SERVINGCELLCONFIGCOMMONSIB-START
ServingCellConfigCommonSIB ::=    SEQUENCE {
    downlinkConfigCommon          DownlinkConfigCommonSIB,
    uplinkConfigCommon            UplinkConfigCommonSIB
OPTIONAL, -- Need R
    supplementaryUplink           UplinkConfigCommonSIB
OPTIONAL, -- Need R
...
```

DownlinkConfigCommonSIB

The IE DownlinkConfigCommonSIB provides common downlink parameters of a cell.

DownlinkConfigCommonSIB Information Element

```
-- ASN1START
-- TAG-DOWNLINKCONFIGCOMMONSIB-START
DownlinkConfigCommonSIB ::=    SEQUENCE {
    frequencyInfoDL              FrequencyInfoDL-SIB,
    initialDownlinkBWP           BWP-DownlinkCommon,
    ...
```

UplinkConfigCommonSIB

The IE UplinkConfigCommonSIB provides common uplink parameters of a cell.

UplinkConfigCommonSIB information element

```
-- ASN1START
-- TAG-UPLINKCONFIGCOMMONSIB-START
UplinkConfigCommonSIB ::=    SEQUENCE {
    frequencyInfoUL              FrequencyInfoUL-SIB,
    initialUplinkBWP             BWP-UplinkCommon,
    timeAlignmentTimerCommon     TimeAlignmentTimer
}
-- TAG-UPLINKCONFIGCOMMONSIB-STOP
-- ASN1STOP
```

BWP

The IE BWP is used to configure generic parameters of a bandwidth part as defined in TS 38.211 [16], clause 4.5, and TS 38.213 [13], clause 12.

For each serving cell the network configures at least an initial downlink bandwidth part and one (if the serving cell is configured with an uplink) or two (if using supplementary uplink (SUL)) initial uplink bandwidth parts. Furthermore, the network may configure additional uplink and downlink bandwidth parts for a serving cell.

The uplink and downlink bandwidth part configurations are divided into common and dedicated parameters.

BWP Information Element

```
-- ASN1START
-- TAG-BWP-START
BWP ::=                         SEQUENCE {
    locationAndBandwidth        INTEGER (0..37949),
    subcarrierSpacing           SubcarrierSpacing,
    cyclicPrefix                ENUMERATED { extended }
OPTIONAL -- Need R
}
-- TAG-BWP-STOP
-- ASN1STOP
```

| BWP field descriptions |
|---|
| cyclicPrefix |
| Indicates whether to use the extended cyclic prefix for this bandwidth part. If not set, the UE uses the normal cyclic prefix. Normal CP is supported for all subcarrier spacings and slot formats. Extended CP is supported only for 60 kHz subcarrier spacing. (see TS 38.211 [16], clause 4.2) |
| locationAndBandwidth |
| Frequency domain location and bandwidth of this bandwidth part. The value of the field shall be interpreted as resource indicator value (RIV) as defined TS 38.214 [19] with assumptions as described in TS 38.213 [13], clause 12, i.e. setting $N_{BWP}^{size}$ = 275. The first PRB is a PRB determined by subcarrierSpacing of this BWP and offsetToCarrier (configured in SCS-SpecificCarrier contained within FrequencyInfoDL/FrequencyInfoUL/FrequencyInfoUL-SIB/FrequencyInfoDL-SIB within ServingCellConfigCommon/ServingCellConfigCommonSIB) corresponding to this subcarrier spacing. In case of TDD, a BWP-pair (UL BWP and DL BWP with the same bwp-Id) must have the same center frequency (see TS 38.213 [13], clause 12) |
| subcarrierSpacing |
| Subcarrier spacing to be used in this BWP for all channels and reference signals unless explicitly configured elsewhere. Corresponds to subcarrier spacing according to TS 38.211 [16], table 4.2-1. The value kHz 15 corresponds to $\mu$ = 0, value kHz 30 corresponds to $\mu$ = 1, and so on. |

| BWP field descriptions |
|---|
| Only the values 15 kHz, 30 kHz, or 60 kHz (FR1), and 60 kHz or 120 kHz (FR2) are applicable. For the initial DL BWP this field has the same value as the field subCarrierSpacingCommon in MIB of the same serving cell. |

BWP-Downlink
The IE BWP-Downlink is used to configure an additional downlink bandwidth part (not for the initial BWP).

BWP-Downlink Information Element

```
-- ASN1START
-- TAG-BWP-DOWNLINK-START
BWP-Downlink ::=         SEQUENCE {
    bwp-Id               BWP-Id,
    bwp-Common           BWP-DownlinkCommon
OPTIONAL, -- Cond SetupOtherBWP
    bwp-Dedicated        BWP-DownlinkDedicated
OPTIONAL, -- Cond SetupOtherBWP
    ...
}
-- TAG-BWP-DOWNLINK-STOP
-- ASN1STOP
```

| BWP-Downlink field descriptions |
|---|
| bwp-Id |
| An identifier for this bandwidth part. Other parts of the RRC configuration use the BWP-Id to associate themselves with a particular bandwidth part. The network configures the BWPs with consecutive IDs from 1. The Network does not include the value 0, since value 0 is reserved for the initial BWP. |

| Conditional Presence | Explanation |
|---|---|
| SetupOtherBWP | The field is mandatory present upon configuration of a new DL BWP. The field is optionally present, Need M, otherwise. |

BWP-DownlinkCommon
The IE BWP-DownlinkCommon is Used to Configure the Common Parameters of a Downlink BWP. They are "cell specific" and the network ensures the necessary alignment with corresponding parameters of other UEs. The common parameters of the initial bandwidth part of the PCell are also provided via system information. For all other serving cells, the network provides the common parameters via dedicated signalling.

BWP-DownlinkCommon Information Element

```
-- ASN1START
-- TAG-BWP-DOWNLINKCOMMON-START
BWP-DownlinkCommon ::=        SEQUENCE {
    genericParameters         BWP,
    pdcch-ConfigCommon        SetupRelease { PDCCH-ConfigCommon }
                              OPTIONAL, -- Need M
    pdsch-ConfigCommon        SetupRelease { PDSCH-ConfigCommon }
                              OPTIONAL, -- Need M
    ...
}
```

BWP-DownlinkDedicated
The IE BWP-DownlinkDedicated is used to configure the dedicated (UE specific) parameters of a downlink BWP.

BWP-DownlinkDedicated Information Element

```
-- ASN1START
-- TAG-BWP-DOWNLINKDEDICATED-START
BWP-DownlinkDedicated ::=    SEQUENCE {
    pdcch-Config             SetupRelease { PDCCH-Config }
                             OPTIONAL, -- Need M
    pdsch-Config             SetupRelease { PDSCH-Config }
                             OPTIONAL, -- Need M
    sps-Config               SetupRelease { SPS-Config }
                             OPTIONAL, -- Need M
    radioLinkMonitoringConfig  SetupRelease { RadioLinkMonitoringConfig }
                             OPTIONAL, -- Need M
    ...,
```

BWP-Uplink
The IE BWP-Uplink is used to configure an additional uplink bandwidth part (not for the initial BWP).

BWP-Uplink Information Element

```
-- ASN1START
-- TAG-BWP-UPLINK-START
BWP-Uplink ::=           SEQUENCE {
    bwp-Id               BWP-Id,
    bwp-Common           BWP-UplinkCommon
OPTIONAL, -- Cond SetupOtherBWP
    bwp-Dedicated        BWP-UplinkDedicated
OPTIONAL, -- Cond SetupOtherBWP
    ...
}
-- TAG-BWP-UPLINK-STOP
-- ASN1STOP
```

| BWP-Uplink field descriptions |
| --- |
| bwp-Id |
| An identifier for this bandwidth part. Other parts of the RRC configuration use the BWP-Id to associate themselves with a particular bandwidth part. <br> The network configures the BWPs with consecutive IDs from 1. The Network does not include the value 0, since value 0 is reserved for the initial BWP. |

| Conditional Presence | Explanation |
| --- | --- |
| SetupOtherBWP | The field is mandatory present upon configuration of a new UL BWP. The field is optionally present, Need M, otherwise. |

BWP-UplinkCommon

The IE BWP-UplinkCommon is used to configure the common parameters of an uplink BWP. They are "cell specific" and the network ensures the necessary alignment with corresponding parameters of other UEs. The common parameters of the initial bandwidth part of the PCell are also provided via system information. For all other serving cells, the network provides the common parameters via dedicated signalling.

BWP-UplinkCommon Information Element

```
-- ASN1START
-- TAG-BWP-UPLINKCOMMON-START
BWP-UplinkCommon ::=                    SEQUENCE {
    genericParameters                       BWP,
    rach-ConfigCommon                       SetupRelease { RACH-ConfigCommon }      OPTIONAL, -- Need M
    pusch-ConfigCommon                      SetupRelease { PUSCH-ConfigCommon }     OPTIONAL, -- Need M
    pucch-ConfigCommon                      SetupRelease { PUCCH-ConfigCommon }     OPTIONAL, -- Need M
    ...,
    [[
    rach-ConfigCommonIAB-r16                SetupRelease { RACH-ConfigCommonIAB-r16 }   OPTIONAL, -- Need M
    useInterlacePUCCH-PUSCH-r16             ENUMERATED {enabled}    OPTIONAL, -- Need M
    rach-ConfigCommonTwoStepRA-r16          SetupRelease { RACH-ConfigCommonTwoStepRA-r16 }   OPTIONAL, -- Need M
    msgA-PUSCH-Config-r16                   SetupRelease { MsgA-PUSCH-Config-r16 }  OPTIONAL -- Need M
    ]]
}
-- TAG-BWP-UPLINKCOMMON-STOP
-- ASN1STOP
```

| BWP-UplinkCommon field descriptions |
| --- |
| msgA-PUSCH-Config |
| Configuration of cell-specific MsgA PUSCH parameters which the UE uses for contention-based MsgA PUSCH transmission of this BWP. |
| rach-ConfigCommon |
| Configuration of cell specific random access parameters which the UE uses for contention based and contention free random access as well as for contention based beam failure recovery in this BWP. The NW configures SSB-based RA (and hence RACH-ConfigCommon) only for UL BWPs if the linked DL BWPs (same bwp-Id as UL-BWP) are the initial DL BWPs or DL BWPs containing the SSB associated to the initial DL BWP. The network configures rach-ConfigCommon, whenever it configures contention free random access (for reconfiguration with sync or for beam failure recovery). |
| rach-ConfigCommonIAB |
| Configuration of cell specific random access parameters for the IAB-MT. |
| rach-ConfigCommonTwoStepRA |
| Configuration of cell specific random access parameters which the UE uses for contention based and contention free 2-step random access type procedure as well as for 2-step RA type contention based beam failure recovery in this BWP. The NW configures SSB-based RA (and hence RACH-ConfigCommonTwoStepRA) only for UL BWPs if the linked DL BWPs (same bwp-Id as UL-BWP) are the initial DL BWPs or DL BWPs containing the SSB associated to the initial |

| BWP-UplinkCommon field descriptions |
| --- |
| BL BWP. The network configures rach-ConfigCommonTwoStepRA whenever it configures CFRA with 2-step type (for reconfiguration with sync). |

BWP-UplinkDedicated

The IE BWP-UplinkDedicated is used to configure the dedicated (UE specific) parameters of an uplink BWP.

BWP-UplinkDedicated Information Element

```
-- ASN1START
-- TAG-BWP-UPLINKDEDICATED-START
BWP-UplinkDedicated ::=          SEQUENCE {
    pucch-Config                     SetupRelease { PUCCH-Config }
OPTIONAL, -- Need M
    pusch-Config                     SetupRelease { PUSCH-Config }
OPTIONAL, -- Need M
    configuredGrantConfig            SetupRelease {
ConfiguredGrantConfig }          OPTIONAL, -- Need M
    srs-Config                       SetupRelease { SRS-Config }
OPTIONAL, -- Need M
    beamFailureRecoveryConfig        SetupRelease {
BeamFailureRecoveryConfig }      OPTIONAL, -- Cond SpCellOnly
    ...,
```

RRC_INACTIVE state was introduced for UEs with infrequent data transmission. When there is no data transmission, the UE may be put into RRC_INACTIVE state for reducing power consumption (e.g., a Radio Resource Control (RRC) connection associated with the UE may be suspended). A first gNB (e.g., a current serving gNB, such as a serving gNB that currently serves the UE) may store (and/or maintain) a UE context (e.g., one or more configurations and/or one or more identities of the UE) for the UE while the UE is in RRC_INACTIVE state. Upon data arrival, the UE may resume the RRC connection from RRC_INACTIVE state, which may be faster than establishing a new RRC connection from RRC_IDLE state. After resuming the RRC connection (e.g., after successful completion of a Random Access (RA) procedure to resume the RRC connection), the UE is able to transmit data (e.g., data from application layer of the UE) in RRC_CONNECTED state. Alternatively and/or additionally, the UE is able to resume the RRC connection on a second gNB (e.g., a new gNB) that is different than an original gNB (e.g., an old gNB) in which the RRC connection was suspended (e.g., the original gNB may be the first gNB). In a scenario in which the UE resumes the RRC on the second gNB, the second gNB may try to retrieve the UE context from the original gNB. If the second gNB fails to retrieve the UE context, fallback to RRC connection setup procedure may take place (e.g., establishing a new RRC connection). More details associated with RRC_INACTIVE state are quoted above and may be found in 3GPP TS 38.300 V16.0.0 and 3GPP TS 38.331 V16.0.0.

Although RRC_INACTIVE state may bring benefits (such as stated above), currently the UE may not be able to transmit data (e.g., user-plane data) in RRC_INACTIVE state. That is, the UE may need to enter RRC_CONNECTED state before transmitting the data. After transmitting the data, the UE may be put into RRC_INACTIVE state again. The above steps (of entering RRC_CONNECTED state, transmitting data and/or being put into RRC_INACTIVE state, for example) may happen for each data transmission regardless of the amount of data and how frequent the data arrives, which may result in an increase in power consumption and/or signaling overhead.

To mitigate the problem, small data transmission (SDT) in RRC_INACTIVE state may be introduced (such as discussed in RP-193252). An objective of SDT may be to enable the UE to transmit data in RRC_INACTIVE state without (and/or before) entering RRC_CONNECTED state. Possible solutions (to enable the UE to transmit data in RRC_INACTIVE state without and/or before entering RRC_CONNECTED state, for example) may be based on 2-step RA, 4-step Random Access Channel (RACH) and/or pre-configured Physical Uplink Shared Channel (PUSCH) resources (e.g., similar to Type-1 configured grant and/or configured grant Type-1 in NR). SDT in RRC_INACTIVE state may be referred to as "SDT in RRC_INACTIVE state", "SDT procedure" and/or "SDT" (e.g., an RRC connection resume procedure). For example, when a UE performs a 2-step RACH-based SDT procedure (e.g., a procedure to use 2-step RACH for transmission, such as data transmission) in a Cell, the UE may include uplink (UL) data together with an RRCResumeRequest message in a MsgA (e.g., a MsgA of the 2-step RACH-based SDT procedure). Alternatively and/or additionally, when a UE performs a 4-step RACH-based SDT procedure (e.g., a procedure to use 4-step RACH for transmission, such as data transmission) in a Cell, the UE may include UL data together with an RRCResumeRequest message in a Msg3 (e.g., a MsgA of the 4-step RACH-based SDT procedure). For example, when a UE performs a pre-configured PUSCH resources-based SDT procedure (e.g., a procedure to use pre-configured PUSCH resources for transmission, such as data transmission) in a Cell, the UE may include UL data together with an RRCResumeRequest message in a PDU to be transmitted using the pre-configured PUSCH resources. It is possible that a different RRC message (e.g., a new RRC message) is introduced for the SDT procedure (replacing the RRCResumeRequest message as mentioned above, for example).

Figure 16:
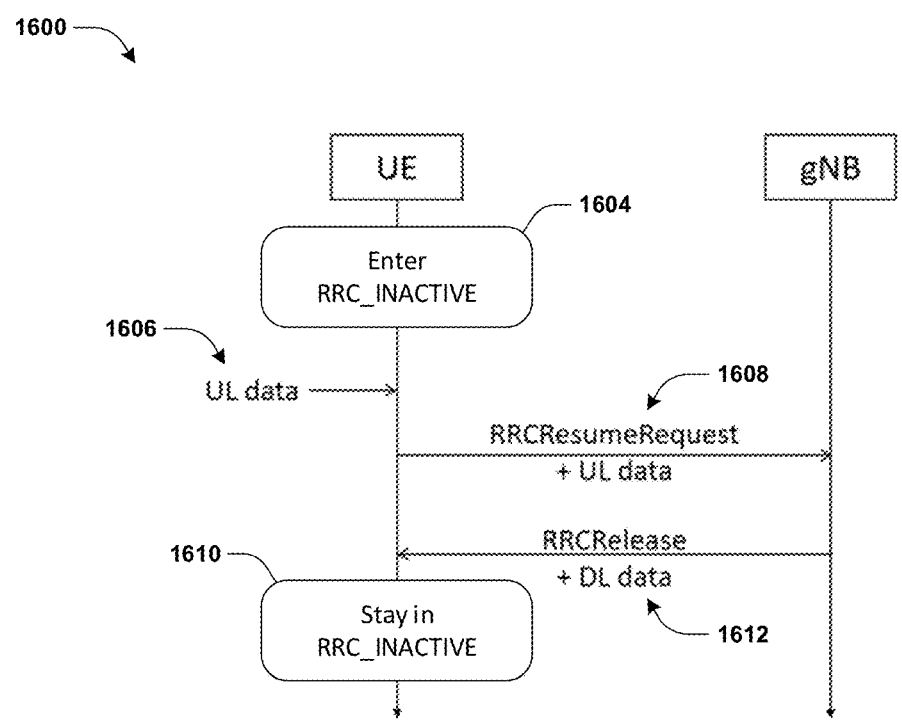
FIG. 16 is a diagram illustrating an exemplary scenario in which small data transmission (SDT) is performed in RRC_INACTIVE state according to one exemplary embodiment.

FIG. 16 illustrates an example scenario 1600 in which SDT is performed in RRC_INACTIVE state. In the example scenario 1600, data 1606 (e.g., UL data) may arrive after the UE enters 1604 RRC_INACTIVE state. The UE may perform a SDT procedure. For example, the UE may transmit, to a gNB, a transmission 1608 comprising an RRC message (e.g., RRCResumeRequest message) and/or at least some of the data 1606. Alternatively and/or additionally, the UE may receive, from the gNB, a transmission 1612 comprising an RRC message (e.g., an RRCRelease message) and/or downlink (DL) data. The UE may stay 1610 in RRC_INACTIVE state after performing the SDT procedure (such as based on there being no more data expected to be transmitted).

Figure 17:
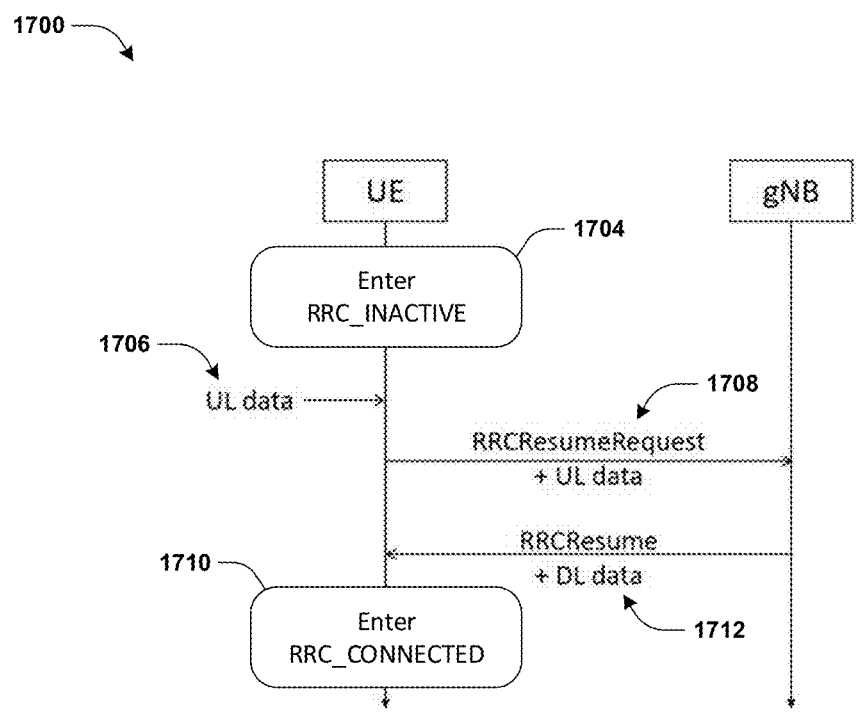
FIG. 17 is a diagram illustrating an exemplary scenario in which SDT is performed in RRC_INACTIVE state according to one exemplary embodiment.

FIG. 17 illustrates an example scenario 1700 in which SDT is performed in RRC_INACTIVE state. In the example scenario 1700, data 1706 (e.g., UL data) may arrive after the UE enters 1704 RRC_INACTIVE state. The UE may perform a SDT procedure. For example, the UE may transmit, to a gNB, a transmission 1708 comprising an RRC message (e.g., RRCResumeRequest message) and/or at least some of the data 1706. Alternatively and/or additionally, the UE may receive, from the gNB, a transmission 1712 comprising an RRC message (e.g., an RRCResume message) and/or DL data. For example, the SDT procedure may fallback to RRCResume, such as based on there being data (e.g., more data) expected to be transmitted, and/or the UE may enter 1710 RRC_CONNECTED state.

Figure 18:
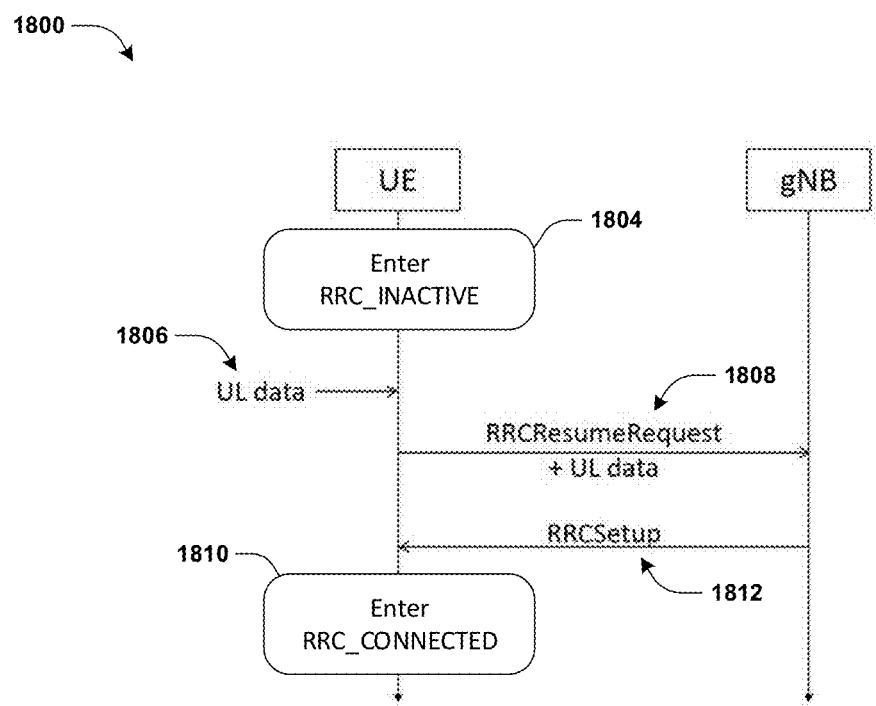
FIG. 18 is a diagram illustrating an exemplary scenario in which SDT is performed in RRC_INACTIVE state according to one exemplary embodiment.

FIG. 18 illustrates an example scenario 1800 in which SDT is performed in RRC_INACTIVE state. In the example scenario 1800, data 1806 (e.g., UL data) may arrive after the UE enters 1804 RRC_INACTIVE state. The UE may perform a SDT procedure. For example, the UE may transmit, to a gNB, a transmission 1808 comprising an RRC message (e.g., RRCResumeRequest message) and/or at least some of the data 1806. Alternatively and/or additionally, the UE may receive, from the gNB, a transmission 1812 comprising an RRC message (e.g., an RRCSetup message). For example, the SDT procedure may fallback to RRCSetup, such as based on the gNB failing to retrieve the UE context of the UE performing the SDT procedure, and/or the UE may enter 1810 RRC_CONNECTED state.

In some systems, a data transmission of a SDT procedure comprises a first UL transmission followed by a first DL transmission. If there is data that could not be transmitted and/or received within the first UL transmission and/or the first DL transmission, the network may transit (e.g., transition) the UE into RRC_CONNECTED state for transmitting and/or receiving the data. It is possible that one or more subsequent transmissions take place while the UE is still in RRC_INACTIVE state. In an example, a second UL transmission may follow the first DL transmission and the UE may stay in RRC_INACTIVE after performing (e.g., transmitting) the second UL transmission (and/or after receiving an "ACK" response, associated with the second UL transmission, from the network). In an example, a second DL transmission may follow the second UL transmission and the UE may stay in RRC_INACTIVE after performing (e.g., receiving) the second DL transmission (and/or after transmitting an "ACK" response, associated with the second DL transmission, to the network). In some examples, "completion of a SDT procedure" may refer to the last transmission (e.g., the second UL transmission, the second DL transmission or a different transmission) of the one or more subsequent transmissions. In some examples, an RRCRelease message may be included in the first DL transmission (rather than the second DL transmission, for example) in a scenario in which the second DL transmission is performed. Alternatively and/or additionally, the RRCRelease message may be included in the second DL transmission (rather than the first DL transmission, for example) in a scenario in which the second DL transmission is performed (wherein the second DL transmission may be the last DL transmission in a SDT procedure, for example). The one or more subsequent transmissions may be considered to be part of the SDT procedure.

In some examples, when an RRC connection of a UE is suspended (due to reception of an RRCRelease message, for example), the UE may store at least a part of a current RRC configuration of the UE in a UE Inactive Access Stratum (AS) context, and the UE may switch to an initial Bandwidth Part (BWP) (e.g., an initial DL BWP and/or an initial UL BWP). In an example, the initial UL BWP may be a UL BWP that the UE uses for initial access (with a Cell, for example). Alternatively and/or additionally, the initial UL BWP may be a UL BWP that the UE uses for activation of the Cell. In an example, the initial DL BWP may be a DL BWP that the UE uses for initial access (with the Cell, for example). Alternatively and/or additionally, the initial DL BWP may be a DL BWP that the UE uses for activation of the Cell. In some examples, after a UE initiates an RRC Resume procedure on a Cell (wherein the Cell may be considered to be a Special Cell (SpCell) after the RRC connection is successfully resumed) and before the UE transmits an RRCResumeRequest message, the UE may restore part of the stored RRC configuration (e.g., the current RRC configured) from the UE Inactive AS context, such as specified in section 5.3.13.3 of 3GPP TS 38.331 V16.0.0. An RRC configuration (e.g., one RRC configuration) that may not be restored before transmitting the RRCResumeRequest message is "masterCellGroup" which comprises SpCell-Config. Because dedicated BWP configurations of SpCell are included in the SpCellConfig, the UE may not be able to transmit the RRCResumeRequest message on a UL BWP other than the initial UL BWP of the Cell (even if the Cell is the same as the previous SpCell, for example). In some examples, the previous SpCell may be a most recent SpCell, of the UE, prior to the RRC connection of the UE being suspended and/or prior to the RRC Resume procedure on the Cell being initiated. If an RRCResume message is received in response to transmitting the RRCResumeRequest message, the Cell may become the SpCell and the UE may restore the masterCellGroup from the UE Inactive AS context, as specified in section 5.3.13.4 of 3GPP TS 38.331 V16.0.0. If the current SpCell is the same as the previous SpCell (e.g., the previously stored masterCellGroup may still be applicable), the UE may be able to perform the one or more subsequent transmissions on a UL BWP other than the initial UL BWP of the Cell. If the current SpCell is different than the previous SpCell (and/or if the network decides to reconfigure the BWP configuration), the network may provide a new masterCellGroup in the RRCResume message and the UE may be able to perform the one or more subsequent transmissions on a UL BWP other than the initial UL BWP of the Cell. The UE may not be able to restore the masterCellGroup from the UE Inactive AS context before transmitting the RRCResumeRequest message because the Cell on which the UE is resuming (e.g., resuming an RRC connection) may be different than the previous SpCell (and thus the previously stored SpCellConfig may not be applicable for the Cell).

For pre-configured PUSCH resources-based SDT procedure (e.g., also called SDT and/or SDT procedure in at least some of the description that follows, such as in description of the first concept, the second concept, the third concept and/or the fourth concept), since the UE may transmit the UL data together with the RRCResumeRequest message on an initial UL BWP of a Cell, the initial UL BWP of the Cell may become congested (if more than a threshold number of UEs are configured with pre-configured PUSCH resources-based SDT procedure, for example). For example, there may not be sufficient (e.g., enough) UL resources for the network to allocate pre-configured PUSCH resources for some UEs, which may result in more power consumption of the UEs (e.g., the UEs may need to initiate an RA procedure for transmitting UL data). There may also be an impact on other UEs which are performing PUSCH transmissions (e.g., Msg3 transmission and/or MsgA transmission during RA procedure) on the initial UL BWP of the Cell. Increasing the frequency bandwidth of the initial UL BWP of the Cell may not be a preferred solution since not all UEs are able to support large UL bandwidth and/or since large UL bandwidth may also result in more power consumption.

One or more techniques are provided herein to solve one or more of the aforementioned issues (such as at least one of the initial UL BWP of the Cell becoming congested, there not being sufficient UL resources for the network to allocate pre-configured PUSCH resources for UEs, more power consumption of the UEs, etc.).

In a first concept, an additional UL BWP (other than an initial UL BWP, for example) may be used for a SDT procedure.

In some examples, in order to separate UEs performing SDT from UEs not performing SDT, a UL BWP for SDT may be configured (e.g., additionally configured) for the Cell.

The UL BWP for SDT may have a different frequency bandwidth than the initial UL BWP of the Cell. The UL BWP for SDT may have a different frequency location (e.g., a different center frequency) than the initial UL BWP of the Cell. Alternatively and/or additionally, the UL BWP for SDT may have the same frequency location as the initial UL BWP of the Cell and/or the same center frequency as the initial UL BWP of the Cell. The UL BWP for SDT may have a different numerology than the initial UL BWP of the Cell. Alternatively and/or additionally, the UL BWP for SDT may have the same numerology as the initial UL BWP of the Cell.

In an example, the network may provide (e.g., additionally provide) a configuration of the UL BWP for SDT when (and/or after and/or before) providing a configuration of the pre-configured PUSCH resources. For example, the configuration of the pre-configured PUSCH resources may comprise the configuration of the UL BWP to be used for SDT. In some examples, the UE may determine (e.g., calculate) a resource location of the pre-configured PUSCH resources based on the frequency location and/or bandwidth of the UL BWP for SDT (such as rather than determining and/or calculating the resource location based on the frequency location and/or bandwidth of the initial UL BWP).

In an example, upon (and/or in response to) initiation of the pre-configured PUSCH resources-based SDT procedure, the UE may determine (e.g., the UE may check) whether or not a UL BWP for SDT is configured for the Cell. If a UL BWP for SDT is configured for the Cell, the UE may perform the pre-configured PUSCH resources-based SDT procedure on the UL BWP for SDT. If a UL BWP for SDT is not configured for the Cell, the UE may perform pre-configured PUSCH resources-based SDT procedure on the initial UL BWP of the Cell.

Alternatively and/or additionally, the pre-configured PUSCH resources-based SDT procedure may be allowed on the UL BWP for SDT (e.g., performance of the pre-configured PUSCH resources-based SDT procedure may be allowed on the UL BWP for SDT) and may not be allowed on the initial UL BWP of the Cell (e.g., performance of the pre-configured PUSCH resources-based SDT procedure may not be allowed on the initial UL BWP of the Cell). Accordingly, the UE may not be able to perform the SDT procedure if a UL BWP for SDT is not configured for the Cell.

In some examples, the UL BWP for SDT may be configured in System Information of the Cell. For example, the UL BWP for SDT may be configured in a system information block (SIB), such as SIB1, in SIB2, and/or in a different SIB (e.g., a new SIB) designed and/or usable for SDT. Alternatively and/or additionally, the UL BWP for SDT may be configured in a dedicated RRC message to the UE (e.g., in the RRCRelease message) and stored in the UE Inactive AS context. For example, the UE may be configured with the UL BWP for SDT via the dedicated RRC message received by the UE and/or the UE may store the UL BWP for SDT (and/or a configuration of the UL BWP for SDT) in the UE Inactive AS context (after receiving the dedicated RRC message, for example). The configuration of the UL BWP for SDT may be applicable for a Cell on which the configuration is received (e.g., a Cell on which the dedicated RRC message is received). The configuration of the UL BWP for SDT may not be applicable for a Cell other than the Cell on which the configuration is received.

Alternatively and/or additionally, the network may provide, in a dedicated RRC message to the UE (e.g., in the RRCRelease message), the configuration of UL BWP for SDT for a list of Cells. For example, the configuration of the UL BWP for SDT for the list of Cells may be applicable for Cells of the list of Cells. Accordingly, the UE may be able to use the UL BWP for SDT (and/or the configuration of the UL BWP for SDT) when initiating SDT on a Cell (e.g., any one cell) among the list of Cells. For example, the network may include 3 UL BWPs for SDT in the configuration and/or there may be 3 Cells in the list of Cells, wherein each UL BWP for SDT (of the 3 UL BWPs for SDT) in the configuration corresponds to a Cell among the list of Cells. In an example, a first UL BWP for SDT of the 3 UL BWPs for SDT may correspond to (e.g., be applicable for) a first Cell of the list of Cells (e.g., the UE may perform a pre-configured PUSCH resources-based SDT procedure on the first Cell using the first UL BWP for SDT), a second UL BWP for SDT of the 3 UL BWPs for SDT may correspond to (e.g., be applicable for) a second Cell of the list of Cells (e.g., the UE may perform a pre-configured PUSCH resources-based SDT procedure on the second Cell using the second UL BWP for SDT) and/or a third UL BWP for SDT of the 3 UL BWPs for SDT may correspond to (e.g., be applicable for) a third Cell of the list of Cells (e.g., the UE may perform a pre-configured PUSCH resources-based SDT procedure on the third Cell using the third UL BWP for SDT). The list of Cells may be indicative of and/or may comprise Cells that belong to a first RAN Notification Area (RNA) (e.g., the list of Cells may be indicative of and/or may comprise all cells that belong to the first RNA or some cells that belong to the first RNA). Alternatively and/or additionally, the list of Cells may comprise one or more Cells that belong to a second RNA. Alternatively and/or additionally, the list of Cells may not comprise a Cell that belongs to the second RNA (e.g., the list of Cells may not comprise any Cell that belongs to the second RNA). In some examples, the UE is configured with the first RNA when an RRC connection is suspended. In some examples, the UE initiates a RNA update procedure in response to moving outside the first RNA (e.g., when camping on a Cell not belonging to the first RNA).

In some examples, upon (and/or in response to) initiation of the pre-configured PUSCH resources-based SDT procedure, if the UL BWP for SDT is configured in System Information of the Cell, the UE (e.g., an RRC layer of the UE) may consider that the UL BWP for SDT is configured. Alternatively and/or additionally, upon (and/or in response to) initiation of the pre-configured PUSCH resources-based SDT procedure, if the UL BWP for SDT is not configured in System Information of the Cell, and if the stored UE Inactive AS context includes the configuration of UL BWP for SDT that is applicable for the Cell (e.g., the Cell may be the same as the previous SpCell and/or the Cell may be among the list of Cells, such as discussed above), the UE (e.g., the RRC layer of the UE) may restore the configuration of UL BWP for SDT from the UE Inactive AS context and may consider that the UL BWP for SDT is configured. Alternatively and/or additionally, upon (and/or in response to) initiation of the pre-configured PUSCH resources-based SDT procedure, if the UL BWP for SDT is configured in System Information of the Cell, and if the stored UE Inactive AS context includes the configuration of UL BWP for SDT that is applicable for the Cell (e.g., the Cell may be the same as the previous SpCell and/or the Cell may be among the list of Cells, such as discussed above), the UE (e.g., the RRC layer of the UE) may restore the configuration of UL BWP for SDT from the UE Inactive AS context (rather than using the configuration configured in the System Information of the Cell, for example) and may consider that the UL BWP for SDT is configured. Alternatively and/or additionally, if the UE (e.g., the RRC layer of the UE) considers that the UL BWP for SDT is not configured, the UE (e.g., the RRC layer of the UE) may cancel (and/or may not initiate) the SDT procedure and may initiate a legacy RRC Resume procedure.

The RRC layer of the UE may indicate, to a lower layer (of the UE, for example), such as a Medium Access Control (MAC) layer, that the SDT procedure is to be performed on the UL BWP for SDT (if the UL BWP for SDT is configured in RRC, for example, such as if the UL BWP for SDT is configured in the RRC layer of the UE). The RRC layer of the UE may configure a lower layer (of the UE, for example), such as a MAC layer, to use the UL BWP for SDT (if the UL BWP for SDT is configured in RRC, for example, such as if the UL BWP for SDT is configured in the RRC layer of the UE).

In some examples, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of UL BWP for SDT. Alternatively and/or additionally, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), if the network provides and/or includes a new configuration of UL BWP for SDT in the RRCRelease message, the UE (e.g., the RRC layer of the UE) may replace the configuration of UL BWP for SDT included in the UE Inactive AS context with the new configuration of UL BWP for SDT (received via the RRCRelease message). Alternatively and/or additionally, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), if the network does not provide and/or include a new configuration of UL BWP for SDT (in the RRCRelease message, for example) and/or if the network indicates (and/or instructs) release of the configuration of UL BWP for SDT via the RRCRelease message, the UE (e.g., the RRC layer of the UE) may release (and/or discard) the configuration of UL BWP for SDT included in the UE Inactive AS context.

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of UL BWP for SDT (e.g., the UE and/or the RRC layer of the UE may release and/or discard the configuration of UL BWP for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of UL BWP for SDT (e.g., the UE and/or the RRC layer of the UE may release and/or discard the configuration of UL BWP for SDT if a new BWP configuration, such as a new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of UL BWP for SDT (e.g., the UE and/or the RRC layer of the UE may keep the configuration of UL BWP for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of UL BWP for SDT (e.g., the UE and/or the RRC layer of the UE may keep the configuration of UL BWP for SDT if a new BWP configuration, such as a new BWP configuration in masterCellGroup, is provided in the RRCResume message).

In response to the SDT procedure being unsuccessfully completed (e.g., unsuccessful completion of the SDT procedure) by an RRCSetup message, the UE (e.g., the RRC layer of the UE) may release (and/or discard) the configuration of UL BWP for SDT. Alternatively and/or additionally, in response to the SDT procedure being unsuccessfully completed (e.g., unsuccessful completion of the SDT procedure) by an RRCSetup message, the UE (e.g., the RRC layer of the UE) may keep the configuration of UL BWP for SDT.

Upon (and/or in response to) initiation of the pre-configured PUSCH resources-based SDT procedure on the Cell, the UE (e.g., the MAC layer of the UE) may switch the active UL BWP of the UE (from the initial UL BWP, for example) to the UL BWP for SDT. For example, the UE (e.g., the MAC layer of the UE) may switch the active UL BWP of the UE to the UL BWP for SDT upon (and/or in response to) initiation of the pre-configured PUSCH resources-based SDT procedure on the Cell if an upper layer (of the UE, for example), such as the RRC layer of the UE, indicates that the SDT procedure is to be performed on the UL BWP for SDT. Alternatively and/or additionally, the UE (e.g., the MAC layer of the UE) may switch the active UL BWP of the UE to the UL BWP for SDT upon (and/or in response to) initiation of the pre-configured PUSCH resources-based SDT procedure on the Cell if an upper layer (of the UE, for example), such as the RRC layer of the UE, configures MAC (e.g., the MAC layer of the UE) to use the UL BWP for SDT. Throughout the present disclosure, switching the active UL BWP from a first UL BWP (e.g., the initial UL BWP of the Cell) to a second UL BWP (e.g., the UL BWP for SDT) may correspond to switching from the first UL BWP being active to the second UL BWP being active. For example, before switching the active UL BWP from the first UL BWP to the second UL BWP, the first UL BWP may be the active UL BWP of the UE. After switching the active UL BWP from the first UL BWP to the second UL BWP, the second UL BWP may be the active UL BWP of the UE.

In some examples, in response to (and/or upon) the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the UE may switch the active UL BWP from the UL BWP for SDT to the initial active UL BWP of the Cell).

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may keep using (e.g., continue using) the UL BWP for SDT (e.g., the MAC layer of the UE may keep using the UL BWP for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the MAC layer of the UE may switch the active UL BWP from the UL BWP for SDT to the initial active UL BWP of the Cell), such as if no new BWP configuration, such as no new BWP configuration in masterCellGroup, is provided in the RRCResume message. Alternatively and/or additionally, in response to the SDT procedure being unsuccessfully completed (e.g., unsuccessful completion of the SDT procedure) by an RRCSetup message, the UE (e.g., the MAC layer of the UE) may switch the active UL BWP back to the initial UL BWP of the Cell (e.g., the MAC layer of the UE may switch the active UL BWP from the UL BWP for SDT to the initial active UL BWP of the Cell), such as if no new BWP configuration, such as no new BWP configuration in masterCellGroup, is provided in the RRCSetup message.

In a scenario in which the UL BWP for SDT is configured for a Cell and the initial UL BWP of the Cell is also applicable for the SDT procedure (such as where pre-configured PUSCH resources for SDT are configured on the initial UL BWP), the UE may select (e.g., randomly select) a UL BWP (e.g., one UL BWP) of the UL BWP for SDT and the initial UL BWP (e.g., the UE may select, such as randomly select, either the UL BWP for SDT or the initial UL BWP). In a scenario in which the UL BWP for SDT is configured for a Cell and the initial UL BWP of the Cell is also applicable for the SDT procedure (such as where pre-configured PUSCH resources for SDT are configured on the initial UL BWP), the UE may prioritize the UL BWP for SDT over the initial UL BWP (e.g., the UE may select the UL BWP for SDT rather than the initial UL BWP based on prioritizing the UL BWP for SDT over the initial UL BWP) or the UE may prioritize the initial UL BWP over the UL BWP for SDT (e.g., the UE may select the initial UL BWP rather than the UL BWP for SDT based on prioritizing the initial UL BWP over the UL BWP for SDT). In some examples, the prioritization (e.g., prioritization of the UL BWP for SDT over the initial UL BWP or prioritization of the initial UL BWP over the UL BWP for SDT) may be based on a UE category of the UE and/or a type of UE of the UE. For example, the UE may prioritize the UL BWP for SDT over the initial UL BWP if the UE is a first type of UE and/or the UE may prioritize the initial UL BWP over the UL BWP for SDT if the UE is a second type of UE. In a scenario in which the UL BWP for SDT is configured for a Cell and the initial UL BWP of the Cell is also applicable for the SDT procedure (such as where pre-configured PUSCH resources for SDT are configured on the initial UL BWP), the UE may prioritize the initial UL BWP over the UL BWP for SDT (e.g., the UE may select the initial UL BWP if the initial UL BWP of the Cell is applicable for the SDT procedure). Alternatively and/or additionally, if the initial UL BWP of the Cell is not applicable for the SDT procedure, the UE may select the UL BWP for SDT. In a scenario in which the UL BWP for SDT is configured for a Cell and the initial UL BWP of the Cell is also applicable for the SDT procedure (such as where pre-configured PUSCH resources for SDT are configured on the initial UL BWP), the UE may select, based on an indication (e.g., the network may indicate to and/or instruct the UE to perform the SDT procedure using the UL BWP for SDT or the initial UL BWP), a UL BWP (e.g., one UL BWP) of the UL BWP for SDT and the initial UL BWP (e.g., the UE may select, based on the indication, either the UL BWP for SDT or the initial UL BWP). For example, the UE may select the UL BWP for SDT if the indication is indicative of performing the SDT procedure using the UL BWP for SDT. Alternatively and/or additionally, the UE may select the initial UL BWP if the indication is indicative of performing the SDT procedure using the initial UL BWP. The indication may be included in a dedicated RRC message transmitted to the UE (e.g., the indication may be included in the RRCRelease message). If the UE selects the UL BWP for SDT, the UE may perform the SDT procedure using the UL BWP for SDT. Alternatively and/or additionally, if the UE selects the initial UL BWP, the UE may perform the SDT procedure using the initial UL BWP.

Figure 19:
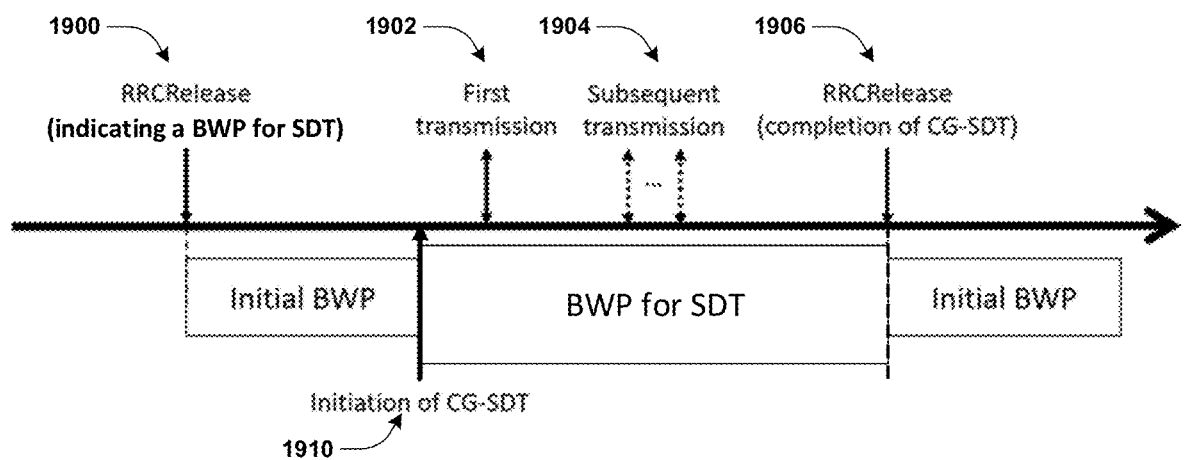
FIG. 19 is a diagram illustrating an exemplary scenario associated with performance of a SDT procedure by a UE according to one exemplary embodiment.

FIG. 19 illustrates an example scenario associated with performance of the SDT procedure by the UE. The UE may receive a first RRCRelease message 1900 indicative of a BWP for SDT. The UE may use an initial BWP (different than the BWP for SDT, for example) between reception of the first RRCRelease message 1900 and initiation 1910 of the SDT procedure (e.g., a pre-configured PUSCH resources-based SDT procedure, such as a configured grant SDT (CG-SDT) procedure). The UE may use the BWP for SDT between the initiation 1910 of the SDT procedure and completion of the SDT procedure (e.g., the SDT procedure may be completed by reception of a second RRCRelease message 1906). In some examples, the UE may perform (e.g., transmit and/or receive) a first transmission 1902 and/or one or more subsequent transmissions 1904 during the SDT procedure.

In a second concept, a set of UL BWPs may be used for a SDT procedure.

In some examples, in order to separate UEs performing SDT (e.g., separate the UEs into multiple groups), a set of UL BWPs for SDT may be configured for the Cell. The set of UL BWPs for SDT may comprise a UL BWP for SDT (e.g., at least one UL BWP for SDT). If more than one UL BWP for SDT is configured (e.g., if the set of UL BWPs for SDT configured for the Cell comprises more than one UL BWP for SDT), the UE may perform a selection of a UL BWP (e.g., one UL BWP) from the set of UL BWPs for SDT. Alternatively and/or additionally, if merely one UL BWP for SDT is configured (e.g., if the set of UL BWPs for SDT configured for the Cell comprises merely one UL BWP for SDT, the UE may perform a selection of the one UL BWP for SDT.

In some examples, a UL BWP for SDT of the set of UL BWPs for SDT may have a different frequency bandwidth than the initial UL BWP of the Cell. Alternatively and/or additionally, the UL BWP for SDT may have a different frequency location (e.g., a different center frequency) than the initial UL BWP of the Cell. Alternatively and/or additionally, the UL BWP for SDT may have a different numerology than the initial UL BWP of the Cell.

In an example, the network may provide (e.g., additionally provide) a configuration of the set of UL BWPs for SDT when (and/or after and/or before) providing a configuration of the pre-configured PUSCH resources. For example, the configuration of the pre-configured PUSCH resources may comprise the configuration of the set of UL BWPs to be used for SDT. In some examples, the UE may determine (e.g., calculate) a resource location of the pre-configured PUSCH resources based on the frequency location and/or bandwidth of a UL BWP for SDT of the set of UL BWPs for SDT (such as rather than determining and/or calculating the resource location based on the frequency location and/or bandwidth of the initial UL BWP).

In an example, upon (and/or in response to) initiation of the pre-configured PUSCH resources-based SDT procedure, the UE may determine (e.g., the UE may check) whether or not the set of UL BWPs for SDT is configured for the Cell. If the set of UL BWPs for SDT is configured for the Cell, the UE may perform the pre-configured PUSCH resources-based SDT procedure on the selected UL BWP for SDT (after performing the selection of the selected UL BWP from the set of UL BWPs for SDT, for example). If a set of UL BWPs for SDT is not configured for the Cell, the UE may perform pre-configured PUSCH resources-based SDT procedure on the initial UL BWP of the Cell.

Alternatively and/or additionally, the pre-configured PUSCH resources-based SDT procedure may be allowed on the set of UL BWPs for SDT (e.g., performance of the pre-configured PUSCH resources-based SDT procedure may be allowed on a UL BWP of the set of UL BWPs for SDT) and may not be allowed on the initial UL BWP of the Cell (e.g., performance of the pre-configured PUSCH resources-based SDT procedure may not be allowed on the initial UL BWP of the Cell). Accordingly, the UE may not be able to perform the SDT procedure if the set of UL BWPs for SDT is not configured for the Cell.

In some examples, the set of UL BWPs for SDT may be configured in System Information of the Cell. For example, the set of UL BWPs for SDT may be configured in SIB1, in SIB2, and/or in a different SIB (e.g., a new SIB) designed and/or usable for SDT. Alternatively and/or additionally, the set of UL BWPs for SDT may be configured in a dedicated RRC message to the UE (e.g., in the RRCRelease message) and stored in the UE Inactive AS context. For example, the UE may be configured with the set of UL BWPs for SDT via the dedicated RRC message received by the UE and/or the UE may store the set of UL BWPs for SDT (and/or a configuration of the set of UL BWPs for SDT) in the UE Inactive AS context (after receiving the dedicated RRC message, for example). The configuration of the set of UL BWPs for SDT may be applicable for a Cell on which the configuration is received (e.g., a Cell on which the dedicated RRC message is received). The configuration of the set of UL BWPs for SDT may not be applicable for a Cell other than the Cell on which the configuration is received.

Alternatively and/or additionally, the network may provide, in a dedicated RRC message to the UE (e.g., in the RRCRelease message), the configuration of the set of UL BWPs for SDT for a list of Cells. For example, the configuration of the UL BWP for SDT for the list of Cells may be applicable for Cells of the list of Cells. Accordingly, the UE may be able to use a UL BWP among the set of UL BWPs for SDT when initiating SDT on a Cell (e.g., any one cell) among the list of Cells. In an example, the network may include 5 UL BWPs for SDT in the configuration and/or there may be 3 Cells in the list of Cells, wherein a first UL BWP and a second UL BWP of the 5 UL BWPs for SDT may correspond to (e.g., be applicable for) a first Cell of the list of Cells, wherein a third UL BWP and a fourth UL BWP of the 5 UL BWPs for SDT may correspond to (e.g., be applicable for) a second Cell of the list of Cells, and wherein a fifth UL BWP of the 5 UL BWPs for SDT may correspond to (e.g., be applicable for) a third Cell of the list of Cells. The list of Cells may be indicative of and/or may comprise Cells that belong to a first RNA (e.g., the list of Cells may be indicative of and/or may comprise all cells that belong to the first RNA or some cells that belong to the first RNA). Alternatively and/or additionally, the list of Cells may comprise one or more Cells that belong to a second RNA. Alternatively and/or additionally, the list of Cells may not comprise a Cell that belongs to the second RNA (e.g., the list of Cells may not comprise any Cell that belongs to the second RNA). In some examples, the UE is configured with the first RNA when an RRC connection is suspended. In some examples, the UE initiates a RNA update procedure in response to moving outside the first RNA (e.g., when camping on a Cell not belonging to the first RNA).

In some examples, upon (and/or in response to) initiation of the pre-configured PUSCH resources-based SDT procedure, if the set of UL BWPs for SDT is configured in System Information of the Cell, the UE (e.g., the RRC layer of the UE) may consider that the UL BWP for SDT (and/or the set of UL BWPs for SDT) is configured. Alternatively and/or additionally, upon (and/or in response to) initiation of the pre-configured PUSCH resources-based SDT procedure, if the set of UL BWPs for SDT is not configured in System Information of the Cell, and if the stored UE Inactive AS context includes the configuration of the set of UL BWPs for SDT that is applicable for the Cell (e.g., the Cell may be the same as the previous SpCell and/or the Cell may be among the list of Cells, such as discussed above), the UE (e.g., the RRC layer of the UE) may restore the configuration of the set of UL BWPs for SDT from the UE Inactive AS context and may consider that the UL BWP for SDT (and/or the set of UL BWPs for SDT) is configured. Alternatively and/or additionally, upon (and/or in response to) initiation of the pre-configured PUSCH resources-based SDT procedure, if the set of UL BWPs for SDT is configured in System Information of the Cell, and if the stored UE Inactive AS context includes the configuration of the set of UL BWPs for SDT that is applicable for the Cell (e.g., the Cell may be the same as the previous SpCell and/or the Cell may be among the list of Cells, such as discussed above), the UE (e.g., the RRC layer of the UE) may restore the configuration of the set of UL BWPs for SDT from the UE Inactive AS context (rather than using the configuration configured in the System Information of the Cell, for example) and may consider that the UL BWP for SDT (and/or the set of UL BWPs for SDT) is configured. Alternatively and/or additionally, if the UE (e.g., the RRC layer of the UE) considers that the UL BWP for SDT (and/or the set of UL BWPs for SDT) is not configured, the UE (e.g., the RRC layer of the UE) may cancel (and/or may not initiate) the SDT procedure and may initiate a legacy RRC Resume procedure.

The UE may perform a selection of a UL BWP (e.g., one UL BWP) from the set of UL BWPs for SDT on a Cell using one or more selection techniques (such as in a scenario in which the set of UL BWPs for SDT comprises more than one UL BWP for SDT).

In some examples, the UE may select a UL BWP from the set of UL BWPs for SDT based on random selection.

In an example, the UE may randomly select a UL BWP from the set of UL BWPs for SDT when the UE initiates SDT on the Cell (and/or upon and/or in response to initiation of SDT on the Cell). For example, for each time that the UE initiates SDT on the Cell, the UE randomly selects a UL BWP from the set of UL BWPs for SDT (e.g., the UE may randomly select the UL BWP when the UE initiates SDT on the Cell and/or upon and/or in response to initiation of the SDT on the Cell).

In an example in which the UE selects a UL BWP from the set of UL BWPs for SDT based on random selection, a probability of selecting each UL BWP of the set of UL BWPs may be the same. For example, if there are two UL BWPs in the set of UL BWPs for SDT, the probability for selecting a first UL BWP of the two UL BWPs may be 50% and the probability for selecting a second UL BWP of the two UL BWPs may be 50%.

Alternatively and/or additionally, in an example in which the UE selects a UL BWP from the set of UL BWPs for SDT based on random selection, probabilities of selecting UL BWPs from the set of UL BWPs may be configurable. For example, the network may configure (the UE with) the probabilities in the configuration of the set of UL BWPs (e.g., the probabilities may be included in the configuration). The UE may perform the selection based on the probabilities (with which the UE is configured). In an example, the probability for selecting a first UL BWP from the set of UL BWPs may be a first configured probability, the probability for selecting a second UL BWP of the set of UL BWPs may be a second configured probability, etc.

In some examples, the UE may select a UL BWP from the set of UL BWPs for SDT based on a UE identity of the UE.

In an example, the UE may select, based on the UE identity and/or a formula, a UL BWP from the set of UL BWPs for SDT when the UE initiates SDT on the Cell (and/or upon and/or in response to initiation of SDT on the Cell). For example, for each time that the UE initiates SDT on the Cell, the UE may select, based on the UE identity and/or the formula, a UL BWP from the set of UL BWPs for SDT (e.g., the UE may randomly select the UL BWP when the UE initiates SDT on the Cell and/or upon and/or in response to initiation of the SDT on the Cell).

In an example, the UE may perform one or more operations (e.g., mathematical operations) using the UE identity to select a UL BWP from the set of UL BWPs for SDT (e.g., the one or more operations may be performed in accordance with the formula). In an example, the formula may be X mod Y, wherein X is the UE identity, mod is modulo operation and/or Y is a number of UL BWPs in the set of UL BWPs for SDT. The UE may determine a result of the formula, and/or the UE may select a UL BWP from the set of UL BWPs for SDT based on the result. In an example, a result of 0 may correspond to a first UL BWP of the set of UL BWPs, a result of 1 may correspond to a second UL BWP of the set of UL BWPs, a result of 2 may correspond to a third UL BWP of the set of UL BWPs, etc. In an example in which the UE identity of the UE is 10 and the number of UL BWPs in the set of UL BWPs for SDT is 3, the UE may determine the result to be 10 mod 3=1, and/or may select the second UL BWP from the set of UL BWPs for SDT based on the result being 1.

The UE identity may be an Inactive-Radio Network Temporary Identifier (I-RNTI) allocated to the UE in RRCRelease message. Alternatively and/or additionally, the UE identity may be a different identity other than the I-RNTI, such as an identity designed and/or usable for the SDT procedure, wherein the different identity may be allocated to the UE in RRCRelease message.

In some examples, the UE may select a UL BWP from the set of UL BWPs for SDT based on an indication (such as an indication from the network).

In an example, the network may indicate a UL BWP, among the set of UL BWPs for SDT, that should be used by the UE for SDT (e.g., the network may indicate which UL BWP among the set of UL BWPs for SDT should be used by the UE).

For example, the network may provide an indication (e.g., a value, such as an integer) in a dedicated RRC message to the UE (e.g., in the RRCRelease message). The UE may perform the SDT procedure on a UL BWP of the Cell based on the indication (e.g., the indication may be indicative of the UL BWP). The indication may be per Cell (e.g., the network may provide multiple indications for the list of Cells, wherein each indication of the multiple indications is indicative of a UL BWP of a Cell of the list of cells). Alternatively and/or additionally, the indication may be common for multiple Cells (e.g., the network may provide a single indication for the list of Cells).

In some examples, the SDT procedure may be triggered by the network via paging (e.g., due to DL data arrival at network side). For example, the network may transmit a paging message (associated with triggering the SDT procedure) to the UE. The paging message transmitted to the UE may comprise a first indication (e.g., a flag) indicating initiation of the SDT procedure. The paging message transmitted to the UE may comprise a second indication (e.g., a value, such as an integer) indicating which UL BWP (of the set of UL BWPs, for example) the UE should use for SDT. The first indication and the second indication may be the same indication (e.g., presence of the indication may be indicative of initiation of the SDT procedure and/or the value of the indication may be indicative of the UL BWP to be used). In response to receiving the paging message on a Cell, the UE performs the SDT procedure on the indicated UL BWP of the Cell based on the first indication and/or the second indication.

In some examples, the UE may select a UL BWP from the set of UL BWPs for SDT based on a radio condition and/or a channel condition of the UL BWP.

For example, each UL BWP of the set of UL BWPs for SDT may be associated with one or more DL reference signals (e.g., the one or more DL reference signals may be received in a DL BWP paired with the UL BWP). For example, a first UL BWP of the set of UL BWPs for SDT may be associated with one or more first DL reference signals, a second UL BWP of the set of UL BWPs for SDT may be associated with one or more second DL reference signals, etc. The UE may select a UL BWP of the set of UL BWPs for SDT based on measurements on DL reference signals associated with the set of UL BWPs for SDT. For example, the UE may select a UL BWP of the set of UL BWPs for SDT based on a determination that the UL BWP has the best reference signal quality among the set of UL BWPs (e.g., the determination that the UL BWP has the best reference signal quality among the set of UL BWPs may be based on the measurements on the DL reference signals associated with the set of UL BWPs for SDT).

Alternatively and/or additionally, the UE may perform "listen before talk" on each UL BWP among the set of UL BWPs for SDT. The UE may not select a UL BWP that is occupied (e.g., occupied due to another UE using the UL BWP and/or due to there being strong interference on the UL BWP), wherein whether or not the UL BWP is occupied may be determined by performing "listen before talk" on the UL BWP. The UE may select a UL BWP that is not occupied, wherein whether or not the UL BWP is occupied may be determined by performing "listen before talk" on the UL BWP. Alternatively and/or additionally, the UE may select a UL BWP having a lowest noise and/or a lowest interference among the set of UL BWPs, wherein the UE may determine that the UL BWP has the lowest noise and/or the lowest interference among the set of UL BWPs by performing "listen before talk" on each UL BWP among the set of UL BWPs for SDT.

In some examples, the UE may select a UL BWP from the set of UL BWPs for SDT based on UL data size (e.g., an amount of UL data to be transmitted via the SDT procedure).

For example, each UL BWP among the set of UL BWPs for SDT may be associated with a Transport Block size (TBS) (e.g., the Transport Block size may be configurable). In an example, a first UL BWP of the set of UL BWPs for SDT may be associated with a first Transport Block size, a second UL BWP of the set of UL BWPs for SDT may be associated with a second Transport Block size, etc. The UE may select a UL BWP based on the UL data size (e.g., the amount of UL data to be transmitted). Alternatively and/or additionally, the UE may select a UL BWP based on a total amount of data (e.g., the total amount of data may correspond to a data size of the UL data size plus a size of RRC message and/or MAC subheader). In an example in which the total amount of data is 100 kilobytes (KB), a first UL BWP among the set of UL BWPs for SDT is associated with a Transport Block size of 70 KB and a second UL BWP among the set of UL BWPs for SDT is associated with a Transport Block size of 120 KB, the UE may select the second UL BWP based on a determination that the second UL BWP is able to transmit all the UL data without introducing over a threshold number of padding bits (and/or the UE may select the second UL BWP based on a determination that the Transport Block size of the second UL BWP exceeds the total amount of data and/or that a difference between the Transport Block size of the second UL BWP and the total amount of data is less than a threshold).

The RRC layer of the UE may indicate, to a lower layer (of the UE, for example), such as a MAC layer, that the SDT procedure is to be performed on a UL BWP for SDT (e.g., the selected UL BWP for SDT) of the set of UL BWPs for SDT (if the UL BWP for SDT and/or the set of UL BWPs for SDT are configured in RRC, for example, such as if the UL BWP for SDT and/or the set of UL BWPs for SDT are configured in the RRC layer of the UE). The RRC layer of the UE may configure a lower layer (of the UE, for example), such as a MAC layer, to use the UL BWP for SDT (if the UL BWP for SDT and/or the set of UL BWPs for SDT are configured in RRC, for example, such as if the UL BWP for SDT and/or the set of UL BWPs for SDT are configured in the RRC layer of the UE).

In some examples, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of the set of UL BWPs for SDT. Alternatively and/or additionally, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), if the network provides and/or includes a new configuration of the set of UL BWPs for SDT in the RRCRelease message, the UE (e.g., the RRC layer of the UE) may replace the configuration of the set of UL BWPs for SDT included in the UE Inactive AS context with the new configuration of the set of UL BWPs for SDT (received via the RRCRelease message). Alternatively and/or additionally, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), if the network does not provide and/or include a new configuration of the set of UL BWPs for SDT (in the RRCRelease message, for example) and/or if the network indicates (and/or instructs) release of the configuration of the set of UL BWPs for SDT via the RRCRelease message, the UE (e.g., the RRC layer of the UE) may release (and/or discard) the configuration of the set of UL BWPs for SDT included in the UE Inactive AS context.

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of the set of UL BWPs for SDT (e.g., the UE and/or the RRC layer of the UE may release and/or discard the configuration of the set of UL BWPs for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of the set of UL BWPs for SDT (e.g., the UE and/or the RRC layer of the UE may release and/or discard the configuration of the set of UL BWPs for SDT if a new BWP configuration, such as a new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of the set of UL BWPs for SDT (e.g., the UE and/or the RRC layer of the UE may keep the configuration of the set of UL BWPs for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of the set of UL BWPs for SDT (e.g., the UE and/or the RRC layer of the UE may keep the configuration of the set of UL BWPs for SDT if a new BWP configuration, such as a new BWP configuration in masterCellGroup, is provided in the RRCResume message).

In response to the SDT procedure being unsuccessfully completed (e.g., unsuccessful completion of the SDT procedure) by an RRCSetup message, the UE (e.g., the RRC layer of the UE) may release (and/or discard) the configuration of the set of UL BWPs for SDT. Alternatively and/or additionally, in response to the SDT procedure being unsuccessfully completed (e.g., unsuccessful completion of the SDT procedure) by an RRCSetup message, the UE (e.g., the RRC layer of the UE) may keep the configuration of the set of UL BWPs for SDT.

Upon (and/or in response to) initiation of the pre-configured PUSCH resources-based SDT procedure on the Cell, the UE (e.g., the MAC layer of the UE) may switch the active UL BWP of the UE (from the initial UL BWP, for example) to the selected UL BWP for SDT (e.g., the UL BWP selected from among the set of ULBWPs for SDT). For example, the UE (e.g., the MAC layer of the UE) may switch the active UL BWP of the UE to the selected UL BWP for SDT upon (and/or in response to) initiation of the pre-configured PUSCH resources-based SDT procedure on the Cell if an upper layer (of the UE, for example), such as the RRC layer of the UE, indicates that the SDT procedure is to be performed on the selected UL BWP for SDT. Alternatively and/or additionally, the UE (e.g., the MAC layer of the UE) may switch the active UL BWP of the UE (from the initial UL BWP, for example) to the selected UL BWP for SDT upon (and/or in response to) initiation of the pre-configured PUSCH resources-based SDT procedure on the Cell if an upper layer (of the UE, for example), such as the RRC layer of the UE, configures MAC (e.g., the MAC layer of the UE) to use the selected UL BWP for SDT.

In some examples, upon (and/or in response to) the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the UE may switch the active UL BWP from the selected UL BWP for SDT to the initial active UL BWP of the Cell).

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may keep using (e.g., continue using) the selected UL BWP for SDT (e.g., the MAC layer of the UE may keep using the selected UL BWP for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the MAC layer of the UE may switch the active UL BWP from the selected UL BWP for SDT to the initial active UL BWP of the Cell), such as if no new BWP configuration, such as no new BWP configuration in masterCellGroup, is provided in the RRCResume message. Alternatively and/or additionally, in response to the SDT procedure being unsuccessfully completed by an RRCSetup message, the UE (e.g., the MAC layer of the UE) may switch the active UL BWP back to the initial UL BWP of the Cell (e.g., the MAC layer of the UE may switch the active UL BWP from the selected UL BWP for SDT to the initial active UL BWP of the Cell), such as if no new BWP configuration, such as no new BWP configuration in masterCellGroup, is provided in the RRCSetup message.

In a scenario in which the set of UL BWPs for SDT is configured for a Cell and the initial UL BWP of the Cell is also applicable for the SDT procedure (such as where pre-configured PUSCH resources for SDT are configured on the initial UL BWP), the UE may perform a selection (of a UL BWP from among a second set of UL BWPs, for example) using one or more of the techniques discussed herein with respect to selecting a UL BWP from among the set of UL BWPs for SDT (e.g., based on random selection, the UE identity of the UE, an indication form the network, a radio condition, a channel condition, listen before talk and/or UL data size), wherein the initial UL BWP may be considered (by the UE, for example) to be included in the second set of UL BWPs from which the selected UL BWP is selected (e.g., the initial UL BWP may be considered to be one UL BWP included in the second set of UL BWPs). For example, the second set of UL BWPs may comprise the set of UL BWPs for SDT and the initial UL BWP. In an example, the initial UL BWP may be considered to be the first UL BWP (e.g., sequentially the first UL BWP) among the second set of UL BWPs. In a scenario in which the set of UL BWPs for SDT is configured for a Cell and the initial UL BWP of the Cell is also applicable for the SDT procedure (such as where pre-configured PUSCH resources for SDT are configured on the initial UL BWP), the UE may prioritize the set of UL BWPs for SDT over the initial UL BWP (e.g., the UE may select a UL BWP of the set of UL BWPs for SDT rather than the initial UL BWP based on prioritizing the set of UL BWPs for SDT over the initial UL BWP) or the UE may prioritize the initial UL BWP over the set of UL BWPs for SDT (e.g., the UE may select the initial UL BWP rather than a UL BWP of the set of UL BWPs for SDT based on prioritizing the initial UL BWP over the set of UL BWPs for SDT). In some examples, the prioritization (e.g., prioritization of the set of UL BWPs for SDT over the initial UL BWP or prioritization of the initial UL BWP over the set of UL BWPs for SDT) may be based on a UE category of the UE and/or a type of UE of the UE. For example, the UE may prioritize the set of UL BWPs for SDT over the initial UL BWP if the UE is a first type of UE and/or the UE may prioritize the initial UL BWP over the set of UL BWPs for SDT if the UE is a second type of UE. In a scenario in which the set of UL BWPs for SDT is configured for a Cell and the initial UL BWP of the Cell is also applicable for the SDT procedure (such as where pre-configured PUSCH resources for SDT are configured on the initial UL BWP), the UE may prioritize the initial UL BWP over the set of UL BWPs for SDT (e.g., the UE may select the initial UL BWP if the initial UL BWP of the Cell is applicable for the SDT procedure). Alternatively and/or additionally, if the initial UL BWP of the Cell is not applicable for the SDT procedure, the UE may select a UL BWP from the set of UL BWPs for SDT. If the UE selects a UL BWP for SDT of the set of UL BWPs for SDT, the UE may perform the SDT procedure using the UL BWP for SDT. Alternatively and/or additionally, if the UE selects the initial UL BWP, the UE may perform the SDT procedure using the initial UL BWP.

In a third concept, one or more dedicated UL BWPs in RRC_CONNECTED may be used for a SDT procedure.

In some examples, while the UE is in RRC_CONNECTED state, the network configures a UL BWP (e.g., called a dedicated UL BWP), to be used in RRC_CONNECTED state, to the UE. For example, the network may configure the UE with the dedicated UL BWP by providing the UE with a configuration of the dedicated UL BWP. In some examples, the configuration of the dedicated UL BWP comprises pre-configured PUSCH resources for SDT. Upon (and/or in response to) initiation of the SDT procedure, the UE may restore the configuration of the dedicated UL BWP from the UE Inactive AS context if the dedicated UL BWP is applicable for the Cell (e.g., the Cell may be the same as the previous SpCell), and the UE may use the dedicated UL BWP to perform the SDT procedure (if the dedicated UL BWP is applicable for the Cell, for example).

In some examples, while the UE is in RRC_CONNECTED state, the network configures a set of dedicated UL BWPs, to be used in RRC_CONNECTED state, to the UE. For example, the network may configure the UE with the set of dedicated UL BWPs by providing the UE with one or more configurations of the set of dedicated UL BWPs. In some examples, a configuration (of the one or more configurations, for example) of each dedicated UL BWP among the set of dedicated UL BWPs comprises pre-configured PUSCH resources for SDT. For example, a first configuration of a first dedicated UL BWP of the set of dedicated UL BWPs may comprise first pre-configured PUSCH resources for SDT, a second configuration of a second dedicated UL BWP of the set of dedicated UL BWPs may comprise second pre-configured PUSCH resources for SDT, etc. Upon (and/or in response to) initiation of the SDT procedure, the UE may restore each configuration of the one or more configurations (e.g., the configuration of each dedicated UL BWP among the set of dedicated UL BWPs) from the UE Inactive AS context if the set of dedicated UL BWPs is applicable for the Cell (e.g., the Cell may be the same as the previous SpCell), and the UE may select a dedicated UL BWP (e.g., one dedicated UL BWP) from the set of dedicated UL BWPs to perform the SDT procedure (if the set of dedicated UL BWPs is applicable for the Cell, for example).

In some examples, while the UE is in RRC_CONNECTED state, the network configures a dedicated UL BWP (and/or a set of dedicated UL BWPs) to the UE to be used in RRC_CONNECTED state (e.g., while the UE is in RRC_CONNECTED state, the network configures the UE with the dedicated UL BWP (and/or the set of dedicated UL BWPs) to be used in RRC_CONNECTED state). Alternatively and/or additionally, before or upon (and/or in response to) the UE entering RRC_INACTIVE state, the network indicates (to the UE, for example) a dedicated UL BWP that the UE should use to perform the SDT procedure (e.g., the network may instruct the UE to use the dedicated UL BWP to perform the SDT procedure). In an example, an indication of the dedicated UL BWP may be included in a configuration of the pre-configured PUSCH resources (e.g., the UE may be configured with the pre-configured PUSCH resources via the configuration). Alternatively and/or additionally, the indication of the dedicated UL BWP may be included in an RRCRelease message transmitted to the UE or a different transmission transmitted to the UE.

In at least some of the description that follows, a "dedicated UL BWP" may be a UL BWP that is used (by the UE, for example) in RRC_CONNECTED state and that may be used for SDT in RRC_INACTIVE state (e.g., pre-configured PUSCH resources for SDT are configured for the dedicated UL BWP and/or pre-configured PUSCH resources for SDT may be used on the dedicated UL BWP).

For example, the UE may be configured with one or more dedicated UL BWPs (while the UE is in RRC_CONNECTED state, for example) and/or the UE may use the one or more dedicated UL BWPs in RRC_CONNECTED state, wherein the one or more dedicated UL BWPs may be used (by the UE, for example) for SDT in RRC_INACTIVE state (e.g., one or more pre-configured PUSCH resources for SDT may be configured for the one or more dedicated UL BWPs and/or one or more pre-configured PUSCH resources for SDT may be used on the one or more dedicated UL BWPs).

In some examples, the UE may prioritize the one or more dedicated UL BWPs used in RRC_CONNECTED state over a UL BWP for SDT (and/or a set of UL BWPs for SDT) configured in System Information. For example, upon (and/or in response to) initiation of the pre-configured PUSCH resources-based SDT procedure, if the UL BWP for SDT (and/or the set of UL BWPs for SDT) is configured in System Information of the Cell, and if the stored UE Inactive AS context includes a configuration of the one or more dedicated UL BWP that is applicable for the Cell, the UE (e.g., the RRC layer of the UE) may restore the configuration of the one or more dedicated UL BWPs from the UE Inactive AS context and may consider that the UL BWP for SDT (and/or the set of UL BWPs for SDT) is configured.

In some examples, the UE may prioritize a UL BWP for SDT (and/or a set of UL BWPs for SDT) received in an RRCRelease message over the one or more dedicated UL BWPs used in RRC_CONNECTED state. For example, upon (and/or in response to) initiation of the pre-configured PUSCH resources-based SDT procedure, if the stored UE Inactive AS context includes a configuration of the UL BWP for SDT (and/or the set of UL BWPs for SDT) that is applicable for the Cell (e.g., the Cell may be the same as the previous SpCell and/or the Cell may be among the list of Cells, such as discussed above), and if the stored UE Inactive AS context includes the configuration of the one or more dedicated UL BWPs that is applicable for the Cell, the UE (e.g., the RRC layer of the UE) may restore the configuration of the UL BWP for SDT (and/or the set of UL BWPs for SDT) from the UE Inactive AS context (rather than restoring the configuration of the one or more dedicated UL BWPs, for example) and may consider that the UL BWP for SDT (and/or the set of UL BWPs for SDT) is configured. Alternatively and/or additionally, the UE may consider the one or more dedicated UL BWPs used in RRC_CONNECTED state to be part of the set of UL BWPs for SDT. For example, if there is one dedicated UL BWP and two UL BWPs for SDT in the stored UE Inactive AS context, the UE may consider that there are three UL BWPs in the set of UL BWPs for SDT. Alternatively and/or additionally, if the UE (e.g., the RRC layer of the UE) considers that the UL BWP for SDT (and/or the set of UL BWPs for SDT) is not configured, the UE (e.g., the RRC layer of the UE) may cancel (and/or may not initiate) the SDT procedure and may initiate a legacy RRC Resume procedure.

In some examples, if multiple UL BWPs for SDT are configured (e.g., if the UE is configured with more than one UL BWP for SDT), such as counting one or more dedicated UL BWPs for SDT used in RRC_CONNECTED state and/or counting a UL BWP for SDT (and/or a set of UL BWPs) that is configured in System Information and/or that is received in an RRCRelease message, the UE may select, from the multiple UL BWPs (and/or from the set of UL BWPs for SDT), a UL BWP for SDT on a Cell (e.g., the UL BWP may be selected using one or more of the techniques discussed herein with respect to selecting a UL BWP from among a set of UL BWPs for SDT, such as based on random selection, the UE identity of the UE, an indication form the network, a radio condition, a channel condition, listen before talk and/or UL data size).

In some examples, the UE may be configured with one or more dedicated UL BWPs (while the UE is in RRC_CONNECTED state, for example) and/or the UE may use the one or more dedicated UL BWPs in RRC_CONNECTED state, wherein the one or more dedicated UL BWPs may be used (by the UE, for example) for SDT in RRC_INACTIVE state (e.g., one or more pre-configured PUSCH resources for SDT may be configured for the one or more dedicated UL BWPs and/or one or more pre-configured PUSCH resources for SDT may be used on the one or more dedicated UL BWPs).

The RRC layer of the UE may indicate, to a lower layer (of the UE, for example), such as a MAC layer, that the SDT procedure is to be performed on the one or more dedicated UL BWPs for SDT. For example, the RRC layer of the UE may indicate, to the lower layer, that the SDT procedure is to be performed on the one or more dedicated UL BWPs if the one or more dedicated UL BWPs are configured in RRC (such as if the one or more dedicated UL BWPs are configured in the RRC layer of the UE). The RRC layer of the UE may configure a lower layer (of the UE, for example), such as a MAC layer, to use the one or more dedicated UL BWPs (if the one or more dedicated UL BWPs are configured in RRC, for example, such as if the one or more dedicated UL BWPs are configured in the RRC layer of the UE).

In some examples, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) a configuration of the one or more dedicated UL BWPs for SDT.

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of the one or more dedicated UL BWPs (e.g., the UE and/or the RRC layer of the UE may release and/or discard the configuration of the one or more dedicated UL BWPs if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of the one or more dedicated UL BWPs (e.g., the UE and/or the RRC layer of the UE may release and/or discard the configuration of the one or more dedicated UL BWPs if a new BWP configuration, such as a new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of the one or more dedicated UL BWPs for SDT (e.g., the UE and/or the RRC layer of the UE may keep the configuration of the one or more dedicated UL BWPs for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of the one or more dedicated UL BWPs for SDT (e.g., the UE and/or the RRC layer of the UE may keep the configuration of the one or more dedicated UL BWPs for SDT if a new BWP configuration, such as a new BWP configuration in masterCellGroup, is provided in the RRCResume message).

In response to the SDT procedure being unsuccessfully completed (e.g., unsuccessful completion of the SDT procedure) by an RRCSetup message, the UE (e.g., the RRC layer of the UE) may release (and/or discard) the configuration of the one or more dedicated UL BWPs. Alternatively and/or additionally, in response to the SDT procedure being unsuccessfully completed (e.g., unsuccessful completion of the SDT procedure) by an RRCSetup message, the UE (e.g., the RRC layer of the UE) may keep the configuration of the one or more dedicated UL BWPs.

Upon (and/or in response to) initiation of the pre-configured PUSCH resources-based SDT procedure on the Cell, the UE (e.g., the MAC layer of the UE) may switch the active UL BWP of the UE (from the initial UL BWP, for example) to a dedicated UL BWP for SDT (e.g., a dedicated UL BWP for SDT of the one or more dedicated UL BWPs for SDT). For example, the UE (e.g., the MAC layer of the UE) may switch the active UL BWP of the UE to the dedicated UL BWP for SDT upon (and/or in response to) initiation of the pre-configured PUSCH resources-based SDT procedure on the Cell if an upper layer (of the UE, for example), such as the RRC layer of the UE, indicates that the SDT procedure is to be performed on the dedicated UL BWP for SDT. Alternatively and/or additionally, the UE (e.g., the MAC layer of the UE) may switch the active UL BWP of the UE (from the initial UL BWP, for example) to the dedicated UL BWP for SDT upon (and/or in response to) initiation of the pre-configured PUSCH resources-based SDT procedure on the Cell if an upper layer (of the UE, for example), such as the RRC layer of the UE, configures MAC (e.g., the MAC layer of the UE) to use the dedicated UL BWP for SDT.

In some examples, upon (and/or in response to) the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the UE may switch the active UL BWP from the dedicated UL BWP for SDT to the initial active UL BWP of the Cell).

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may keep using (e.g., continue using) the dedicated UL BWP for SDT (e.g., the MAC layer of the UE may keep using the dedicated UL BWP for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the MAC layer of the UE may switch the active UL BWP from the dedicated UL BWP for SDT to the initial active UL BWP of the Cell), such as if no new BWP configuration, such as no new BWP configuration in masterCellGroup, is provided in the RRCResume message. Alternatively and/or additionally, in response to the SDT procedure being unsuccessfully completed by an RRCSetup message, the UE (e.g., the MAC layer of the UE) may switch the active UL BWP back to the initial UL BWP of the Cell (e.g., the MAC layer of the UE may switch the active UL BWP from the dedicated UL BWP for SDT to the initial active UL BWP of the Cell), such as if no new BWP configuration, such as no new BWP configuration in masterCellGroup, is provided in the RRCSetup message.

In a scenario in which the one or more dedicated UL BWPs for SDT are configured for a Cell and the initial UL BWP of the Cell is also applicable for the SDT procedure (such as where pre-configured PUSCH resources for SDT are configured on the initial UL BWP), the UE may select (e.g., randomly select) a UL BWP (e.g., one UL BWP) of the one or more dedicated UL BWPs and the initial UL BWP (e.g., the UE may select, such as randomly select, either a dedicated UL BWP of the one or more dedicated UL BWPs or the initial UL BWP). In a scenario in which the one or more dedicated UL BWPs for SDT are configured for a Cell and the initial UL BWP of the Cell is also applicable for the SDT procedure (such as where pre-configured PUSCH resources for SDT are configured on the initial UL BWP), the UE may prioritize the one or more dedicated UL BWPs for SDT over the initial UL BWP (e.g., the UE may select a dedicated UL BWP of the one or more dedicated UL BWPs for SDT rather than the initial UL BWP based on prioritizing the one or more dedicated UL BWPs for SDT over the initial UL BWP) or the UE may prioritize the initial UL BWP over the one or more dedicated UL BWPs for SDT (e.g., the UE may select the initial UL BWP rather than a dedicated UL BWP of the one or more dedicated UL BWPs for SDT based on prioritizing the initial UL BWP over the one or more dedicated UL BWPs for SDT). In some examples, the prioritization (e.g., prioritization of the one or more dedicated UL BWPs for SDT over the initial UL BWP or prioritization of the initial UL BWP over the one or more dedicated UL BWPs for SDT) may be based on a UE category of the UE and/or a type of UE of the UE. For example, the UE may prioritize the one or more dedicated UL BWPs for SDT over the initial UL BWP if the UE is a first type of UE and/or the UE may prioritize the initial UL BWP over the one or more dedicated UL BWPs for SDT if the UE is a second type of UE. In a scenario in which the one or more dedicated UL BWPs for SDT are configured for a Cell and the initial UL BWP of the Cell is also applicable for the SDT procedure (such as where pre-configured PUSCH resources for SDT are configured on the initial UL BWP), the UE may select, based on an indication (e.g., the network may indicate to and/or instruct the UE to perform the SDT procedure using the one or more dedicated UL BWPs for SDT or the initial UL BWP), a UL BWP (e.g., one UL BWP) of the one or more dedicated UL BWPs for SDT and the initial UL BWP (e.g., the UE may select, based on the indication, either a dedicated UL BWP of the one or more dedicated UL BWPs for SDT or the initial UL BWP. For example, the UE may select a dedicated UL BWP of the one or more dedicated UL BWPs for SDT if the indication is indicative of performing the SDT procedure using the one or more dedicated UL BWPs for SDT (and/or if the indication is indicative of performing the SDT procedure using the dedicated UL BWP of the one or more dedicated UL BWPs for SDT). Alternatively and/or additionally, the UE may select the initial UL BWP if the indication is indicative of performing the SDT procedure using the initial UL BWP. The indication may be included in a dedicated RRC message transmitted to the UE (e.g., the indication may be included in the RRCRelease message). If the UE selects a dedicated UL BWP of the one or more dedicated UL BWPs for SDT, the UE may perform the SDT procedure using the dedicated UL BWP. Alternatively and/or additionally, if the UE selects the initial UL BWP, the UE may perform the SDT procedure using the initial UL BWP.

In a fourth concept, the UE may perform a UL transmission using one or more pre-configured PUSCH resources outside the initial UL BWP of a Cell In some systems, a UE may not be expected to perform transmission and/or reception outside a current active UL BWP of the UE and/or a current active DL BWP of the UE. The current active UL BWP of the UE may correspond to a UL BWP that is currently active for the UE. The current active DL BWP may correspond to a DL BWP that is currently active for the UE. In order to solve one or more of the aforementioned issues (such as there not being sufficient PUSCH resources in the initial UL BWP of the Cell), the UE may be allowed (and/or configured) to perform the pre-configured PUSCH resources-based SDT procedure outside the initial UL BWP of the Cell. In some examples, a frequency range of the initial UL BWP may be within (and/or narrower than) a bandwidth (e.g., an entire Cell bandwidth) of the Cell (e.g., the entire Cell). The network may configure the UE with pre-configured PUSCH resources at a frequency that is outside the frequency range of the initial UL BWP and/or that is within the bandwidth (e.g., the entire Cell bandwidth) of the Cell (e.g., the entire Cell). In an example in which the frequency range of the initial UL BWP is from 2545 MHz to 2555 MHz and the bandwidth (e.g., the entire Cell bandwidth) of the Cell (e.g., the entire Cell) is from 2500 MHz to 2600 MHz, the network may configure a UE with pre-configured PUSCH resources at 2580 MHz, which is outside the frequency range of the initial UL BWP of the Cell. The UE may adjust (and/or retune), such as temporarily adjust and/or retune, a transmission unit of the UE to perform (and/or to be able to perform) transmission outside the initial UL BWP (even if no additional UL BWP is configured for the UE, for example). For example, by adjusting and/or retuning the transmission unit (e.g., temporarily adjusting and/or retuning the transmission unit), the UE may achieve the transmission outside the initial UL BWP (even if no additional UL BWP is configured for the UE, for example). The UE may receive the configuration of the pre-configured PUSCH resources in a dedicated signaling (e.g., the RRCRelease message). The UE may determine (e.g., calculate) a resource location of the pre-configured PUSCH resources based on a frequency location and/or the bandwidth (e.g., the entire Cell bandwidth) of the Cell (e.g., the entire Cell) (rather than determining the resource location of the pre-configured PUSCH resources based on a frequency location and/or a bandwidth of the initial UL BWP, for example). Alternatively and/or additionally, the resource location of the pre-configured PUSCH resources may be within the bandwidth (e.g., the entire Cell bandwidth) of the Cell (e.g., the entire Cell). Alternatively and/or additionally, the resource location of the pre-configured PUSCH resources may or may not be outside the initial UL BWP (and/or the resource location of the pre-configured PUSCH resources may or may not be within the frequency range and/or the bandwidth of the of the initial UL BWP).

Alternatively and/or additionally, the UE may be configured to receive a network response (e.g., at least one of a Physical Downlink Control Channel (PDCCH) scheduling a Physical Downlink Shared Channel (PDSCH) transmission, a PDCCH scheduling a PUSCH retransmission, a PDCCH indicating successful or unsuccessful transmission, a PDSCH transmission, etc.) outside an initial DL BWP of the Cell, wherein the network response is transmitted by the network in response to a transmission performed (by the UE, for example) using the pre-configured PUSCH resources.

The UE may determine whether or not the transmission using the pre-configured PUSCH resources is to be performed outside the initial UL BWP based on the configuration of the pre-configured PUSCH resources. Alternatively and/or additionally, the UE may determine whether or not reception of the network response will be outside the initial DL BWP based on a search space configuration of a PDCCH (e.g., at least one of a PDCCH associated with the network response, a PDCCH scheduling a PDSCH transmission, a PDCCH scheduling a PUSCH retransmission, a PDCCH scheduling a PUSCH transmission, a PDCCH indicating successful or unsuccessful transmission, etc.). Alternatively and/or additionally, the UE may determine whether to monitor and/or receive the network response outside the initial DL BWP based on the search space configuration.

In some examples (such as examples of one or more of the embodiments discussed herein, such as one or more embodiments described with respect to the first concept, the second concept, the third concept and/or the fourth concept), a release mechanism (e.g., an implicit release mechanism) for pre-configured PUSCH resources may be applied per UL BWP. For example, a first release mechanism (e.g., a first implicit release mechanism) for pre-configured PUSCH resources may be applied for a first UL BWP for SDT, a second release mechanism (e.g., a second implicit release mechanism) for pre-configured PUSCH resources may be applied for a second UL BWP for SDT, etc. In some examples, a counter for counting occurrences of the UE skipping a transmission occasion of SDT may be maintained per UL BWP. For example, a first counter (associated with the first release mechanism, for example) for counting occurrences of the UE skipping a transmission occasion of SDT may be maintained for the first UL BWP for SDT, a second counter (associated with the second release mechanism, for example) for counting occurrences of the UE skipping a transmission occasion of SDT may be maintained for the second UL BWP for SDT, etc. In some examples, if the first counter for the first UL BWP for SDT reaches and/or exceeds a threshold (e.g., a configured threshold, such as a threshold with which the UE is configured), the UE may release the configuration of the first UL BWP for SDT (e.g., the configuration may be configured, such as additionally configured, for a Cell such as the first Cell). Alternatively and/or additionally, if the first counter for the first UL BWP for SDT reaches and/or exceeds a threshold (e.g., a configured threshold, such as a threshold with which the UE is configured), the UE may release pre-configured PUSCH resources configured for the first UL BWP for SDT (e.g., the UE may release the pre-configured PUSCH resources configured for the first UL BWP for SDT with or without releasing the configuration of the first UL BWP for SDT).

Alternatively and/or additionally, a release mechanism (e.g., an implicit release mechanism) for pre-configured PUSCH resources may be applied per Cell. For example, a first release mechanism (e.g., a first implicit release mechanism) for pre-configured PUSCH resources may be applied for a first Cell, a second release mechanism (e.g., a second implicit release mechanism) for pre-configured PUSCH resources may be applied for a second Cell, etc. In some examples, a counter for counting occurrences of the UE skipping a transmission occasion of SDT may be maintained per Cell, such as for UL BWPs for SDT (e.g., all UL BWPs for SDT) on a Cell. For example, a first counter (associated with the first release mechanism, for example) for counting occurrences of the UE skipping a transmission occasion of SDT may be maintained for UL BWPs for SDT (e.g., all UL BWPs for SDT) on the first Cell, a second counter (associated with the second release mechanism, for example) for counting occurrences of the UE skipping a transmission occasion of SDT may be maintained for UL BWPs for SDT (e.g., all UL BWPs for SDT) on the second Cell, etc. In some examples, if the UE performs SDT using a UL BWP for SDT on the first Cell (e.g., any UL BWP for SDT of the UL BWPs for SDT on the first cell), the UE may reset the first counter to zero. In some examples, if the first counter for a Cell reaches and/or exceeds a threshold (e.g., a configured threshold, such as a threshold with which the UE is configured), the UE may release the configuration of UL BWPs for SDT (e.g., all UL BWPs for SDT) on the first Cell, such as UL BWPs for SDT (e.g., all UL BWPs for SDT) that are configured (e.g., additionally configured) on the first Cell. Alternatively and/or additionally, if the first counter for a Cell reaches and/or exceeds a threshold (e.g., a configured threshold, such as a threshold with which the UE is configured), the UE may release pre-configured PUSCH resources (e.g., all pre-configured PUSCH resources) configured for the first Cell (e.g., the UE may release the pre-configured PUSCH resources configured for the first Cell with or without releasing the configuration of the UL BWPs for SDT, such as all UL BWPs for SDT, that are configured on the first Cell).

In some examples (such as examples of one or more of the embodiments discussed herein, such as one or more embodiments described with respect to the first concept, the second concept, the third concept and/or the fourth concept), after the UE selects a UL BWP to use (in the SDT procedure, for example), the UE may use the selected UL BWP to perform the SDT procedure (and/or the UE may use the selected UL BWP until completion of the SDT procedure). Alternatively and/or additionally, after the UE selects a UL BWP to use, the UE may perform a (subsequent) selection of a UL BWP in response to an event. In some examples, the event may correspond to an unsuccessful UL transmission (e.g., the event may comprise occurrence of an unsuccessful UL transmission of the SDT procedure). Alternatively and/or additionally, the event correspond to a UL transmission being unsuccessfully performed multiple times, such as more than a threshold number of times. Alternatively and/or additionally, the event may correspond to occurrence of an unsuccessful contention resolution, such as in a scenario in which pre-configured PUSCH resources (of the SDT procedure, for example) are shared. Alternatively and/or additionally, the event may correspond to a contention resolution being performed unsuccessfully multiple times, such as more than a threshold number of times (such as in a scenario in which pre-configured PUSCH resources (of the SDT procedure, for example) are shared).

In some examples (such as examples of one or more of the embodiments discussed herein, such as one or more embodiments described with respect to the first concept, the second concept, the third concept and/or the fourth concept), a timer may be used (and/or introduced) for the SDT procedure on the UL BWP for SDT. In an example, the UE may be configured with the timer. In some examples, the UE may start the timer in response to (and/or upon) initiation of the SDT procedure. Alternatively and/or additionally, the UE may start the timer in response to (and/or upon) selecting a UL BWP (e.g., the UL BWP for SDT) other than the initial UL BWP. The UE may stop the timer in response to (and/or upon) successful completion of the SDT procedure (e.g., at least one of at and/or after a time of the last transmission of one or more subsequent transmissions of the SDT procedure, at and/or after a time at which the UE considers that there is no further subsequent transmission of the SDT procedure, etc.). In some examples, the UE may consider the SDT procedure to be unsuccessfully completed in response to (and/or upon) expiration of the timer. The UE may switch the active UL BWP of the UE to the initial UL BWP (and/or may switch the active DL BWP of the UE to the initial DL BWP) in response to (and/or upon) expiration of the timer. The UE may fallback to (and/or initiate and/or perform) RRC Resume procedure (e.g., legacy RRC Resume procedure) on the initial UL BWP (and/or the initial DL BWP) in response to (and/or upon) expiration of the timer.

For RACH-based (e.g., 2-step and/or 4-step RA_SDT procedure (e.g., also called SDT and/or SDT procedure in at least some of the description that follows, such as in description of the fifth concept, the sixth concept and/or the seventh concept), since the UE may transmit the UL data together with the RRCResumeRequest message on an initial UL BWP of a Cell, the initial UL BWP of the Cell may become congested (if more than a threshold number of UEs are concurrently performing SDT procedures, for example). For example, there may not be sufficient (e.g., enough) UL resources for the network to schedule transmissions of MsgA/Msg3 of the RACH-based SDT procedure, which may result in longer delays for UEs. There may also be an impact on other UEs which are performing RRC establishment procedure (e.g., legacy RRC establishment procedure) and/or RRC resume procedure (e.g., legacy RRC resume procedure) on the Cell. Increasing the frequency bandwidth of the initial UL BWP of the Cell may not be a preferred solution since not all UEs are able to support large UL bandwidth and/or since large UL bandwidth may also result in more power consumption.

One or more techniques are provided herein to solve one or more of the aforementioned issues (such as at least one of the initial UL BWP of the Cell becoming congested, there not being sufficient UL resources for the network to schedule transmissions of MsgA/Msg3 of the RACH-based SDT procedure, longer delays for UEs, etc.).

In a fifth concept, an additional UL BWP (other than an initial UL BWP, for example) may be used for a SDT procedure.

In some examples, in order to separate UEs performing SDT from UEs not performing SDT, a UL BWP for SDT may be configured (e.g., additionally configured) for the Cell.

The UL BWP for SDT may have a different frequency bandwidth than the initial UL BWP of the Cell. The UL BWP for SDT may have a different frequency location (e.g., a different center frequency) than the initial UL BWP of the Cell. The UL BWP for SDT may have a different numerology than the initial UL BWP of the Cell.

In an example, upon (and/or in response to) initiation of the RACH-based SDT procedure, the UE may determine (e.g., the UE may check) whether or not a UL BWP for SDT is configured for the Cell. If a UL BWP for SDT is configured for the Cell, the UE may perform the RACH-based SDT procedure on the UL BWP for SDT. If a UL BWP for SDT is not configured for the Cell, the UE may perform RACH-based SDT procedure on the initial UL BWP of the Cell.

Alternatively and/or additionally, the RACH-based SDT procedure may be allowed on the UL BWP for SDT (e.g., performance of the RACH-based SDT procedure may be allowed on the UL BWP for SDT) and may not be allowed on the initial UL BWP of the Cell (e.g., performance of the RACH-based SDT procedure may not be allowed on the initial UL BWP of the Cell). Accordingly, the UE may not be able to perform the SDT procedure if a UL BWP for SDT is not configured for the Cell.

In some examples, the UL BWP for SDT may be configured in System Information of the Cell. For example, the UL BWP for SDT may be configured in SIB1, in SIB2, and/or in a different SIB (e.g., a new SIB) designed and/or usable for SDT. Alternatively and/or additionally, the UL BWP for SDT may be configured in a dedicated RRC message to the UE (e.g., in the RRCRelease message) and stored in the UE Inactive AS context. For example, the UE may be configured with the UL BWP for SDT via the dedicated RRC message received by the UE and/or the UE may store the UL BWP for SDT (and/or a configuration of the UL BWP for SDT) in the UE Inactive AS context (after receiving the dedicated RRC message, for example). The configuration of the UL BWP for SDT may be applicable for a Cell on which the configuration is received (e.g., a Cell on which the dedicated RRC message is received). The configuration of the UL BWP for SDT may not be applicable for a Cell other than the Cell on which the configuration is received.

Alternatively and/or additionally, the network may provide, in a dedicated RRC message to the UE (e.g., in the RRCRelease message), the configuration of UL BWP for SDT for a list of Cells. For example, the configuration of the UL BWP for SDT for the list of Cells may be applicable for Cells of the list of Cells. Accordingly, the UE may be able to use the UL BWP for SDT (and/or the configuration of the UL BWP for SDT) when initiating SDT on a Cell (e.g., any one cell) among the list of Cells. For example, the network may include 3 UL BWPs for SDT in the configuration and/or there may be 3 Cells in the list of Cells, wherein each UL BWP for SDT (of the 3 UL BWPs for SDT) in the configuration corresponds to a Cell among the list of Cells. In an example, a first UL BWP for SDT of the 3 UL BWPs for SDT may correspond to (e.g., be applicable for) a first Cell of the list of Cells (e.g., the UE may perform a RACH-based SDT procedure on the first Cell using the first UL BWP for SDT), a second UL BWP for SDT of the 3 UL BWPs for SDT may correspond to (e.g., be applicable for) a second Cell of the list of Cells (e.g., the UE may perform a RACH-based SDT procedure on the second Cell using the second UL BWP for SDT) and/or a third UL BWP for SDT of the 3 UL BWPs for SDT may correspond to (e.g., be applicable for) a third Cell of the list of Cells (e.g., the UE may perform a RACH-based SDT procedure on the third Cell using the third UL BWP for SDT). The list of Cells may be indicative of and/or may comprise Cells that belong to a first RAN Notification Area (RNA) (e.g., the list of Cells may be indicative of and/or may comprise all cells that belong to the first RNA or some cells that belong to the first RNA). Alternatively and/or additionally, the list of Cells may comprise one or more Cells that belong to a second RNA. Alternatively and/or additionally, the list of Cells may not comprise a Cell that belongs to the second RNA (e.g., the list of Cells may not comprise any Cell that belongs to the second RNA). In some examples, the UE is configured with the first RNA when an RRC connection is suspended. In some examples, the UE initiates a RNA update procedure in response to moving outside the first RNA (e.g., when camping on a Cell not belonging to the first RNA).

In some examples, upon (and/or in response to) initiation of the RACH-based SDT procedure, if the UL BWP for SDT is configured in System Information of the Cell, the UE (e.g., an RRC layer of the UE) may consider that the UL BWP for SDT is configured. Alternatively and/or additionally, upon (and/or in response to) initiation of the RACH-based SDT procedure, if the UL BWP for SDT is not configured in System Information of the Cell, and if the stored UE Inactive AS context includes the configuration of UL BWP for SDT that is applicable for the Cell (e.g., the Cell may be the same as the previous SpCell and/or the Cell may be among the list of Cells, such as discussed above), the UE (e.g., the RRC layer of the UE) may restore the configuration of UL BWP for SDT from the UE Inactive AS context and may consider that the UL BWP for SDT is configured. Alternatively and/or additionally, upon (and/or in response to) initiation of the RACH-based SDT procedure, if the UL BWP for SDT is configured in System Information of the Cell, and if the stored UE Inactive AS context includes the configuration of UL BWP for SDT that is applicable for the Cell (e.g., the Cell may be the same as the previous SpCell and/or the Cell may be among the list of Cells, such as discussed above), the UE (e.g., the RRC layer of the UE) may restore the configuration of UL BWP for SDT from the UE Inactive AS context (rather than using the configuration configured in the System Information of the Cell, for example) and may consider that the UL BWP for SDT is configured. Alternatively and/or additionally, if the UE (e.g., the RRC layer of the UE) considers that the UL BWP for SDT is not configured, the UE (e.g., the RRC layer of the UE) may cancel (and/or may not initiate) the SDT procedure and may initiate a legacy RRC Resume procedure.

The RRC layer of the UE may indicate, to a lower layer (of the UE, for example), such as a MAC layer, that the SDT procedure is to be performed on the UL BWP for SDT (if the UL BWP for SDT is configured in RRC, for example, such as if the UL BWP for SDT is configured in the RRC layer of the UE). The RRC layer of the UE may configure a lower layer (of the UE, for example), such as a MAC layer, to use the UL BWP for SDT (if the UL BWP for SDT is configured in RRC, for example, such as if the UL BWP for SDT is configured in the RRC layer of the UE).

In some examples, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of UL BWP for SDT. Alternatively and/or additionally, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), if the network provides and/or includes a new configuration of UL BWP for SDT in the RRCRelease message, the UE (e.g., the RRC layer of the UE) may replace the configuration of UL BWP for SDT included in the UE Inactive AS context with the new configuration of UL BWP for SDT (received via the RRCRelease message). Alternatively and/or additionally, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), if the network does not provide and/or include a new configuration of UL BWP for SDT (in the RRCRelease message, for example) and/or if the network indicates (and/or instructs) release of the configuration of UL BWP for SDT via the RRCRelease message, the UE (e.g., the RRC layer of the UE) may release (and/or discard) the configuration of UL BWP for SDT included in the UE Inactive AS context.

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of UL BWP for SDT (e.g., the UE and/or the RRC layer of the UE may release and/or discard the configuration of UL BWP for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of UL BWP for SDT (e.g., the UE and/or the RRC layer of the UE may release and/or discard the configuration of UL BWP for SDT if a new BWP configuration, such as a new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of UL BWP for SDT (e.g., the UE and/or the RRC layer of the UE may keep the configuration of UL BWP for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of UL BWP for SDT (e.g., the UE and/or the RRC layer of the UE may keep the configuration of UL BWP for SDT if a new BWP configuration, such as a new BWP configuration in masterCellGroup, is provided in the RRCResume message).

In response to the SDT procedure being unsuccessfully completed (e.g., unsuccessful completion of the SDT procedure) by an RRCSetup message, the UE (e.g., the RRC layer of the UE) may release (and/or discard) the configuration of UL BWP for SDT. Alternatively and/or additionally, in response to the SDT procedure being unsuccessfully completed (e.g., unsuccessful completion of the SDT procedure) by an RRCSetup message, the UE (e.g., the RRC layer of the UE) may keep the configuration of UL BWP for SDT.

Upon (and/or in response to) initiation of an RA procedure on the Cell, the UE (e.g., the MAC layer of the UE) may switch the active UL BWP of the UE (from the initial UL BWP, for example) to the UL BWP for SDT. For example, the UE (e.g., the MAC layer of the UE) may switch the active UL BWP of the UE to the UL BWP for SDT upon (and/or in response to) initiation of the RA procedure on the Cell if an upper layer (of the UE, for example), such as the RRC layer of the UE, indicates that the SDT procedure is to be performed on the UL BWP for SDT. Alternatively and/or additionally, the UE (e.g., the MAC layer of the UE) may switch the active UL BWP of the UE to the UL BWP for SDT upon (and/or in response to) initiation of the RACH-based SDT procedure on the Cell if an upper layer (of the UE, for example), such as the RRC layer of the UE, configures MAC (e.g., the MAC layer of the UE) to use the UL BWP for SDT.

In some examples, in response to (and/or upon) the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the UE may switch the active UL BWP from the UL BWP for SDT to the initial active UL BWP of the Cell).

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may keep using (e.g., continue using) the UL BWP for SDT (e.g., the MAC layer of the UE may keep using the UL BWP for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the MAC layer of the UE may switch the active UL BWP from the UL BWP for SDT to the initial active UL BWP of the Cell), such as if no new BWP configuration, such as no new BWP configuration in masterCellGroup, is provided in the RRCResume message. Alternatively and/or additionally, in response to the SDT procedure being unsuccessfully completed (e.g., unsuccessful completion of the SDT procedure) by an RRCSetup message, the UE (e.g., the MAC layer of the UE) may switch the active UL BWP back to the initial UL BWP of the Cell (e.g., the MAC layer of the UE may switch the active UL BWP from the UL BWP for SDT to the initial active UL BWP of the Cell), such as if no new BWP configuration, such as no new BWP configuration in masterCellGroup, is provided in the RRCSetup message.

In a scenario in which the UL BWP for SDT is configured for a Cell and the initial UL BWP of the Cell is also applicable for the SDT procedure (such as where RA resources for SDT are configured on the initial UL BWP), the UE may select (e.g., randomly select) a UL BWP (e.g., one UL BWP) of the UL BWP for SDT and the initial UL BWP (e.g., the UE may select, such as randomly select, either the UL BWP for SDT or the initial UL BWP). In a scenario in which the UL BWP for SDT is configured for a Cell and the initial UL BWP of the Cell is also applicable for the SDT procedure (such as where RA resources for SDT are configured on the initial UL BWP), the UE may prioritize the UL BWP for SDT over the initial UL BWP (e.g., the UE may select the UL BWP for SDT rather than the initial UL BWP based on prioritizing the UL BWP for SDT over the initial UL BWP) or the UE may prioritize the initial UL BWP over the UL BWP for SDT (e.g., the UE may select the initial UL BWP rather than the UL BWP for SDT based on prioritizing the initial UL BWP over the UL BWP for SDT). In some examples, the prioritization (e.g., prioritization of the UL BWP for SDT over the initial UL BWP or prioritization of the initial UL BWP over the UL BWP for SDT) may be based on a UE category of the UE and/or a type of UE of the UE. For example, the UE may prioritize the UL BWP for SDT over the initial UL BWP if the UE is a first type of UE and/or the UE may prioritize the initial UL BWP over the UL BWP for SDT if the UE is a second type of UE. In a scenario in which the UL BWP for SDT is configured for a Cell and the initial UL BWP of the Cell is also applicable for the SDT procedure (such as where RA resources for SDT are configured on the initial UL BWP), the UE may prioritize the initial UL BWP over the UL BWP for SDT (e.g., the UE may select the initial UL BWP if the initial UL BWP of the Cell is applicable for the SDT procedure). Alternatively and/or additionally, if the initial UL BWP of the Cell is not applicable for the SDT procedure, the UE may select the UL BWP for SDT. In a scenario in which the UL BWP for SDT is configured for a Cell and the initial UL BWP of the Cell is also applicable for the SDT procedure (such as where RA resources for SDT are configured on the initial UL BWP), the UE may select, based on an indication (e.g., the network may indicate to and/or instruct the UE to perform the SDT procedure using the UL BWP for SDT or the initial UL BWP), a UL BWP (e.g., one UL BWP) of the UL BWP for SDT and the initial UL BWP (e.g., the UE may select, based on the indication, either the UL BWP for SDT or the initial UL BWP). For example, the UE may select the UL BWP for SDT if the indication is indicative of performing the SDT procedure using the UL BWP for SDT. Alternatively and/or additionally, the UE may select the initial UL BWP if the indication is indicative of performing the SDT procedure using the initial UL BWP. The indication may be included in a dedicated RRC message transmitted to the UE (e.g., the indication may be included in the RRCRelease message). If the UE selects the UL BWP for SDT, the UE may perform the SDT procedure using the UL BWP for SDT. Alternatively and/or additionally, if the UE selects the initial UL BWP, the UE may perform the SDT procedure using the initial UL BWP.

Figure 20:
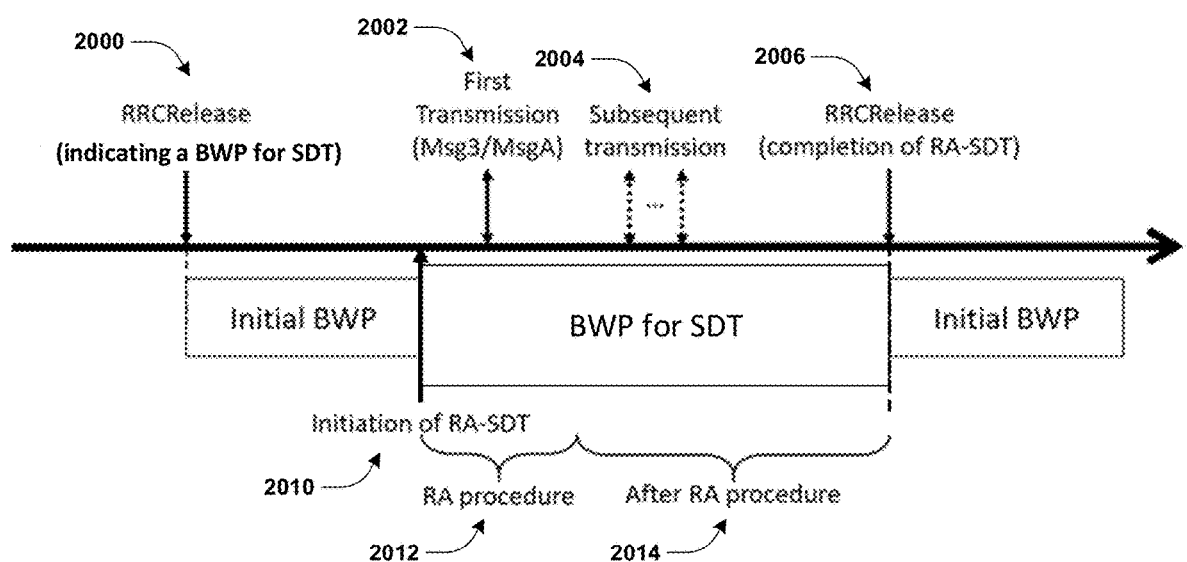
FIG. 20 is a diagram illustrating an exemplary scenario associated with performance of a SDT procedure by a UE according to one exemplary embodiment.

FIG. 20 illustrates an example scenario associated with performance of the SDT procedure by the UE. The UE may receive a first RRCRelease message 2000 indicative of a BWP for SDT. The UE may use an initial BWP (different than the BWP for SDT, for example) between reception of the first RRCRelease message 2000 and initiation 2010 of the SDT procedure (e.g., a RACH-based SDT procedure, such as a random access SDT (RA-SDT) procedure). The UE may use the BWP for SDT during a period of time between the initiation 2010 of the SDT procedure and completion of the SDT procedure (e.g., the SDT procedure may be completed by reception of a second RRCRelease message 2006). In some examples, the period of time between the initiation 2010 of the SDT procedure and the completion of the SDT procedure may comprise a period of time 2012 during which an RA procedure is performed and a period of time 2014 after the RA procedure. In some examples, the UE may perform (e.g., transmit and/or receive) a first transmission 2002 (e.g., a Msg3 transmission and/or a MsgA transmission) during the period of time 2012 and/or one or more subsequent transmissions 2004 during the period of time 2014.

In a sixth concept, a set of UL BWPs may be used for a SDT procedure.

In some examples, in order to separate UEs performing SDT (e.g., separate the UEs into multiple groups), a set of UL BWPs for SDT may be configured for the Cell. The set of UL BWPs for SDT may comprise a UL BWP for SDT (e.g., at least one UL BWP for SDT). If more than one UL BWP for SDT is configured (e.g., if the set of UL BWPs for SDT configured for the Cell comprises more than one UL BWP for SDT), the UE may perform a selection of a UL BWP (e.g., one UL BWP) from the set of UL BWPs for SDT. Alternatively and/or additionally, if merely one UL BWP for SDT is configured (e.g., if the set of UL BWPs for SDT configured for the Cell comprises merely one UL BWP for SDT, the UE may perform a selection of the one UL BWP for SDT.

In some examples, a UL BWP for SDT of the set of UL BWPs for SDT may have a different frequency bandwidth than the initial UL BWP of the Cell. Alternatively and/or additionally, the UL BWP for SDT may have a different frequency location (e.g., a different center frequency) than the initial UL BWP of the Cell. Alternatively and/or additionally, the UL BWP for SDT may have a different numerology than the initial UL BWP of the Cell.

In an example, upon (and/or in response to) initiation of the RACH-based SDT procedure, the UE may determine (e.g., the UE may check) whether or not the set of UL BWPs for SDT is configured for the Cell. If the set of UL BWPs for SDT is configured for the Cell, the UE may perform the RACH-based SDT procedure on the selected UL BWP for SDT (after performing the selection of the selected UL BWP from the set of UL BWPs for SDT, for example). If a set of UL BWPs for SDT is not configured for the Cell, the UE may perform RACH-based SDT procedure on the initial UL BWP of the Cell.

Alternatively and/or additionally, the RACH-based SDT procedure may be allowed on the set of UL BWPs for SDT (e.g., performance of the RACH-based SDT procedure may be allowed on a UL BWP of the set of UL BWPs for SDT) and may not be allowed on the initial UL BWP of the Cell (e.g., performance of the RACH-based SDT procedure may not be allowed on the initial UL BWP of the Cell). Accordingly, the UE may not be able to perform the SDT procedure if the set of UL BWPs for SDT is not configured for the Cell.

In some examples, the set of UL BWPs for SDT may be configured in System Information of the Cell. For example, the set of UL BWPs for SDT may be configured in SIB1, in SIB2, and/or in a different SIB (e.g., a new SIB) designed and/or usable for SDT. Alternatively and/or additionally, the set of UL BWPs for SDT may be configured in a dedicated RRC message to the UE (e.g., in the RRCRelease message) and stored in the UE Inactive AS context. For example, the UE may be configured with the set of UL BWPs for SDT via the dedicated RRC message received by the UE and/or the UE may store the set of UL BWPs for SDT (and/or a configuration of the set of UL BWPs for SDT) in the UE Inactive AS context (after receiving the dedicated RRC message, for example). The configuration of the set of UL BWPs for SDT may be applicable for a Cell on which the configuration is received (e.g., a Cell on which the dedicated RRC message is received). The configuration of the set of UL BWPs for SDT may not be applicable for a Cell other than the Cell on which the configuration is received.

Alternatively and/or additionally, the network may provide, in a dedicated RRC message to the UE (e.g., in the RRCRelease message), the configuration of the set of UL BWPs for SDT for a list of Cells. For example, the configuration of the UL BWP for SDT for the list of Cells may be applicable for Cells of the list of Cells. Accordingly, the UE may be able to use a UL BWP among the set of UL BWPs for SDT when initiating SDT on a Cell (e.g., any one cell) among the list of Cells. In an example, the network may include 5 UL BWPs for SDT in the configuration and/or there may be 3 Cells in the list of Cells, wherein a first UL BWP and a second UL BWP of the 5 UL BWPs for SDT may correspond to (e.g., be applicable for) a first Cell of the list of Cells, wherein a third UL BWP and a fourth UL BWP of the 5 UL BWPs for SDT may correspond to (e.g., be applicable for) a second Cell of the list of Cells, and wherein a fifth UL BWP of the 5 UL BWPs for SDT may correspond to (e.g., be applicable for) a third Cell of the list of Cells. The list of Cells may be indicative of and/or may comprise Cells that belong to a first RAN Notification Area (RNA) (e.g., the list of Cells may be indicative of and/or may comprise all cells that belong to the first RNA or some cells that belong to the first RNA). Alternatively and/or additionally, the list of Cells may comprise one or more Cells that belong to a second RNA. Alternatively and/or additionally, the list of Cells may not comprise a Cell that belongs to the second RNA (e.g., the list of Cells may not comprise any Cell that belongs to the second RNA). In some examples, the UE is configured with the first RNA when an RRC connection is suspended. In some examples, the UE initiates a RNA update procedure in response to moving outside the first RNA (e.g., when camping on a Cell not belonging to the first RNA).

In some examples, upon (and/or in response to) initiation of the RACH-based SDT procedure, if the set of UL BWPs for SDT is configured in System Information of the Cell, the UE (e.g., the RRC layer of the UE) may consider that the UL BWP for SDT (and/or the set of UL BWPs for SDT) is configured. Alternatively and/or additionally, upon (and/or in response to) initiation of the RACH-based SDT procedure, if the set of UL BWPs for SDT is not configured in System Information of the Cell, and if the stored UE Inactive AS context includes the configuration of the set of UL BWPs for SDT that is applicable for the Cell (e.g., the Cell may be the same as the previous SpCell and/or the Cell may be among the list of Cells, such as discussed above), the UE (e.g., the RRC layer of the UE) may restore the configuration of the set of UL BWPs for SDT from the UE Inactive AS context and may consider that the UL BWP for SDT (and/or the set of UL BWPs for SDT) is configured. Alternatively and/or additionally, upon (and/or in response to) initiation of the RACH-based SDT procedure, if the set of UL BWPs for SDT is configured in System Information of the Cell, and if the stored UE Inactive AS context includes the configuration of the set of UL BWPs for SDT that is applicable for the Cell (e.g., the Cell may be the same as the previous SpCell and/or the Cell may be among the list of Cells, such as discussed above), the UE (e.g., the RRC layer of the UE) may restore the configuration of the set of UL BWPs for SDT from the UE Inactive AS context (rather than using the configuration configured in the System Information of the Cell, for example) and may consider that the UL BWP for SDT (and/or the set of UL BWPs for SDT) is configured. Alternatively and/or additionally, if the UE (e.g., the RRC layer of the UE) considers that the UL BWP for SDT (and/or the set of UL BWPs for SDT) is not configured, the UE (e.g., the RRC layer of the UE) may cancel (and/or may not initiate) the SDT procedure and may initiate a legacy RRC Resume procedure.

The UE may perform a selection of a UL BWP (e.g., one UL BWP) from the set of UL BWPs for SDT on a Cell using one or more selection techniques (such as in a scenario in which the set of UL BWPs for SDT comprises more than one UL BWP for SDT).

In some examples, the UE may select a UL BWP from the set of UL BWPs for SDT based on random selection.

In an example, the UE may randomly select a UL BWP from the set of UL BWPs for SDT when the UE initiates SDT on the Cell (and/or upon and/or in response to initiation of SDT on the Cell). For example, for each time that the UE initiates SDT on the Cell, the UE randomly selects a UL BWP from the set of UL BWPs for SDT (e.g., the UE may randomly select the UL BWP when the UE initiates SDT on the Cell and/or upon and/or in response to initiation of the SDT on the Cell).

In an example in which the UE selects a UL BWP from the set of UL BWPs for SDT based on random selection, a probability of selecting each UL BWP of the set of UL BWPs may be the same. For example, if there are two UL BWPs in the set of UL BWPs for SDT, the probability for selecting a first UL BWP of the two UL BWPs may be 50% and the probability for selecting a second UL BWP of the two UL BWPs may be 50%.

Alternatively and/or additionally, in an example in which the UE selects a UL BWP from the set of UL BWPs for SDT based on random selection, probabilities of selecting UL BWPs from the set of UL BWPs may be configurable. For example, the network may configure (the UE with) the probabilities in the configuration of the set of UL BWPs (e.g., the probabilities may be included in the configuration). The UE may perform the selection based on the probabilities (with which the UE is configured). In an example, the probability for selecting a first UL BWP from the set of UL BWPs may be a first configured probability, the probability for selecting a second UL BWP of the set of UL BWPs may be a second configured probability, etc.

In some examples, the UE may select a UL BWP from the set of UL BWPs for SDT based on a UE identity of the UE.

In an example, the UE may select, based on the UE identity and/or a formula, a UL BWP from the set of UL BWPs for SDT when the UE initiates SDT on the Cell (and/or upon and/or in response to initiation of SDT on the Cell). For example, for each time that the UE initiates SDT on the Cell, the UE may select, based on the UE identity and/or the formula, a UL BWP from the set of UL BWPs for SDT (e.g., the UE may randomly select the UL BWP when the UE initiates SDT on the Cell and/or upon and/or in response to initiation of the SDT on the Cell).

In an example, the UE may perform one or more operations (e.g., mathematical operations) using the UE identity to select a UL BWP from the set of UL BWPs for SDT (e.g., the one or more operations may be performed in accordance with the formula). In an example, the formula may be X mod Y, wherein X is the UE identity, mod is modulo operation and/or Y is a number of UL BWPs in the set of UL BWPs for SDT. The UE may determine a result of the formula, and/or the UE may select a UL BWP from the set of UL BWPs for SDT based on the result. In an example, a result of 0 may correspond to a first UL BWP of the set of UL BWPs, a result of 1 may correspond to a second UL BWP of the set of UL BWPs, a result of 2 may correspond to a third UL BWP of the set of UL BWPs, etc. In an example in which the UE identity of the UE is 10 and the number of UL BWPs in the set of UL BWPs for SDT is 3, the UE may determine the result to be 10 mod 3=1, and/or may select the second UL BWP from the set of UL BWPs for SDT based on the result being 1.

The UE identity may be a I-RNTI allocated to the UE in RRCRelease message. Alternatively and/or additionally, the UE identity may be a different identity other than the I-RNTI, such as an identity designed and/or usable for the SDT procedure, wherein the different identity may be allocated to the UE in RRCRelease message.

In some examples, the UE may select a UL BWP from the set of UL BWPs for SDT based on an indication (such as an indication from the network).

In an example, the network may indicate a UL BWP, among the set of UL BWPs for SDT, that should be used by the UE for SDT (e.g., the network may indicate which UL BWP among the set of UL BWPs for SDT should be used by the UE).

For example, the network may provide an indication (e.g., a value, such as an integer) in a dedicated RRC message to the UE (e.g., in the RRCRelease message). The UE may perform the SDT procedure on a UL BWP of the Cell based on the indication (e.g., the indication may be indicative of the UL BWP). The indication may be per Cell (e.g., the network may provide multiple indications for the list of Cells, wherein each indication of the multiple indications is indicative of a UL BWP of a Cell of the list of cells).

Alternatively and/or additionally, the indication may be common for multiple Cells (e.g., the network may provide a single indication for the list of Cells).

In some examples, the SDT procedure may be triggered by the network via paging (e.g., due to DL data arrival at network side). For example, the network may transmit a paging message (associated with triggering the SDT procedure) to the UE. The paging message transmitted to the UE may comprise a first indication (e.g., a flag) indicating initiation of the SDT procedure. The paging message transmitted to the UE may comprise a second indication (e.g., a value, such as an integer) indicating which UL BWP (of the set of UL BWPs, for example) the UE should use for SDT. The first indication and the second indication may be the same indication (e.g., presence of the indication may be indicative of initiation of the SDT procedure and/or the value of the indication may be indicative of the UL BWP to be used). In response to receiving the paging message on a Cell, the UE performs the SDT procedure on the indicated UL BWP of the Cell based on the first indication and/or the second indication.

In some examples, the UE may select a UL BWP from the set of UL BWPs for SDT based on a radio condition and/or a channel condition of the UL BWP.

For example, each UL BWP of the set of UL BWPs for SDT may be associated with one or more DL reference signals (e.g., the one or more DL reference signals may be received in a DL BWP paired with the UL BWP). For example, a first UL BWP of the set of UL BWPs for SDT may be associated with one or more first DL reference signals, a second UL BWP of the set of UL BWPs for SDT may be associated with one or more second DL reference signals, etc. The UE may select a UL BWP of the set of UL BWPs for SDT based on measurements on DL reference signals associated with the set of UL BWPs for SDT. For example, the UE may select a UL BWP of the set of UL BWPs for SDT based on a determination that the UL BWP has the best reference signal quality among the set of UL BWPs (e.g., the determination that the UL BWP has the best reference signal quality among the set of UL BWPs may be based on the measurements on the DL reference signals associated with the set of UL BWPs for SDT).

Alternatively and/or additionally, the UE may perform "listen before talk" on each UL BWP among the set of UL BWPs for SDT. The UE may not select a UL BWP that is occupied (e.g., occupied due to another UE using the UL BWP and/or due to there being strong interference on the UL BWP), wherein whether or not the UL BWP is occupied may be determined by performing "listen before talk" on the UL BWP. The UE may select a UL BWP that is not occupied, wherein whether or not the UL BWP is occupied may be determined by performing "listen before talk" on the UL BWP. Alternatively and/or additionally, the UE may select a UL BWP having a lowest noise and/or a lowest interference among the set of UL BWPs, wherein the UE may determine that the UL BWP has the lowest noise and/or the lowest interference among the set of UL BWPs by performing "listen before talk" on each UL BWP among the set of UL BWPs for SDT.

In some examples, the UE may select a UL BWP from the set of UL BWPs for SDT based on UL data size (e.g., an amount of UL data to be transmitted via the SDT procedure).

For example, each UL BWP among the set of UL BWPs for SDT may be associated with a Transport Block size (TBS) (e.g., the Transport Block size may be configurable). In an example, a first UL BWP of the set of UL BWPs for SDT may be associated with a first Transport Block size, a second UL BWP of the set of UL BWPs for SDT may be associated with a second Transport Block size, etc. The UE may select a UL BWP based on the UL data size (e.g., the amount of UL data to be transmitted). Alternatively and/or additionally, the UE may select a UL BWP based on a total amount of data (e.g., the total amount of data may correspond to a data size of the UL data size plus a size of RRC message and/or MAC subheader). In an example in which the total amount of data is 100 kilobytes (KB), a first UL BWP among the set of UL BWPs for SDT is associated with a Transport Block size of 70 KB and a second UL BWP among the set of UL BWPs for SDT is associated with a Transport Block size of 120 KB, the UE may select the second UL BWP based on a determination that the second UL BWP is able to transmit all the UL data without introducing over a threshold number of padding bits (and/or the UE may select the second UL BWP based on a determination that the Transport Block size of the second UL BWP exceeds the total amount of data and/or that a difference between the Transport Block size of the second UL BWP and the total amount of data is less than a threshold).

The RRC layer of the UE may indicate, to a lower layer (of the UE, for example), such as a MAC layer, that the SDT procedure is to be performed on a UL BWP for SDT (e.g., the selected UL BWP for SDT) of the set of UL BWPs for SDT (if the UL BWP for SDT and/or the set of UL BWPs for SDT are configured in RRC, for example, such as if the UL BWP for SDT and/or the set of UL BWPs for SDT are configured in the RRC layer of the UE). The RRC layer of the UE may configure a lower layer (of the UE, for example), such as a MAC layer, to use the UL BWP for SDT (if the UL BWP for SDT and/or the set of UL BWPs for SDT are configured in RRC, for example, such as if the UL BWP for SDT and/or the set of UL BWPs for SDT are configured in the RRC layer of the UE).

In some examples, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of the set of UL BWPs for SDT. Alternatively and/or additionally, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), if the network provides and/or includes a new configuration of the set of UL BWPs for SDT in the RRCRelease message, the UE (e.g., the RRC layer of the UE) may replace the configuration of the set of UL BWPs for SDT included in the UE Inactive AS context with the new configuration of the set of UL BWPs for SDT (received via the RRCRelease message). Alternatively and/or additionally, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), if the network does not provide and/or include a new configuration of the set of UL BWPs for SDT (in the RRCRelease message, for example) and/or if the network indicates (and/or instructs) release of the configuration of the set of UL BWPs for SDT via the RRCRelease message, the UE (e.g., the RRC layer of the UE) may release (and/or discard) the configuration of the set of UL BWPs for SDT included in the UE Inactive AS context.

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of the set of UL BWPs for SDT (e.g., the UE and/or the RRC layer of the UE may release and/or discard the configuration of the set of UL BWPs for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of the set of UL BWPs for SDT (e.g., the UE and/or the RRC layer of the UE may release and/or discard the configuration of the set of UL BWPs for SDT if a new BWP configuration, such as a new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of the set of UL BWPs for SDT (e.g., the UE and/or the RRC layer of the UE may keep the configuration of the set of UL BWPs for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of the set of UL BWPs for SDT (e.g., the UE and/or the RRC layer of the UE may keep the configuration of the set of UL BWPs for SDT if a new BWP configuration, such as a new BWP configuration in masterCellGroup, is provided in the RRCResume message).

In response to the SDT procedure being unsuccessfully completed (e.g., unsuccessful completion of the SDT procedure) by an RRCSetup message, the UE (e.g., the RRC layer of the UE) may release (and/or discard) the configuration of the set of UL BWPs for SDT. Alternatively and/or additionally, in response to the SDT procedure being unsuccessfully completed (e.g., unsuccessful completion of the SDT procedure) by an RRCSetup message, the UE (e.g., the RRC layer of the UE) may keep the configuration of the set of UL BWPs for SDT.

Upon (and/or in response to) initiation of an RA procedure on the Cell, the UE (e.g., the MAC layer of the UE) may switch the active UL BWP of the UE (from the initial UL BWP, for example) to the selected UL BWP for SDT (e.g., the UL BWP selected from among the set of UL BWPs for SDT). For example, the UE (e.g., the MAC layer of the UE) may switch the active UL BWP of the UE to the selected UL BWP for SDT upon (and/or in response to) initiation of the RA procedure on the Cell if an upper layer (of the UE, for example), such as the RRC layer of the UE, indicates that the SDT procedure is to be performed on the selected UL BWP for SDT. Alternatively and/or additionally, the UE (e.g., the MAC layer of the UE) may switch the active UL BWP of the UE (from the initial UL BWP, for example) to the selected UL BWP for SDT upon (and/or in response to) initiation of the RA procedure on the Cell if an upper layer (of the UE, for example), such as the RRC layer of the UE, configures MAC (e.g., the MAC layer of the UE) to use the selected UL BWP for SDT.

In some examples, upon (and/or in response to) the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the UE may switch the active UL BWP from the selected UL BWP for SDT to the initial active UL BWP of the Cell).

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may keep using (e.g., continue using) the selected UL BWP for SDT (e.g., the MAC layer of the UE may keep using the selected UL BWP for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the MAC layer of the UE may switch the active UL BWP from the selected UL BWP for SDT to the initial active UL BWP of the Cell), such as if no new BWP configuration, such as no new BWP configuration in masterCellGroup, is provided in the RRCResume message. Alternatively and/or additionally, in response to the SDT procedure being unsuccessfully completed by an RRCSetup message, the UE (e.g., the MAC layer of the UE) may switch the active UL BWP back to the initial UL BWP of the Cell (e.g., the MAC layer of the UE may switch the active UL BWP from the selected UL BWP for SDT to the initial active UL BWP of the Cell), such as if no new BWP configuration, such as no new BWP configuration in masterCellGroup, is provided in the RRCSetup message.

In a scenario in which the set of UL BWPs for SDT is configured for a Cell and the initial UL BWP of the Cell is also applicable for the SDT procedure (such as where RA resources for SDT are configured on the initial UL BWP), the UE may perform a selection (of a UL BWP from among a second set of UL BWPs, for example) using one or more of the techniques discussed herein with respect to selecting a UL BWP from among the set of UL BWPs for SDT (e.g., based on random selection, the UE identity of the UE, an indication form the network, a radio condition, a channel condition, listen before talk and/or UL data size), wherein the initial UL BWP may be considered (by the UE, for example) to be included in the second set of UL BWPs from which the selected UL BWP is selected (e.g., the initial UL BWP may be considered to be one UL BWP included in the second set of UL BWPs). For example, the second set of UL BWPs may comprise the set of UL BWPs for SDT and the initial UL BWP. In an example, the initial UL BWP may be considered to be the first UL BWP (e.g., sequentially the first UL BWP) among the second set of UL BWPs. In a scenario in which the set of UL BWPs for SDT is configured for a Cell and the initial UL BWP of the Cell is also applicable for the SDT procedure (such as where RA resources for SDT are configured on the initial UL BWP), the UE may prioritize the set of UL BWPs for SDT over the initial UL BWP (e.g., the UE may select a UL BWP of the set of UL BWPs for SDT rather than the initial UL BWP based on prioritizing the set of UL BWPs for SDT over the initial UL BWP) or the UE may prioritize the initial UL BWP over the set of UL BWPs for SDT (e.g., the UE may select the initial UL BWP rather than a UL BWP of the set of UL BWPs for SDT based on prioritizing the initial UL BWP over the set of UL BWPs for SDT). In some examples, the prioritization (e.g., prioritization of the set of UL BWPs for SDT over the initial UL BWP or prioritization of the initial UL BWP over the set of UL BWPs for SDT) may be based on a UE category of the UE and/or a type of UE of the UE. For example, the UE may prioritize the set of UL BWPs for SDT over the initial UL BWP if the UE is a first type of UE and/or the UE may prioritize the initial UL BWP over the set of UL BWPs for SDT if the UE is a second type of UE. In a scenario in which the set of UL BWPs for SDT is configured for a Cell and the initial UL BWP of the Cell is also applicable for the SDT procedure (such as where RA resources for SDT are configured on the initial UL BWP), the UE may prioritize the initial UL BWP over the set of UL BWPs for SDT (e.g., the UE may select the initial UL BWP if the initial UL BWP of the Cell is applicable for the SDT procedure). Alternatively and/or additionally, if the initial UL BWP of the Cell is not applicable for the SDT procedure, the UE may select a UL BWP from the set of UL BWPs for SDT. If the UE selects a UL BWP for SDT of the set of UL BWPs for SDT, the UE may perform the SDT procedure using the UL BWP for SDT. Alternatively and/or additionally, if the UE selects the initial UL BWP, the UE may perform the SDT procedure using the initial UL BWP.

In a seventh concept, one or more dedicated UL BWPs in RRC_CONNECTED may be used for a SDT procedure.

In some examples, while the UE is in RRC_CONNECTED state, the network configures a UL BWP (e.g., called a dedicated UL BWP), to be used in RRC_CONNECTED state, to the UE. For example, the network may configure the UE with the dedicated UL BWP by providing the UE with a configuration of the dedicated UL BWP. In some examples, the configuration of the dedicated UL BWP comprises Physical Random Access Channel (PRACH) resources for SDT. Upon (and/or in response to) initiation of the SDT procedure, the UE may restore the configuration of the dedicated UL BWP from the UE Inactive AS context if the dedicated UL BWP is applicable for the Cell (e.g., the Cell may be the same as the previous SpCell), and the UE may use the dedicated UL BWP to perform the SDT procedure (if the dedicated UL BWP is applicable for the Cell, for example).

In some examples, while the UE is in RRC_CONNECTED state, the network configures a set of dedicated UL BWPs, to be used in RRC_CONNECTED state, to the UE. For example, the network may configure the UE with the set of dedicated UL BWPs by providing the UE with one or more configurations of the set of dedicated UL BWPs. In some examples, a configuration (of the one or more configurations, for example) of each dedicated UL BWP among the set of dedicated UL BWPs comprises PRACH resources for SDT. For example, a first configuration of a first dedicated UL BWP of the set of dedicated UL BWPs may comprise first PRACH resources for SDT, a second configuration of a second dedicated UL BWP of the set of dedicated UL BWPs may comprise second PRACH resources for SDT, etc. Upon (and/or in response to) initiation of the SDT procedure, the UE may restore each configuration of the one or more configurations (e.g., the configuration of each dedicated UL BWP among the set of dedicated UL BWPs) from the UE Inactive AS context if the set of dedicated UL BWPs is applicable for the Cell (e.g., the Cell may be the same as the previous SpCell), and the UE may select a dedicated UL BWP (e.g., one dedicated UL BWP) from the set of dedicated UL BWPs to perform the SDT procedure (if the set of dedicated UL BWPs is applicable for the Cell, for example).

In some examples, while the UE is in RRC_CONNECTED state, the network configures a dedicated UL BWP (and/or a set of dedicated UL BWPs) to the UE to be used in RRC_CONNECTED state (e.g., while the UE is in RRC_CONNECTED state, the network configures the UE with the dedicated UL BWP (and/or the set of dedicated UL BWPs) to be used in RRC_CONNECTED state). Alternatively and/or additionally, before or upon (and/or in response to) the UE entering RRC_INACTIVE state, the network indicates (to the UE, for example) a dedicated UL BWP that the UE should use to perform the SDT procedure (e.g., the network may instruct the UE to use the dedicated UL BWP to perform the SDT procedure). In an example, an indication of the dedicated UL BWP may be included in an RRCRelease message transmitted to the UE.

In at least some of the description that follows, a "dedicated UL BWP" may be a UL BWP that is used (by the UE, for example) in RRC_CONNECTED state and that may be used for SDT in RRC_INACTIVE state (e.g., PRACH resources for SDT are configured for the dedicated UL BWP).

For example, the UE may be configured with one or more dedicated UL BWPs (while the UE is in RRC_CONNECTED state, for example) and/or the UE may use the one or more dedicated UL BWPs in RRC_CONNECTED state, wherein the one or more dedicated UL BWPs may be used (by the UE, for example) for SDT in RRC_INACTIVE state (e.g., one or more PRACH resources for SDT may be configured for the one or more dedicated UL BWPs).

In some examples, the UE may prioritize the one or more dedicated UL BWPs used in RRC_CONNECTED state over a UL BWP for SDT (and/or a set of UL BWPs for SDT) configured in System Information. For example, upon (and/or in response to) initiation of the RACH-based SDT procedure, if the UL BWP for SDT (and/or the set of UL BWPs for SDT) is configured in System Information of the Cell, and if the stored UE Inactive AS context includes a configuration of the one or more dedicated UL BWP that is applicable for the Cell, the UE (e.g., the RRC layer of the UE) may restore the configuration of the one or more dedicated UL BWPs from the UE Inactive AS context and may consider that the UL BWP for SDT (and/or the set of UL BWPs for SDT) is configured.

In some examples, the UE may prioritize a UL BWP for SDT (and/or a set of UL BWPs for SDT) received in an RRCRelease message over the one or more dedicated UL BWPs used in RRC_CONNECTED state. For example, upon (and/or in response to) initiation of the RACH-based SDT procedure, if the stored UE Inactive AS context includes a configuration of the UL BWP for SDT (and/or the set of UL BWPs for SDT) that is applicable for the Cell (e.g., the Cell may be the same as the previous SpCell and/or the Cell may be among the list of Cells, such as discussed above), and if the stored UE Inactive AS context includes the configuration of the one or more dedicated UL BWPs that is applicable for the Cell, the UE (e.g., the RRC layer of the UE) may restore the configuration of the UL BWP for SDT (and/or the set of UL BWPs for SDT) from the UE Inactive AS context (rather than restoring the configuration of the one or more dedicated UL BWPs, for example) and may consider that the UL BWP for SDT (and/or the set of UL BWPs for SDT) is configured. Alternatively and/or additionally, the UE may consider the one or more dedicated UL BWPs used in RRC_CONNECTED state to be part of the set of UL BWPs for SDT. For example, if there is one dedicated UL BWP and two UL BWPs for SDT in the stored UE Inactive AS context, the UE may consider that there are three UL BWPs in the set of UL BWPs for SDT. Alternatively and/or additionally, if the UE (e.g., the RRC layer of the UE) considers that the UL BWP for SDT (and/or the set of UL BWPs for SDT) is not configured, the UE (e.g., the RRC layer of the UE) may cancel (and/or may not initiate) the SDT procedure and may initiate a legacy RRC Resume procedure.

In some examples, if multiple UL BWPs for SDT are configured (e.g., if the UE is configured with more than one UL BWP for SDT), such as counting one or more dedicated UL BWPs for SDT used in RRC_CONNECTED state and/or counting a UL BWP for SDT (and/or a set of UL BWPs) that is configured in System Information and/or that is received in an RRCRelease message, the UE may select, from the multiple UL BWPs (and/or from the set of UL BWPs for SDT), a UL BWP for SDT on a Cell (e.g., the UL BWP may be selected using one or more of the techniques discussed herein with respect to selecting a UL BWP from among a set of UL BWPs for SDT, such as based on random selection, the UE identity of the UE, an indication form the network, a radio condition, a channel condition, listen before talk and/or UL data size).

In some examples, the UE may be configured with one or more dedicated UL BWPs (while the UE is in RRC_CONNECTED state, for example) and/or the UE may use the one or more dedicated UL BWPs in RRC_CONNECTED state, wherein the one or more dedicated UL BWPs may be used (by the UE, for example) for SDT in RRC_INACTIVE state (e.g., one or more PRACH resources for SDT may be configured for the one or more dedicated UL BWPs).

The RRC layer of the UE may indicate, to a lower layer (of the UE, for example), such as a MAC layer, that the SDT procedure is to be performed on the one or more dedicated UL BWPs for SDT. For example, the RRC layer of the UE may indicate, to the lower layer, that the SDT procedure is to be performed on the one or more dedicated UL BWPs if the one or more dedicated UL BWPs are configured in RRC (such as if the one or more dedicated UL BWPs are configured in the RRC layer of the UE). The RRC layer of the UE may configure a lower layer (of the UE, for example), such as a MAC layer, to use the one or more dedicated UL BWPs (if the one or more dedicated UL BWPs are configured in RRC, for example, such as if the one or more dedicated UL BWPs are configured in the RRC layer of the UE).

In some examples, in response to the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) a configuration of the one or more dedicated UL BWPs for SDT.

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of the one or more dedicated UL BWPs (e.g., the UE and/or the RRC layer of the UE may release and/or discard the configuration of the one or more dedicated UL BWPs if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may release (and/or discard) the configuration of the one or more dedicated UL BWPs (e.g., the UE and/or the RRC layer of the UE may release and/or discard the configuration of the one or more dedicated UL BWPs if a new BWP configuration, such as a new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of the one or more dedicated UL BWPs for SDT (e.g., the UE and/or the RRC layer of the UE may keep the configuration of the one or more dedicated UL BWPs for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the RRC layer of the UE) may keep the configuration of the one or more dedicated UL BWPs for SDT (e.g., the UE and/or the RRC layer of the UE may keep the configuration of the one or more dedicated UL BWPs for SDT if a new BWP configuration, such as a new BWP configuration in masterCellGroup, is provided in the RRCResume message).

In response to the SDT procedure being unsuccessfully completed (e.g., unsuccessful completion of the SDT procedure) by an RRCSetup message, the UE (e.g., the RRC layer of the UE) may release (and/or discard) the configuration of the one or more dedicated UL BWPs. Alternatively and/or additionally, in response to the SDT procedure being unsuccessfully completed (e.g., unsuccessful completion of the SDT procedure) by an RRCSetup message, the UE (e.g., the RRC layer of the UE) may keep the configuration of the one or more dedicated UL BWPs.

Upon (and/or in response to) initiation of an RA procedure on the Cell, the UE (e.g., the MAC layer of the UE) may switch the active UL BWP of the UE (from the initial UL BWP, for example) to a dedicated UL BWP for SDT (e.g., a dedicated UL BWP for SDT of the one or more dedicated UL BWPs for SDT). For example, the UE (e.g., the MAC layer of the UE) may switch the active UL BWP of the UE to the dedicated UL BWP for SDT upon (and/or in response to) initiation of the RA procedure on the Cell if an upper layer (of the UE, for example), such as the RRC layer of the UE, indicates that the SDT procedure is to be performed on the dedicated UL BWP for SDT. Alternatively and/or additionally, the UE (e.g., the MAC layer of the UE) may switch the active UL BWP of the UE (from the initial UL BWP, for example) to the dedicated UL BWP for SDT upon (and/or in response to) initiation of the RA procedure on the Cell if an upper layer (of the UE, for example), such as the RRC layer of the UE, configures MAC (e.g., the MAC layer of the UE) to use the dedicated UL BWP for SDT.

In some examples, upon (and/or in response to) the SDT procedure being successfully completed (e.g., successful completion of the SDT procedure) by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the UE may switch the active UL BWP from the dedicated UL BWP for SDT to the initial active UL BWP of the Cell).

In some examples, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may keep using (e.g., continue using) the dedicated UL BWP for SDT (e.g., the MAC layer of the UE may keep using the dedicated UL BWP for SDT if no new BWP configuration, such as no new BWP configuration in masterCellGroup, is provided in the RRCResume message). Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE (e.g., the MAC layer of the UE) may switch the active UL BWP back to the initial UL BWP of the Cell (e.g., the MAC layer of the UE may switch the active UL BWP from the dedicated UL BWP for SDT to the initial active UL BWP of the Cell), such as if no new BWP configuration, such as no new BWP configuration in masterCellGroup, is provided in the RRCResume message. Alternatively and/or additionally, in response to the SDT procedure being unsuccessfully completed by an RRCSetup message, the UE (e.g., the MAC layer of the UE) may switch the active UL BWP back to the initial UL BWP of the Cell (e.g., the MAC layer of the UE may switch the active UL BWP from the dedicated UL BWP for SDT to the initial active UL BWP of the Cell), such as if no new BWP configuration, such as no new BWP configuration in masterCellGroup, is provided in the RRCSetup message.

In a scenario in which the one or more dedicated UL BWPs for SDT are configured for a Cell and the initial UL BWP of the Cell is also applicable for the SDT procedure (such as where RA resources for SDT are configured on the initial UL BWP), the UE may select (e.g., randomly select) a UL BWP (e.g., one UL BWP) of the one or more dedicated UL BWPs and the initial UL BWP (e.g., the UE may select, such as randomly select, either a dedicated UL BWP of the one or more dedicated UL BWPs or the initial UL BWP). In a scenario in which the one or more dedicated UL BWPs for SDT are configured for a Cell and the initial UL BWP of the Cell is also applicable for the SDT procedure (such as where RA resources for SDT are configured on the initial UL BWP), the UE may prioritize the one or more dedicated UL BWPs for SDT over the initial UL BWP (e.g., the UE may select a dedicated UL BWP of the one or more dedicated UL BWPs for SDT rather than the initial UL BWP based on prioritizing the one or more dedicated UL BWPs for SDT over the initial UL BWP) or the UE may prioritize the initial UL BWP over the one or more dedicated UL BWPs for SDT (e.g., the UE may select the initial UL BWP rather than a dedicated UL BWP of the one or more dedicated UL BWPs for SDT based on prioritizing the initial UL BWP over the one or more dedicated UL BWPs for SDT). In some examples, the prioritization (e.g., prioritization of the one or more dedicated UL BWPs for SDT over the initial UL BWP or prioritization of the initial UL BWP over the one or more dedicated UL BWPs for SDT) may be based on a UE category of the UE and/or a type of UE of the UE. For example, the UE may prioritize the one or more dedicated UL BWPs for SDT over the initial UL BWP if the UE is a first type of UE and/or the UE may prioritize the initial UL BWP over the one or more dedicated UL BWPs for SDT if the UE is a second type of UE. In a scenario in which the one or more dedicated UL BWPs for SDT are configured for a Cell and the initial UL BWP of the Cell is also applicable for the SDT procedure (such as where RA resources for SDT are configured on the initial UL BWP), the UE may select, based on an indication (e.g., the network may indicate to and/or instruct the UE to perform the SDT procedure using the one or more dedicated UL BWPs for SDT or the initial UL BWP), a UL BWP (e.g., one UL BWP) of the one or more dedicated UL BWPs for SDT and the initial UL BWP (e.g., the UE may select, based on the indication, either a dedicated UL BWP of the one or more dedicated UL BWPs for SDT or the initial UL BWP. For example, the UE may select a dedicated UL BWP of the one or more dedicated UL BWPs for SDT if the indication is indicative of performing the SDT procedure using the one or more dedicated UL BWPs for SDT (and/or if the indication is indicative of performing the SDT procedure using the dedicated UL BWP of the one or more dedicated UL BWPs for SDT). Alternatively and/or additionally, the UE may select the initial UL BWP if the indication is indicative of performing the SDT procedure using the initial UL BWP. The indication may be included in a dedicated RRC message transmitted to the UE (e.g., the indication may be included in the RRCRelease message). If the UE selects a dedicated UL BWP of the one or more dedicated UL BWPs for SDT, the UE may perform the SDT procedure using the dedicated UL BWP. Alternatively and/or additionally, if the UE selects the initial UL BWP, the UE may perform the SDT procedure using the initial UL BWP.

In some examples, it is possible that the initial DL BWP of a Cell also becomes congested (if more than a threshold number of UEs are performing SDT procedure at the same time, for example), such as in addition to the initial UL BWP becoming congested. In some examples (such as examples of one or more of the embodiments discussed herein, such as one or more embodiments described with respect to the first concept, the second concept, the third concept, the fourth concept, the fifth concept, the sixth concept and/or the seventh concept), to solve the issue (e.g., the initial DL BWP becoming congested), a DL BWP for SDT may be used, such as by using one or more of the techniques discussed herein with respect to using UL BWP for SDT (and/or by using one or more techniques similar to one or more techniques discussed herein with respect to using UL BWP for SDT). In some examples, a DL BWP for SDT (e.g., one DL BWP for SDT) may be paired with a UL BWP for SDT (e.g., one UL BWP for SDT), wherein a configuration of the DL BWP for SDT may be provided jointly with a configuration of the UL BWP for SDT (e.g., the UE may be provided with the configuration of the DL BWP for SDT and the configuration of the UL BWP for SDT together). Alternatively and/or additionally, a DL BWP for SDT (e.g., one DL BWP for SDT) may be paired with a set of UL BWPs for SDT, wherein a configuration of the DL BWP for SDT is provided jointly with a configuration of the set of UL BWPs for SDT (e.g., the UE may be provided with the configuration of the DL BWP for SDT and the configuration of the set of UL BWPs for SDT together). In some examples, the UE may determine to use a DL BWP for SDT based on a determination that the DL BWP for SDT is paired with a UL BWP for SDT. For example, the UE may determine to use the UL BWP for SDT (for a SDT procedure, for example), and/or the UE may determine to use the DL BWP for SDT (for the SDT procedure, for example) after (and/or in response to) determining to use the UL BWP for SDT. The UE may switch the active DL BWP (from the initial DL BWP, for example) to the DL BWP for SDT paired with the UL BWP for SDT. For example, the UE may switch the active DL BWP (from the initial DL BWP, for example) to the DL BWP for SDT after (and/or when) switching the active UL BWP (from the initial UL BWP, for example) to the UL BWP for SDT. In some examples, in response to (and/or upon) the SDT procedure being successfully completed by an RRCRelease message (e.g., at least one of at and/or after a time of the last transmission of one or more subsequent transmissions of the SDT procedure, at and/or after a time at which the UE considers that there is no further subsequent transmission of the SDT procedure, etc.), the UE may switch the active DL BWP (from the DL BWP for SDT, for example) back to the initial DL BWP (e.g., the initial active DL BWP) of the Cell. Alternatively and/or additionally, in response to the SDT procedure being successfully completed (e.g., successful completion of the SDT procedure) by an RRCResume message (e.g., at least one of at and/or after a time of the last transmission of one or more subsequent transmissions of the SDT procedure, at and/or after a time at which the UE considers that there is no further subsequent transmission of the SDT procedure, etc.), the UE may keep using (e.g., continue using) the DL BWP for SDT (e.g., the UE may keep using the DL BWP for SDT if no new BWP configuration, such as no new BWP configuration in masterCellGroup, is provided in the RRCResume message). Alternatively and/or additionally, if the DL BWP for SDT is not configured for the Cell and if the UL BWP for SDT is configured for the Cell, the UE performs the SDT procedure on the Cell using the initial DL BWP and the UL BWP for SDT. Alternatively and/or additionally, if both the DL BWP for SDT and the UL BWP for SDT are configured for the Cell, the UE performs the SDT procedure on the Cell using the DL BWP for SDT and the UL BWP for SDT.

In some examples (such as examples of one or more of the embodiments discussed herein, such as one or more embodiments described with respect to the fifth concept, the sixth concept and/or the seventh concept), after the UE selects a UL BWP to use (in the SDT procedure, for example), the UE may use the selected UL BWP to perform the SDT procedure (and/or the UE may use the selected UL BWP until completion of the SDT procedure). Alternatively and/or additionally, after the UE selects a UL BWP to use, the UE may perform a (subsequent) selection of a UL BWP in response to an event. In some examples, the event may correspond to an unsuccessful preamble transmission (e.g., the event may comprise occurrence of an unsuccessful preamble transmission, such as unsuccessful transmission of Msg1 and/or MsgA). Alternatively and/or additionally, the event correspond to a preamble transmission (e.g., transmission of Msg1 and/or MsgA) being unsuccessfully performed multiple times, such as more than a threshold number of times. Alternatively and/or additionally, the event may correspond to occurrence of an unsuccessful contention resolution. Alternatively and/or additionally, the event may correspond to a contention resolution being performed unsuccessfully multiple times, such as more than a threshold number of times.

In some examples (such as examples of one or more of the embodiments discussed herein, such as one or more embodiments described with respect to the fifth concept, the sixth concept and/or the seventh concept), a timer may be used (and/or introduced) for the SDT procedure on the UL BWP for SDT. In an example, the UE may be configured with the timer. In some examples, the UE may start the timer in response to (and/or upon) initiation of the SDT procedure. Alternatively and/or additionally, the UE may start the timer in response to (and/or upon) selecting a UL BWP (e.g., the UL BWP for SDT) other than the initial UL BWP. The UE may stop the timer in response to (and/or upon) successful completion of the SDT procedure (e.g., at least one of at and/or after a time of the last transmission of one or more subsequent transmissions of the SDT procedure, at and/or after a time at which the UE considers that there is no further subsequent transmission of the SDT procedure, etc.). In some examples, the UE may consider the SDT procedure to be unsuccessfully completed in response to (and/or upon) expiration of the timer. The UE may fallback to (and/or initiate and/or perform) RRC Resume procedure (e.g., legacy RRC Resume procedure) on the initial UL BWP (and/or the initial DL BWP) in response to (and/or upon) expiration of the timer.

In some examples (such as examples of one or more of the embodiments discussed herein, such as one or more embodiments described with respect to the first concept, the second concept, the third concept, the fourth concept, the fifth concept, the sixth concept and/or the seventh concept), the UE may use a first UL BWP, that is used for performing the first UL transmission of a SDT procedure, to perform (e.g., transmit) one or more subsequent UL transmissions (e.g., the second UL transmission) of the SDT procedure (e.g., the UE may continue using the first UL BWP to perform the one or more subsequent UL transmissions of the SDT procedure). Alternatively and/or additionally, the UE may use a second UL BWP (different than the first UL BWP used for performing the first UL transmission, for example) to perform the one or more subsequent UL transmissions (e.g., the second UL transmission) of the SDT procedure. For example, the network may indicate to and/or instruct (via the first DL transmission of the SDT procedure following the first UL transmission, for example) the UE to use the second UL BWP (for performing the one or more subsequent UL transmissions, for example). Alternatively and/or additionally, the network may indicate (without reconfiguring a BWP configuration of the UE, for example), in an RRC message, a UL BWP that is to be used for performing the one or more subsequent UL transmissions. If the network does not indicate a UL BWP that is to be used for performing the one or more subsequent UL transmissions in the RRC message, the UE may continue using the first UL BWP (used for the first UL transmission, for example) to perform the one or more subsequent UL transmissions (e.g., the UE may not perform BWP switching between the first UL transmission and the one or more subsequent UL transmissions). Alternatively and/or additionally, the UE may use the initial UL BWP for performing the one or more subsequent UL transmissions. The UE may perform BWP switching in a scenario in which a UL BWP used for the one or more subsequent UL transmissions is different than the first UL BWP used for the first UL transmission. The RRC message may be the RRCRelease message. Alternatively and/or additionally, the RRC message may be an RRC message different than the RRCRelease message.

In some examples (such as examples of one or more of the embodiments discussed herein, such as one or more embodiments described with respect to the first concept, the second concept, the third concept, the fourth concept, the fifth concept, the sixth concept and/or the seventh concept), the UE may use a first DL BWP, that is used for performing the first UL transmission of a SDT procedure, to perform (e.g., receive) one or more subsequent DL transmissions (e.g., the second DL transmission) of the SDT procedure (e.g., the UE may continue using the first DL BWP to perform the one or more subsequent DL transmissions of the SDT procedure). Alternatively and/or additionally, the UE may use a second DL BWP (different than the first DL BWP used for performing the first DL transmission, for example) to perform the one or more subsequent DL transmissions (e.g., the second DL transmission) of the SDT procedure. For example, the network may indicate to and/or instruct (via the first DL transmission of the SDT procedure following the first UL transmission, for example) the UE to use the second DL BWP (for performing the one or more subsequent DL Transmissions, for example. Alternatively and/or additionally, the network may indicate (without reconfiguring a BWP configuration of the UE, for example), in an RRC message, which DL BWP that is to be used for performing the one or more subsequent DL transmissions. If the network does not indicate a DL BWP that is to be used for performing the one or more subsequent DL transmissions in the RRC message, the UE may continue using the first UL BWP (used for the first DL transmission, for example) to perform the one or more subsequent DL transmissions (e.g., the UE may not perform BWP switching between the first DL transmission and the one or more subsequent DL transmissions). Alternatively and/or additionally, the UE may use the initial DL BWP for performing the one or more subsequent DL transmissions. Alternatively and/or additionally, the UE may use, for performing the one or more subsequent DL transmissions (e.g., the second DL transmission), a DL BWP that is paired with a UL BWP that the UE uses for performing the one or more subsequent UL transmissions. The UE may perform BWP switching in a scenario in which a DL BWP used for the one or more subsequent DL transmissions is different than the first DL BWP used for the first DL transmission. The RRC message may be the RRCRelease message. Alternatively and/or additionally, the RRC message may be an RRC message different than the RRCRelease message.

In some examples (such as examples of one or more of the embodiments discussed herein, such as one or more embodiments described with respect to the first concept, the second concept, the third concept, the fourth concept, the fifth concept, the sixth concept and/or the seventh concept), a timer may be introduced for controlling completion of the SDT procedure and/or of the one or more subsequent transmissions of the SDT procedure (comprising the one or more subsequent UL transmissions of the SDT procedure and/or the one or more subsequent DL transmissions of the SDT procedure, for example). For example, the UE may start and/or restart the timer in response to (and/or upon) performing a first subsequent UL transmission. In some examples, if the first subsequent UL transmission is "ACKed" (e.g., if the UE receives an ACK indication associated with the first subsequent UL transmission), and if no further subsequent DL transmission is received before expiration of the timer, the UE may consider that there are no further subsequent transmissions (of the SDT procedure) and may consider that the SDT procedure is completed (e.g., the UE may determine that the SDT procedure is complete upon expiration of the timer). Alternatively and/or additionally, the UE may start and/or restart the timer in response to (and/or upon) receiving a first subsequent DL transmission. In some examples, if no further UL data arrives (at the UE, for example) following the first subsequent DL transmission and before the timer expires, the UE may consider that there are no further subsequent transmissions (of the SDT procedure) and may consider that the SDT procedure is completed (e.g., the UE may determine that the SDT procedure is complete upon expiration of the timer).

In some examples (such as examples of one or more of the embodiments discussed herein, such as one or more embodiments described with respect to the first concept, the second concept, the third concept, the fourth concept, the fifth concept, the sixth concept and/or the seventh concept), the network may indicate, to the UE, whether or not there are one or more further subsequent transmissions (of the SDT procedure, for example). For example, after the UE performs a first subsequent UL transmission, the network may indicate (via a message transmitted to the UE, for example, such as via a Downlink Control Information (DCI), a MAC Control Element (CE), or an RRC message), to the UE, that there is no further subsequent transmission (of the SDT procedure, for example). Alternatively and/or additionally, after the UE receives (and/or upon the UE receiving) a first subsequent DL transmission, the network may indicate (via a message transmitted to the UE, for example, such as via a DCI, a MAC CE, or an RRC message), to the UE, that there is no further subsequent transmission (of the SDT procedure, for example). In response to receiving an indication indicating that there is no further subsequent transmission (of the SDT procedure, for example), the UE may consider that there is no further subsequent transmission (of the SDT procedure, for example) and may consider that the SDT procedure is completed. Alternatively and/or additionally, if the UE does not receive the indication (e.g., the indication is not present in a DL transmission), the UE may consider that there are one or more further subsequent transmissions (of the SDT procedure, for example). Alternatively and/or additionally, if the UE does not receive the indication (e.g., the indication is not present in a DL transmission), the UE may consider that there is no further subsequent transmission (of the SDT procedure, for example) and may consider that the SDT procedure is completed.

One or more techniques and/or systems of the present disclosure may be applicable for (and/or implemented using and/or supported by) a Reduced Capability NR Device (and/or a NR_Light device). One or more techniques and/or systems of the present disclosure may be applicable for (and/or implemented using and/or supported by) a NR Device (e.g., a normal NR device) other than a Reduced Capability NR Device and/or a NR_Light device.

The UE may initiate the SDT procedure on a Serving Cell other than a last Serving Cell (e.g., Primary Serving Cell) in RRC_CONNECTED state, such as a most recently used Serving Cell (e.g., Primary Serving Cell) in RRC_CONNECTED state. Alternatively and/or additionally, the UE may initiate the SDT procedure on the same Serving Cell as the last Serving Cell in RRC_CONNECTED state.

In some examples, pre-configured PUSCH resources discussed with respect to one or more embodiments of the present disclosure may be configured grant (e.g., Type-1 configured grant), such as configured grant (e.g., Type-1 configured grant) in NR.

One, some and/or all of the foregoing techniques and/or embodiments can be formed to a new embodiment.

In some examples, embodiments disclosed herein, such as embodiments described with respect to the first concept, the second concept, the third concept, the fourth concept, the fifth concept, the sixth concept and the seventh concept, may be implemented independently and/or separately. Alternatively and/or additionally, a combination of embodiments described herein, such as embodiments described with respect to the first concept, the second concept, the third concept, the fourth concept, the fifth concept, the sixth concept and/or the seventh concept, may be implemented. Alternatively and/or additionally, a combination of embodiments described herein, such as embodiments described with respect to the first concept, the second concept, the third concept, the fourth concept, the fifth concept, the sixth concept and/or the seventh concept, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Figure 21:
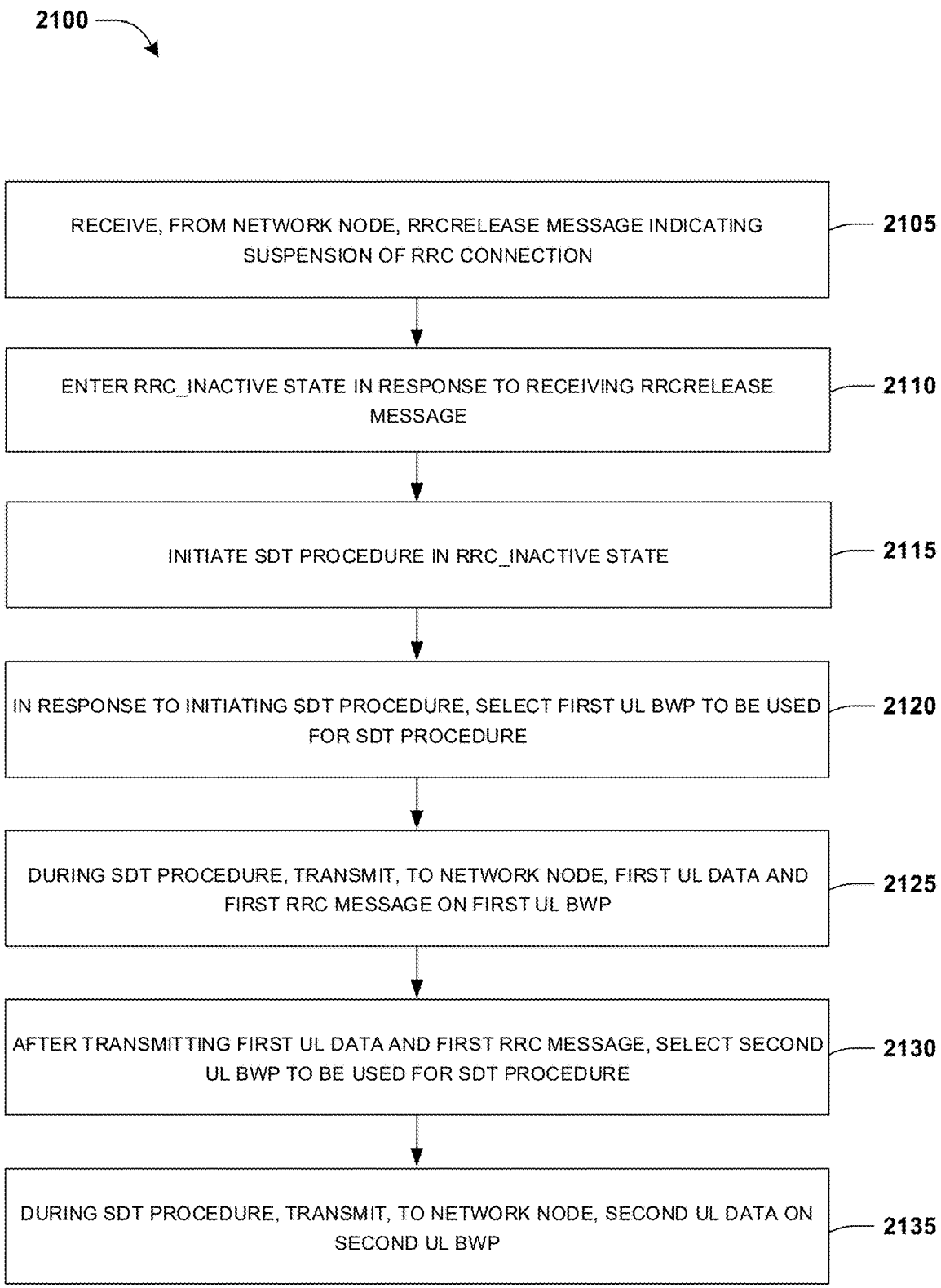
FIG. 21 is a flow chart according to one exemplary embodiment.

FIG. 21 is a flow chart 2100 according to one exemplary embodiment from the perspective of a UE. In step 2105, the UE receives, from a network node, an RRCRelease message indicating suspension of an RRC connection (e.g., an RRC connection between the UE and the network node). In step 2110, the UE enters RRC_INACTIVE state in response to receiving the RRCRelease message. In step 2115, the UE initiates a SDT procedure in RRC_INACTIVE state. In step 2120, in response to initiating the SDT procedure, the UE selects a first UL BWP to be used for the SDT procedure. In step 2125, during the SDT procedure, the UE transmits, to the network node, first UL data and a first RRC message on the first UL BWP. In step 2130, after transmitting the first UL data and the first RRC message, the UE selects a second UL BWP to be used for the SDT procedure. In step 2135, during the SDT procedure, the UE transmits, to the network node, second UL data on the second UL BWP.

In one embodiment, the SDT procedure is a pre-configured PUSCH resources-based SDT procedure.

In one embodiment, the SDT procedure is a RACH-based SDT procedure.

In one embodiment, in response to transmitting the first UL data and/or the first RRC message, the UE receives, from the network node, a first indication on a first DL BWP.

In one embodiment, in response to transmitting the second UL data and the second RRC message, the UE receives, from the network node, a second indication on a second DL BWP.

In one embodiment, the first indication and/or the second indication indicate whether or not there are one or more subsequent UL transmissions to be performed (e.g., the first indication and/or the second indication indicate whether or not there are one or more subsequent UL transmissions to be transmitted for and/or during the SDT procedure).

In one embodiment, the first indication and/or the second indication indicate whether or not there are one or more subsequent DL transmissions to be performed (e.g., the first indication and/or the second indication indicate whether or not there are one or more subsequent DL transmissions to be received for and/or during the SDT procedure).

In one embodiment, the first indication is a DCI, a MAC CE or an RRC message.

In one embodiment, the second indication is a DCI, a MAC CE or an RRC message.

In one embodiment, the UE receives, on the first DL BWP, a second RRC message together with the first indication.

In one embodiment, the UE receives, on the second DL BWP, a second RRC message together with the second indication.

In one embodiment, the first UL BWP is configured in (and/or by) the RRCRelease message. For example, the UE may be configured with the first UL BWP via the RRCRelease message.

In one embodiment, the first UL BWP is configured in (and/or by) System Information. For example, the UE may be configured with the first UL BWP via the System Information.

In one embodiment, the first UL BWP is not an initial UL BWP (e.g., the first UL BWP is not an initial UL BWP of the UE).

In one embodiment, the UE selects the first UL BWP from a plurality of UL BWPs for the SDT procedure.

In one embodiment, the first DL BWP is configured in (and/or by) the RRCRelease message. For example, the UE may be configured with the first DL BWP via the RRCRelease message.

In one embodiment, the first DL BWP is configured in System Information. For example, the UE may be configured with the first DL BWP via the System Information.

In one embodiment, the first DL BWP is paired with the first UL BWP.

In one embodiment, the first DL BWP is not an initial DL BWP (e.g., the first DL BWP is not an initial DL BWP of the UE).

In one embodiment, the second UL BWP is configured in (and/or by) the RRCRelease message. For example, the UE may be configured with the second UL BWP via the RRCRelease message.

In one embodiment, the second UL BWP is configured in (and/or by) System Information. For example, the UE may be configured with the second UL BWP via the System Information.

In one embodiment, the second UL BWP is the same as the first UL BWP (and/or the UE selects the second UL BWP by selecting the same UL BWP as the first UL BWP).

In one embodiment, the second UL BWP is the initial UL BWP (and/or the UE selects the second UL BWP by selecting the initial UL BWP).

In one embodiment, the second DL BWP is configured in (and/or by) the RRCRelease message. For example, the UE may be configured with the second DL BWP via the RRCRelease message.

In one embodiment, the second DL BWP is configured in (and/or by) System Information. For example, the UE may be configured with the second DL BWP via the System Information.

In one embodiment, the second DL BWP is paired with the second UL BWP.

In one embodiment, in response to selecting the first UL BWP, the UE switches an active UL BWP of the UE from the initial UL BWP to the first UL BWP before transmitting on the first UL BWP.

In one embodiment, in response to selecting the first UL BWP, the UE switches an active DL BWP of the UE from the initial DL BWP to the first DL BWP before transmitting on the first UL BWP.

In one embodiment (where the second UL BWP is different than the first UL BWP, for example), in response to selecting the second UL BWP, the UE switches the active UL BWP of the UE from the first UL BWP to the second UL BWP before transmitting on the second UL BWP.

In one embodiment (where the second UL BWP is different than the first UL BWP, for example), in response to selecting the second UL BWP, the UE switches the active DL BWP of the UE from the first DL BWP to the second DL BWP before transmitting on the second UL BWP.

In one embodiment, the first RRC message is an RRCResumeRequest message.

In one embodiment, the second RRC message is an RRCRelease message (e.g., a second RRCRelease message), and the UE remains in RRC_INACTIVE state in response to receiving the second RRC message.

In one embodiment, the second RRC message is an RRCResume message, and the UE enters RRC_CONNECTED state in response to receiving the second RRC message.

In one embodiment, in response to receiving the second RRC message, the UE switches the active UL BWP of the UE from the first UL BWP to the initial UL BWP.

In one embodiment, the UE does not switch the active UL BWP of the UE from the first UL BWP to the initial UL BWP in response to receiving the second RRC message.

In one embodiment (where the SDT procedure is the pre-configured PUSCH resources-based SDT procedure, for example), the UE transmits the first UL data and the first RRC message using a pre-configured PUSCH resource on the first UL BWP.

In one embodiment (where the SDT procedure is the RACH-based SDT procedure, for example), the UE transmits the first UL data and the first RRC message upon (and/or in response to and/or after) transmitting a Random Access Preamble using a PRACH resource on the first UL BWP.

In one embodiment, the UE considers the SDT procedure to be complete based on the second RRC message (e.g., the UE considers the SDT procedure to be complete in response to and/or upon receiving the second RRC message).

In one embodiment, the UE considers the SDT procedure to be complete based on an indication (e.g., the first indication or the second indication) that indicates there is neither subsequent UL transmission (for the SDT procedure, for example) nor subsequent DL transmission (for the SDT procedure, for example). For example, the UE may consider the SDT procedure to be complete in response to and/or upon receiving the indication.

Referring back to FIGS. 3 and 4, in one exemplary embodiment of a UE, the device 300 includes a program code 312 stored in the memory 310. The CPU 308 may execute program code 312 to enable the UE (i) to receive, from a network node, an RRCRelease message indicating suspension of RRC connection, (ii) to enter RRC_INACTIVE state in response to receiving the RRCRelease message, (iii) to initiate a SDT procedure (e.g., a pre-configured PUSCH resources-based SDT procedure or a RACH-based SDT procedure) in RRC_INACTIVE state, (iv) to select a first UL BWP to be used for the SDT procedure in response to initiating the SDT procedure, (v) to transmit, during the SDT procedure and to the network node, first UL data and a first RRC message on the first UL BWP, (vi) to select, after transmitting the first UL data and the first RRC message, a second UL BWP to be used for the SDT procedure, and (vii) to transmit, during the SDT procedure and to the network node, second UL data on the second UL BWP. Furthermore, the CPU 308 can execute the program code 312 to perform one, some and/or all of the above-described actions and steps and/or others described herein.

Figure 22:
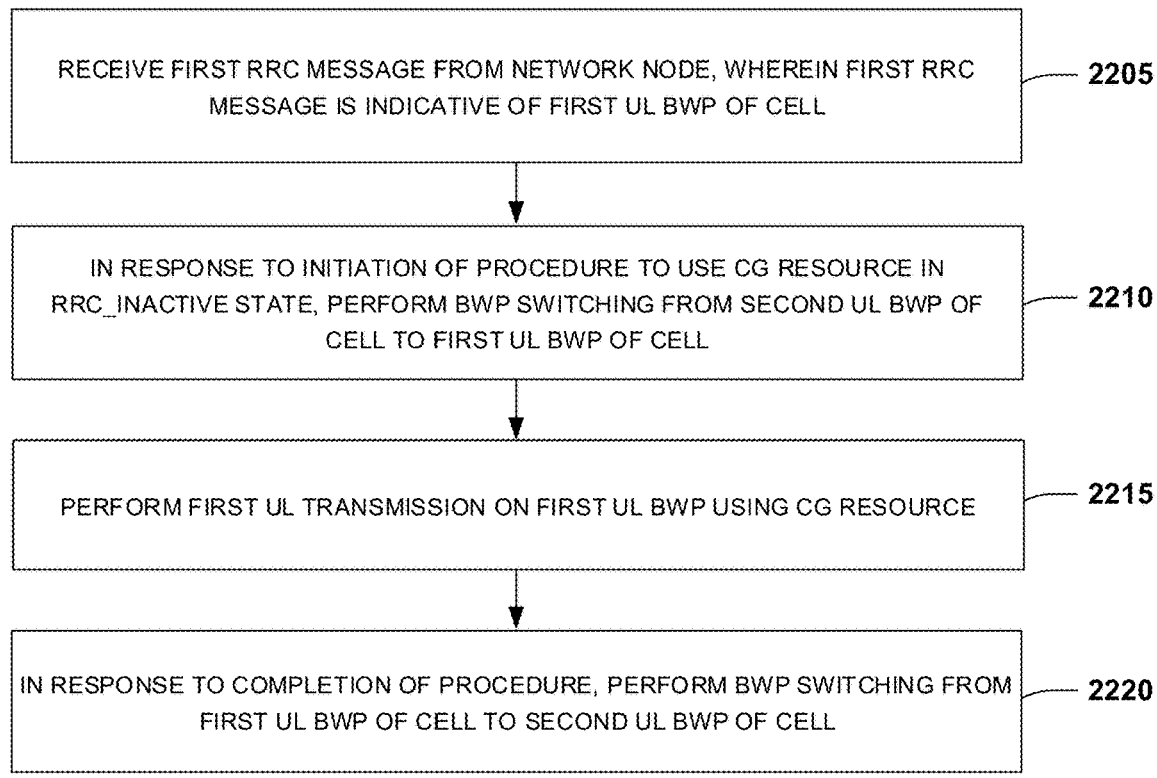
FIG. 22 is a flow chart according to one exemplary embodiment.

FIG. 22 is a flow chart 2200 according to one exemplary embodiment from the perspective of a UE. In step 2205, the UE receives a first RRC message from a network node, wherein the first RRC message is indicative of a first UL BWP of a cell. In step 2210, in response to initiation of a procedure to use a configured grant (CG) resource in RRC inactive state (e.g., RRC_INACTIVE state), the UE performs BWP switching from a second UL BWP of the cell to the first UL BWP of the cell (e.g., the UE may switch an active UL BWP from the second UL BWP of the cell to the first UL BWP of the cell). In step 2215, the UE performs, on the first UL BWP, a first UL transmission using the CG resource. In step 2220, in response to completion of the procedure, the UE performs BWP switching from the first UL BWP of the cell to the second UL BWP of the cell (e.g., the UE may switch the active UL BWP from the first UL BWP of the cell to the second UL BWP of the cell).

In one embodiment, the procedure is an SDT procedure.

In one embodiment, the second UL BWP is an initial UL BWP. In an example, the initial UL BWP may be a UL BWP that the UE uses for initial access (with the cell, for example). Alternatively and/or additionally, the initial UL BWP may be a UL BWP that the UE uses for activation of the cell.

In one embodiment, the first UL BWP is configured by the first RRC message (e.g., the UE is configured with the first UL BWP by the first RRC message).

In one embodiment, the first UL BWP is a UL BWP (e.g., one UL BWP) of one or more BWPs used by the UE when the UE is in RRC connected state (e.g., RRC_CONNECTED state). For example, the UE uses, in the RRC connected state and prior to the initiation of the procedure, the one or more UL BWPs comprising the first UL BWP. For example, the one or more UL BWPs may be used to perform one or more UL transmissions in the RRC connected state.

In one embodiment, the UE enters the RRC inactive state in response to receiving the first RRC message, wherein the first RRC message is an RRCRelease message.

In one embodiment, the UE receives a second RRC message, wherein the UE considers the procedure to be complete based on the second RRC message. For example, the UE may consider the procedure to be complete in response to (and/or upon) reception of the second RRC message.

In one embodiment, the UE remains in the RRC inactive state in response to receiving the second RRC message, wherein the second RRC message is an RRCRelease message.

In one embodiment, the first RRC message is indicative of a first DL BWP of the cell, and the UE performs BWP switching from a second DL BWP of the cell to the first DL BWP of the cell in response to initiation of the procedure (e.g., the UE may switch an active UL BWP from the second DL BWP of the cell to the first DL BWP of the cell). The second DL BWP may be an initial DL BWP. In an example, the initial DL BWP may be a DL BWP that the UE uses for initial access (with the cell, for example). Alternatively and/or additionally, the initial DL BWP may be a DL BWP that the UE uses for activation of the cell.

In one embodiment, the first RRC message is indicative of a first DL BWP of the cell, and the UE performs BWP switching from the first DL BWP of the cell to a second DL BWP of the cell in response to completion of the procedure (e.g., the UE may switch an active UL BWP from the first DL BWP of the cell to the second DL BWP of the cell). The second DL BWP may be an initial DL BWP. In an example, the initial DL BWP may be a DL BWP that the UE uses for initial access (with the cell, for example). Alternatively and/or additionally, the initial DL BWP may be a DL BWP that the UE uses for activation of the cell.

In one embodiment, the UE performs, on the first UL BWP and during the procedure, a second UL transmission using the CG resource.

In one embodiment, the UE starts a timer in response to the initiation of the procedure. The UE performs (and/or falls back to) an RRC Resume procedure on the second UL BWP in response to expiration of the timer.

In one embodiment, wherein the first RRC message is indicative of the CG resource.

Referring back to FIGS. 3 and 4, in one exemplary embodiment of a UE, the device 300 includes a program code 312 stored in the memory 310. The CPU 308 may execute program code 312 to enable the UE (i) to receive a first RRC message from a network node, wherein the first RRC message is indicative of a first UL BWP of a cell, (ii) to perform BWP switching from a second UL BWP of the cell to the first UL BWP of the cell in response to initiation of a procedure to use a CG resource in RRC inactive state (e.g., RRC_INACTIVE state), (iii) to perform, on the first UL BWP, a first UL transmission using the CG resource and (iv) to perform BWP switching from the first UL BWP of the cell to the second UL BWP of the cell in response to completion of the procedure. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 21-22. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 21-22, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node). The increased efficiency may be a result of reducing a load on an initial UL BWP of a Cell that supports SDT (which may cause at least one of reduced power consumption of one or more UEs, faster communication between the network node and one or more UEs, etc.).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
receiving system information from a network node, wherein the system information is indicative of an initial uplink (UL) Bandwidth Part (BWP) of a cell and an initial downlink (DL) BWP of the cell;
performing, on a first UL BWP different than the initial UL BWP, a random access procedure in Radio Resource Control (RRC) inactive state if the UE is configured with the first UL BWP by the system information;
performing, on the initial UL BWP, the random access procedure in the RRC inactive state if the UE is not configured with the first UL BWP by the system information;
performing, on a first DL BWP different than the initial DL BWP, the random access procedure in the RRC inactive state if the UE is configured with the first DL BWP by the system information; and
performing, on the initial DL BWP, the random access procedure in the RRC inactive state if the UE is not configured with the first DL BWP by the system information.

2. The method of claim 1, wherein:
a frequency bandwidth of the first UL BWP is different than a frequency bandwidth of the initial UL BWP.

3. The method of claim 1, wherein:
the system information is a system information block type 1 (SIB1) of the cell.

4. The method of claim 1, wherein:
a center frequency of the first UL BWP is different than a center frequency of the initial UL BWP.

5. The method of claim 1, wherein:
a center frequency of the first UL BWP is the same as a center frequency of the initial UL BWP.

6. The method of claim 1, comprising:
entering the RRC inactive state in response to receiving a first RRC message, wherein the first RRC message is an RRCRelease message.

7. The method of claim 1, wherein:
the random access procedure is for small data transmission.

8. A User Equipment (UE), comprising:
a control circuit;
a processor installed in the control circuit; and
a memory installed in the control circuit and operatively coupled to the processor, wherein the processor is configured to execute a program code stored in the memory to perform operations, the operations comprising:
receiving system information from a network node, wherein the system information is indicative of an initial uplink (UL) Bandwidth Part (BWP) of a cell and an initial downlink (DL) BWP of the cell;
performing, on a first UL BWP different than the initial UL BWP, a random access procedure in Radio Resource Control (RRC) inactive state if the UE is configured with the first UL BWP by the system information;
performing, on the initial UL BWP, the random access procedure in the RRC inactive state if the UE is not configured with the first UL BWP by the system information;
performing, on a first DL BWP different than the initial DL BWP, the random access procedure in the RRC inactive state if the UE is configured with the first DL BWP by the system information; and
performing, on the initial DL BWP, the random access procedure in the RRC inactive state if the UE is not configured with the first DL BWP by the system information.

9. The UE of claim 8, wherein:
a frequency bandwidth of the first UL BWP is different than a frequency bandwidth of the initial UL BWP.

10. The UE of claim 8, wherein:
the system information is a system information block type 1 (SIB1) of the cell.

11. The UE of claim 8, wherein:
a center frequency of the first UL BWP is different than a center frequency of the initial UL BWP.

12. The UE of claim 8, wherein:
a center frequency of the first UL BWP is the same as a center frequency of the initial UL BWP.

13. The UE of claim 5, the operations comprising:
entering the RRC inactive state in response to receiving a first RRC message, wherein the first RRC message is an RRCRelease message.

14. The UE of claim 8, wherein:
the random access procedure is for small data transmission.

15. A non-transitory computer-readable medium comprising processor-executable instructions that when executed by a User Equipment (UE) cause performance of operations, the operations comprising:
receiving system information from a network node, wherein the system information is indicative of an initial uplink (UL) Bandwidth Part (BWP) of a cell and an initial downlink (DL) BWP of the cell;
performing, on a first UL BWP different than the initial UL BWP, a random access procedure in Radio Resource Control (RRC) inactive state if the UE is configured with the first UL BWP by the system information;
performing, on the initial UL BWP, the random access procedure in the RRC inactive state if the UE is not configured with the first UL BWP by the system information;
performing, on a first DL BWP different than the initial DL BWP, the random access procedure in the RRC inactive state if the UE is configured with the first DL BWP by the system information; and performing, on the initial DL BWP, the random access procedure in the RRC inactive state if the UE is not configured with the first DL BWP by the system information.

16. A method of a User Equipment (UE), the method comprising:

receiving system information from a network node, wherein the system information is indicative of an initial uplink (UL) Bandwidth Part (BWP) of a cell and an initial downlink (DL) BWP of the cell;

performing, on a first UL BWP different than the initial UL BWP, a first procedure of small data transmission using a configured grant (CG) resource in Radio Resource Control (RRC) inactive state if the UE is configured with the first UL BWP by the system information;

performing, on the initial UL BWP, the first procedure of small data transmission using the CG resource in the RRC inactive state if the UE is not configured with the first UL BWP by the system information;

performing, on a first DL BWP different than the initial DL BWP, the first procedure of small data transmission using the CG resource in the RRC inactive state if the UE is configured with the first DL BWP by the system information; and performing, on the initial DL BWP, the first procedure of small data transmission using the CG resource in the RRC inactive state if the UE is not configured with the first DL BWP by the system information.

17. The method of claim 16, wherein:
a frequency bandwidth of the first UL BWP is different than a frequency bandwidth of the initial UL BWP.

18. The method of claim 16, wherein:
the system information is a system information block type 1 (SIB1) of the cell.

19. The method of claim 16, wherein:
a center frequency of the first UL BWP is different than or the same as a center frequency of the initial UL BWP.

20. The method of claim 16, comprising:
entering the RRC inactive state in response to receiving a first RRC message, wherein the first RRC message is an RRCRelease message.

21. The method of claim 20, wherein:
the first RRC message is indicative of the CG resource.

* * * * *